(12) United States Patent
Forbes Jones et al.

(10) Patent No.: US 7,374,598 B2
(45) Date of Patent: *May 20, 2008

(54) METHODS AND APPARATUS FOR SPRAY FORMING, ATOMIZATION AND HEAT TRANSFER

(75) Inventors: Robin M. Forbes Jones, Charlotte, NC (US); Richard L. Kennedy, Monroe, NC (US); Helmut Gerhard Conrad, Oshawa (CA); Ted Szylowiec, Hampton (CA); Wayne Conrad, Hampton (CA); Richard Stanley Phillips, Courtice (CA); Andrew Richard Henry Phillips, Courtice (CA)

(73) Assignee: ATI Properties, Inc., Pittsburgh, PA (US)

( * ) Notice: Subject to any disclaimer, the term of this patent is extended or adjusted under 35 U.S.C. 154(b) by 595 days.

This patent is subject to a terminal disclaimer.

(21) Appl. No.: 10/913,361

(22) Filed: Aug. 9, 2004

(65) Prior Publication Data
US 2005/0115361 A1 Jun. 2, 2005

Related U.S. Application Data

(62) Division of application No. 09/882,248, filed on Jun. 18, 2001, now Pat. No. 6,772,961.

(60) Provisional application No. 60/212,122, filed on Jun. 16, 2000.

(51) Int. Cl.
*B22F 9/14* (2006.01)

(52) U.S. Cl. .............. 75/336; 75/346; 239/3

(58) Field of Classification Search .......... 75/336, 75/346
See application file for complete search history.

(56) References Cited

U.S. PATENT DOCUMENTS

| | | | |
|---|---|---|---|
| 3,576,207 | A | 4/1971 | Grenfell et al. |
| 4,062,700 | A | 12/1977 | Hayami et al. |
| 4,264,641 | A | 4/1981 | Mahoney et al. |
| 4,441,542 | A | 4/1984 | Pryor et al. |
| 4,689,074 | A | 8/1987 | Seaman et al. |
| 4,762,553 | A | 8/1988 | Savage et al. |
| 4,769,064 | A | 9/1988 | Buss et al. |
| 4,788,016 | A | 11/1988 | Colclough et al. |
| 4,801,411 | A | 1/1989 | Wellinghoff et al. |

(Continued)

FOREIGN PATENT DOCUMENTS

JP 3-36205 2/1991

OTHER PUBLICATIONS

European Search Report from EP Application No. 01 94 6497 dated Nov. 7, 2006.

(Continued)

*Primary Examiner*—George Wyszomierski
(74) *Attorney, Agent, or Firm*—Wilmer Cutler Pickering Hale and Dorr, LLP

(57) ABSTRACT

The present invention is directed to methods and apparatus that use electrostatic and/or electromagnetic fields to enhance the process of spray forming preforms or powders. The present invention also describes methods and apparatus for atomization and heat transfer with non-equilibrium plasmas. The present invention is also directed to articles, particularly for use in gas turbine engines, produced by the methods of the invention.

4 Claims, 61 Drawing Sheets

U.S. PATENT DOCUMENTS

| | | |
|---|---|---|
| 4,842,170 A | 6/1989 | Del Vecchio et al. |
| 5,104,634 A | 4/1992 | Calcote |
| 5,176,874 A | 1/1993 | Mourer et al. |
| 5,240,067 A | 8/1993 | Hatch |
| 5,268,018 A | 12/1993 | Mourer et al. |
| 5,368,897 A | 11/1994 | Kurihara et al. |
| 5,377,961 A | 1/1995 | Smith et al. |
| 5,649,993 A | 7/1997 | Carter, Jr. et al. |
| 5,722,479 A | 3/1998 | Oeftering |
| 5,810,066 A | 9/1998 | Knudsen et al. |
| 5,894,980 A | 4/1999 | Orme-Marmarelis et al. |
| 6,103,182 A | 8/2000 | Campbell |
| 6,168,666 B1 | 1/2001 | Sun |
| 6,562,099 B2 | 5/2003 | Ormer-Marmarelis et al. |
| 6,772,961 B2 * | 8/2004 | Forbes Jones et al. ........ 239/79 |
| 7,114,548 B2 * | 10/2006 | Forbes Jones .............. 164/469 |

OTHER PUBLICATIONS

European Search Report from EP Application No. 01 94 6497 dated May 31, 2007.

Kuiken, Gerard D.C. *Thermodynamics of Irreversible Processes: Applications to Diffusion and Rheology*. John Wiley & Sons.

Cobine, James Dillon. *Gaseous Conductors: Theory and Engineering Applications*. Dover Publications, Inc. New York.

Sears, Francis Weston. *An Introduction to Thermodyanamics, the Kinetic Theory of Gases, and Statistical Mechanics*. 2$^{nd}$ Edition. Addison-Wellsley. 1959. pp. 335-337.

* cited by examiner

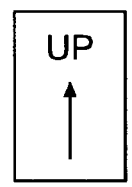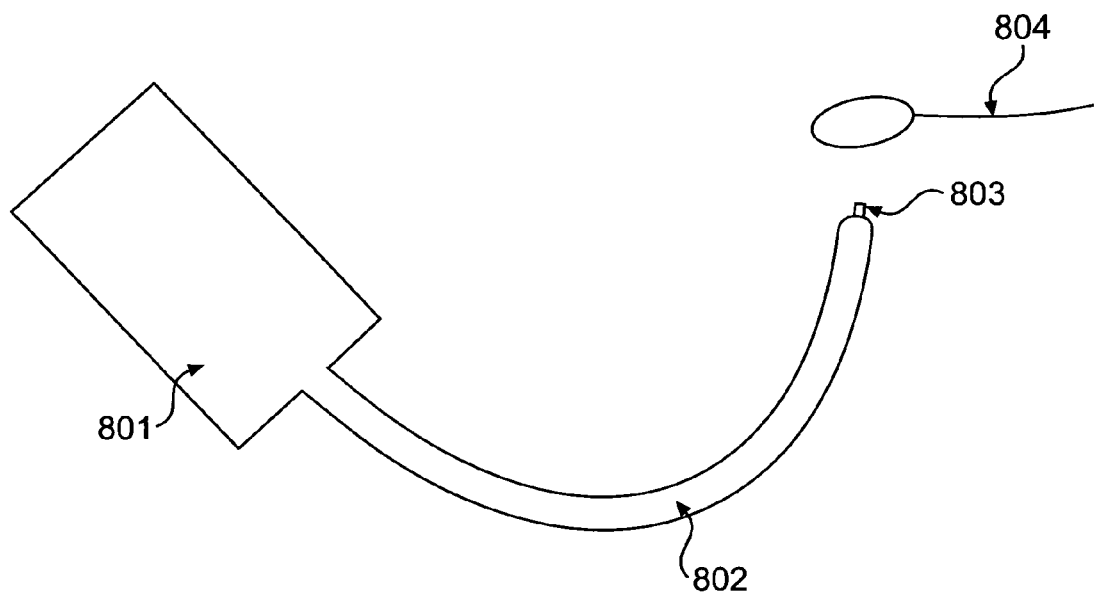
FIG. 15A

INCREASED ELECTRIC FIELD

| EXTRACTOR TO SOURCE DISTANCE (mm) | APPLIED VOLTAGE (keV) | CURRENT (mA) | PARENT DROPS | | | FIRST STAGE OF ATOMIZATION | | | SECOND STAGE OF ATOMIZATION | | | RATIO OF WEIGHT x3/y3 | RATIO OF WEIGHT x3/z3 |
|---|---|---|---|---|---|---|---|---|---|---|---|---|---|
| | | | NO. OF PARENT DROP (x1) | WEIGHT OF PARENT DROPS (x2) (gm) | WEIGHT OF ONE DROP(x3) (gm) (x2/x1) | NO. OF DAUGHTER DROPLETS (y1) | WEIGHT OF DROPLETS (y2) (gm) | WEIGHT OF ONE DROPLET(y3) (gm) (y2/y1) | NO. OF DAUGHTER DROPLETS (z1) | WEIGHT OF DROPLETS (z2) (gm) | WEIGHT OF ONE DROPLET(z3) (gm) (z2/z1) | | |
| 15 | 16 | 0.014 | 7 | 0.136 | 0.019 | 139 | 0.66 | 0.0047 | 6 | 0.013 | 0.0021 | 4 | 8 |
| 15 | 16 | 0.014 | 20 | 0.398 | 0.021 | 129 | 0.647 | 0.0051 | 11 | 0.023 | 0.0021 | 4 | 9 |
| 15 | 16 | 0.017 | 14 | 0.254 | 0.025 | 113 | 0.572 | 0.0051 | 4 | 0.007 | 0.0017 | 4 | 10 |
| 15 | 17 | 0.018 | 10 | 0.195 | 0.021 | 224 | 1.111 | 0.0049 | 5 | 0.006 | 0.0012 | 4 | 16 |
| 15 | – | – | 73 | 1.454 | 0.021 | 58 | 0.287 | 0.0049 | 51 | 0.107 | 0.0021 | 4 | 10 |
| 10 | 17 | 0.014 | 4 | 0.084 | 0.021 | 181 | 0.905 | 0.0051 | 4 | 0.007 | 0.0017 | 4 | 12 |

| EXTRACTOR TO SOURCE DISTANCE (mm) | APPLIED VOLTAGE (keV) | CURRENT (mA) | PARENT DROPS | | | FIRST STAGE OF ATOMIZATION | | | SECOND STAGE OF ATOMIZATION | | | RATIO OF WEIGHT $x_3/y_3$ | RATIO OF WEIGHT $x_3/z_3$ |
|---|---|---|---|---|---|---|---|---|---|---|---|---|---|
| | | | NO. OF PARENT DROP ($x_1$) | WEIGHT OF DROPS ($x_2$) (gm) | WEIGHT OF ONE DROP ($x_3$) (gm) ($x_2/x_1$) | NO. OF DAUGHTER DROPLETS ($y_1$) | WEIGHT OF DROPLETS ($y_2$) (gm) | WEIGHT OF ONE DROPLET ($y_3$) (gm) ($y_2/y_1$) | NO. OF DAUGHTER DROPLETS ($z_1$) | WEIGHT OF DROPLETS ($z_2$) (gm) | WEIGHT OF ONE DROPLET ($z_3$) (gm) ($z_2/z_1$) | | |
| 0 | 22-25 | | 10 | 0.255 | 0.025 | 88 | 0.608 | 0.0069 | | | | 4 | |
| 0 | 20 | | 10 | 0.191 | 0.018 | 50 | 0.224 | 0.0048 | | | | 4 | |
| 5 | 20 | | 30 | 0.289 | 0.009 | 60 | 0.279 | 0.0046 | | | | 2 | |
| 5 | 25 | | 8 | 0.163 | 0.021 | 60 | 0.293 | 0.0048 | | | | 4 | |
| 10 | 25 | | 7 | 0.136 | 0.019 | 80 | 0.366 | 0.0045 | | | | 4 | |
| 15 | 20 | | 4 | 0.081 | 0.021 | 80 | 0.364 | 0.0048 | 4 | 0.005 | 0.0012 | 4 | 16 |
| 15 | 20 | | 4 | 0.081 | 0.021 | 80 | 0.364 | 0.0048 | 4 | 0.005 | 0.0012 | 4 | 16 |
| 20 | 25 | 0.035 | 17 | 0.304 | 0.018 | 109 | 0.522 | 0.0047 | 4 | 0.008 | 0.0012 | 4 | 15 |
| 30 | 28 | 0.048 | 15 | 0.299 | 0.021 | 146 | 0.746 | 0.0051 | | | | 4 | |
| 35 | 29.5 | 0.048 | 11 | 0.211 | 0.019 | 100 | 0.489 | 0.0048 | 5 | 0.003 | 0.0006 | 4 | 32 |
| 68 | 38 | | 3 | 0.061 | 0.021 | 67 | 0.334 | 0.0049 | 7 | 0.007 | 0.0011 | 4 | 20 |

FIG. 68
FIG. 69
FIG. 70

METHODS AND APPARATUS FOR SPRAY FORMING, ATOMIZATION AND HEAT TRANSFER

RELATED APPLICATIONS

This application claims priority to and is a divisional application of U.S. patent application Ser. No. 09/882,248, filed Jun. 18, 2001, now U.S. Pat. No. 6,772,961 which claims priority to U.S. Provisional Application No. 60/212,122, filed Jun. 16, 2000, which are incorporated herein by reference.

FIELD OF THE INVENTION

The present invention is directed to methods and apparatus that use electrostatic and/or electromagnetic fields to enhance the process of spray forming preforms or powders. The present invention also describes methods and apparatus for heat transfer using non-equilibrium plasmas and for atomization.

BACKGROUND OF THE INVENTION

Spray forming is a process by which a stream of molten metal is atomized by a gas stream impinging upon it. The resulting atomized droplets are then directed to a target by the gas stream, or the resulting atomized droplets are cooled to form a powder. Producing powders by typical prior spray forming methods results in a yield loss of 10-15%, and much of the loss is associated with powder being trapped in various areas of the apparatus rather than being delivered to the collection vessel during the process. In producing solid workpieces, known as preforms, typical prior spray forming methods result in a yield loss of 25-40%, and a significant portion of the loss is usually caused by over-spray and particles bouncing off the surface due to their angular impact relative to the normal of the preform surface. Various methods have been described to recover and reuse overspray powder, such as, for example, U.S. Pat. No. 5,649,993, but these are not wholly satisfactory.

Because many powders and preforms are susceptible to damage to their chemical structure by air and oxygen, they are often produced in a shield gas environment of nitrogen or argon. The flow of shield gas, however, must be turned off to allow workers to enter the chamber for cleanup, changeover and maintenance. Thus, any powder or preform remaining in the chamber becomes contaminated and unusable when air and oxygen enter the spray forming apparatus after the flow of shield gas is turned off.

Previously, gas streams or jets have been used to direct the path of the particles involved in the spray forming process. The gas streams typically consist of argon or nitrogen as the means of directing the particles, and heat is removed from the workpiece through conduction or convection.

Current processes for making powder metal products, particularly in materials used for critical aerospace applications, use a conventional gas atomizing process. In this process, high-pressure gas is directed at a molten metal stream to break it into smaller droplets. The droplets solidify as powder. For critical applications, the resultant powder is then blended with batches of powder from other small melts. The blend is screened to a small mesh size (325 mesh), canned and consolidated by extrusion into product suitable for manufacture into an aircraft component. This method of manufacture is not efficient because several small melts are required for blending, melts are made in conventional ceramic lined furnaces and hence result in oxide contamination, several powder handling operations offer opportunity for contamination, and many steps in the process make the production operation costly.

Heat transfer using non-equilibrium plasmas has heretofore been poorly understood and often incorrectly or inefficiently applied. There is a need in the art for methods and apparatus that improve the yield and quality of powders and preforms produced by spray forming. The present invention is directed to these, as well as other, important ends.

SUMMARY OF THE INVENTION

The present invention overcomes the limitations of the conventional powder process by permitting a significantly larger melt to be manufactured to powder, thereby eliminating the blending steps. They also are melted and atomized in a ceramicless system, thereby minimizing the contamination from the furnace linings. They are atomized in vacuum, thereby eliminating the need for screening and handling. They can either be containerized and sealed in a vacuum or rapidly solidified to form a solid preform in vacuum, thereby eliminating sources of handling and hence possible contamination. Finally, the present invention will have considerably fewer handling steps than conventional powder making, and thus will be more cost effective.

In one embodiment, the present invention describes apparatus comprising dispensing means, collecting means, and means for directing molten particles from the dispensing means to the collecting means comprising an electrostatic field and/or an electromagnetic field. Optionally, the apparatus may further comprise atomization apparatus and/or non-equilibrium heat transfer apparatus.

In another embodiment, the present invention describes spray forming methods comprising directing molten particles from dispensing means to collecting means by producing an electrostatic field and/or electromagnetic field between the dispensing means and the collecting means. Optionally, the apparatus may further comprise atomization apparatus and/or non-equilibrium heat transfer apparatus.

In another embodiment, the present invention is directed to apparatus comprising a melt chamber that comprises at least one orifice; a means for expelling a molten material through the at least one orifice in the melt chamber; and a means for applying a rapid electrostatic charge to the molten material. Preferably, the means for forcing the molten material through the at least one orifice in the melt chamber is a mechanical or electromechanical actuator or a pressure means. In a preferred embodiment, the apparatus further comprises a means for cooling the molten particle. Preferably, the means for cooling the molten particle comprises a means for generating a non-equilibrium plasma.

In another embodiment, the present invention describes methods for forming particles comprising producing a first molten particle; and applying a rapid electrostatic charge to the first molten particle, wherein the rapid electrostatic charge causes the first molten particle to form at least one smaller second particle. Preferably, the first molten particle is expelled through at least one orifice in the melt chamber via mechanical means or by a pressure means. In a preferred embodiment, the at least one smaller second molten particle is cooled, preferably by a non-equilibrium plasma.

In another embodiment, the present invention is directed to apparatus for transferring heat between a heat-transfer device and a workpiece comprising the heat-transfer device, wherein the heat-transfer device is electrically charged or held at a potential; the workpiece, wherein the workpiece is mechanically separate from the heat-transfer device; and means for transferring heat between the workpiece and the heat-transfer device comprising a means for generating a non-equilibrium plasma. The heat-transfer device can be either a heat sink or a heat source.

In yet another embodiment, the present invention is directed to methods of transferring heat between a heat-transfer device and a workpiece comprising producing a non-equilibrium plasma capable of transferring heat between the heat-transfer device and the workpiece, wherein the heat-transfer device is electrically charged or held at a potential, and wherein the heat-transfer device is mechanically separate from the workpiece. The heat-transfer device can be either a heat sink or a heat source.

Accordingly, in various embodiments, non-equilibrium plasmas are advantageously employed to effect optimal heat transfer, and the non-equilibrium plasma must act with a heat sink/source that has a thermal conductivity capable of removing the desired quantity of heat. While two or more electrodes have been used in the past to produce a plasma in a region of high heat, such as a weld zone, so that the plasma would serve to conduct heat outward from the weld zone, thereby increasing the surface area for heat, embodiments of the present invention are directed to the discovery that a non-equilibrium plasma may be used to introduce heat into a workpiece as well as from a workpiece. It has further been surprisingly discovered that under the correct conditions a non-equilibrium plasma can be used to efficiently transfer heat in a vacuum.

The novel methods of the present invention are particularly useful in preparing any metal article, such as articles for gas turbine engines, including, for example, airfoils, blades, discs and blisks.

Accordingly, in one aspect, there is provided according to the present invention an apparatus comprising: a dispensing means; a collecting means; and a means for directing a molten particle from the dispensing means to the collecting means comprising at least one of an electrostatic field or an electromagnetic field. In another aspect is provided the apparatus described above, wherein the means for directing the molten particles from the dispensing means to the collecting means comprises an electrostatic field or an electromagnetic field. The apparatus may further comprise at least one magnetic coil, and may also further comprise a means for charging the molten particles. In one embodiment, the means for charging the molten particles may comprise a thermionic emission source or a tribocharging device. The dispensing means of the apparatus may be a gas atomizer, and may further comprise a means for transferring heat from the molten particles. The means for transferring heat from the molten particles may comprise gas conduction and/or convection and/or a non-equilibrium plasma.

In another aspect, there is provided according to the present invention an apparatus comprising: a dispensing means; a collecting means; and a means for directing a molten particle from the dispensing means to the collecting means comprising at least one of an electrostatic field or an electromagnetic field, and further comprising a means for transferring heat from the collecting means. The means for transferring heat from the collecting means may comprise a means for generating a non-equilibrium plasma. In a particular aspect, the means for transferring heat from the molten particles comprises a first heat sink, wherein the first heat sink is electrically charged or held at a potential; and a means for transferring heat from the molten particles to the first heat sink comprising a means for generating a non-equilibrium plasma. The non-equilibrium plasma may be a glow discharge or a cold corona discharge.

In another aspect, there is provided according to the present invention an apparatus comprising: a dispensing means; a collecting means; and a means for directing a molten particle from the dispensing means to the collecting means comprising at least one of an electrostatic field or an electromagnetic field, and further comprising a means for expelling the molten particle through at least one orifice in the dispensing means; and a means for applying a rapid electrostatic charge to the molten material. The means for expelling the molten particle through the at least one orifice may comprise a mechanical or electromechanical actuator. In one aspect, the means for expelling the molten particle through the at least one orifice may be a pressure means that produces a pressure in the dispensing means that is greater than the pressure on the outside of the dispensing means. The pressure means may cause interrupted flow of the molten particle from the dispensing means. The rapid electrostatic charge may be an arc discharge or an electron beam.

In another aspect, the present invention provides for a spray forming method comprising directing molten particles from a dispensing means to a collecting means by producing at least one of an electrostatic field or an electromagnetic field between the dispensing means and the collecting means. The electromagnetic field may be produced by, for example, means comprising at least one magnetic coil. The method according to this aspect of the invention may further comprise charging the molten particles. Charging the molten particles may be accomplished, for example, using a thermionic emission source or a tribocharging device. In one aspect, the dispensing means may be a gas atomizer. According to this aspect of the invention, the method may further comprise transferring heat from the molten particle. Transferring heat from the molten particles may be accomplished, for example, by gas conduction and/or convection and/or non-equilibrium plasma. In another aspect, the method of the invention further comprises producing a second electromagnetic field. According to the invention, the method may further comprise transferring heat from the collecting means, which may be by a non-equilibrium plasma.

In another aspect, the present invention provides for a spray forming method comprising directing molten particles from a dispensing means to a collecting means by producing at least one of an electrostatic field or an electromagnetic field between the dispensing means and the collecting means, further comprising applying a rapid electrostatic charge to the molten particle, wherein the rapid electrostatic charge causes the molten particle to form at least one smaller molten particle. In a particular aspect, the rapid electrostatic charge may be an arc discharge or an electron beam. In another aspect, the method of the invention may further comprise transferring heat from the molten particle comprising producing a non-equilibrium plasma that transfers heat from the molten particle to a first heat sink, wherein the first heat sink is electrically charged or held at a potential. The non-equilibrium plasma may be a glow discharge or a cold corona discharge.

In another aspect, the invention is directed to an apparatus comprising a melt chamber comprising at least one orifice; a means for forcing a molten material through the at least one orifice in the melt chamber; and a means for applying a rapid electrostatic charge to the molten material. The rapid electrostatic charge may be an arc discharge or en electron beam. The apparatus of the invention may further comprise a means for cooling the molten material. In a particular aspect, the means for cooling the molten material may comprise a first heat sink, wherein the first heat sink is electrically charged or held at a potential; and a means for transferring heat from the molten material to the first heat sink comprising a means for generating a non-equilibrium plasma. The non-equilibrium plasma may be a glow discharge or a cold corona discharge.

In another aspect, there is provided a method for atomizing a particle comprising producing a first molten particle; applying a rapid electrostatic charge to the first molten particle, wherein the rapid electrostatic charge causes the first molten particle to form at least one smaller second molten particle. According to the method of the invention, the first molten particle may be produced by melting a material in a melt chamber, and expelling the first molten particle through at least one orifice in the melt chamber. The rapid electrostatic charge may be an arc discharge or en electron beam. The method of the invention may further comprise cooling the second molten particle by producing a non-equilibrium plasma that transfers heat from the second molten particle to a first heat sink, wherein the first heat sink is electrically charged or held at a potential. The non-equilibrium plasma may be a glow discharge or a cold corona discharge.

In another aspect, the invention provides for an apparatus for transferring heat between a first heat-transfer device and a workpiece comprising a first heat-transfer device, wherein the first heat-transfer device is electrically charged or held at a potential, and wherein the first heat-transfer device is a heat sink or a heat source; a workpiece, wherein the workpiece is mechanically separate from the first heat-transfer device; and means for transferring heat between the workpiece and the first heat-transfer device comprising a means for generating a non-equilibrium plasma. The non-equilibrium plasma may be a glow discharge or a cold corona discharge. The apparatus of the invention may further comprise an external means for generating or maintaining the non-equilibrium plasma. The external means for generating or maintaining the non-equilibrium plasma may be a thermionic emission, an RF electromagnetic radiation, an electromagnetic radiation, a magnetic field or an electron beam. The first heat-transfer device of the apparatus of the invention may comprise a plurality of heat-transfer devices. In a particular aspect, the apparatus of the invention may further comprise a second heat-transfer device that may be mechanically and electrically separate from the first heat-transfer device, wherein the second heat-transfer device is a heat sink or a heat source, and wherein the potential between the first heat-transfer device and the second heat-transfer device produces a non-equilibrium plasma.

In another aspect is provided a method for transferring heat between a first heat-transfer device and a workpiece comprising producing a non-equilibrium plasma that transfers heat between the first heat-transfer device and the workpiece, wherein the first heat-transfer device is electrically charged or held at a potential, wherein the first heat-transfer device is mechanically separate from the workpiece, and wherein the first heat-transfer device is a heat sink or a heat source. The non-equilibrium plasma may be a glow discharge or a cold corona discharge. The method may further comprise generating or maintaining the non-equilibrium plasma via an external means. In an aspect, the external means for generating or maintaining the non-equilibrium plasma comprises a thermionic emission, an RF electromagnetic radiation, an electromagnetic radiation, a magnetic field or an electron beam.

In another aspect, the invention provides for a preform produced by the methods of the invention. The preform of the invention may be a near net preform. There is also provided an article of manufacture produced by the method of the invention.

These and other aspects of the present invention will become more apparent from the following detailed description.

BRIEF DESCRIPTION OF THE DRAWINGS

FIG. 14 is a photograph showing primary, secondary and tertiary droplets produced from the experiment in Example 5. FIG. 14 is a photograph of the droplets schematically drawn in FIG. 12.

FIG. 15A is a schematic illustration of FIG. 15.

FIGS. 18, 19 and 20 show consecutive frames of the atomization of liquid metal in atmospheric pressure, where the gap between the blocks was 1.5 inches, and the voltage applied for the non-equilibrium plasmas was 51 keV, and Block A was in −ve potential.

FIGS. 63-64 are tables illustrating two sets of experimental data for liquid wood's metal atomization.

FIGS. 65-70 and FIGS. 74-76 are pictures illustrating a piece of CPVD pipe placed in such a way as to surround the extractor ring and its supporting arm.

DETAILED DESCRIPTION OF THE INVENTION

Figure 1:
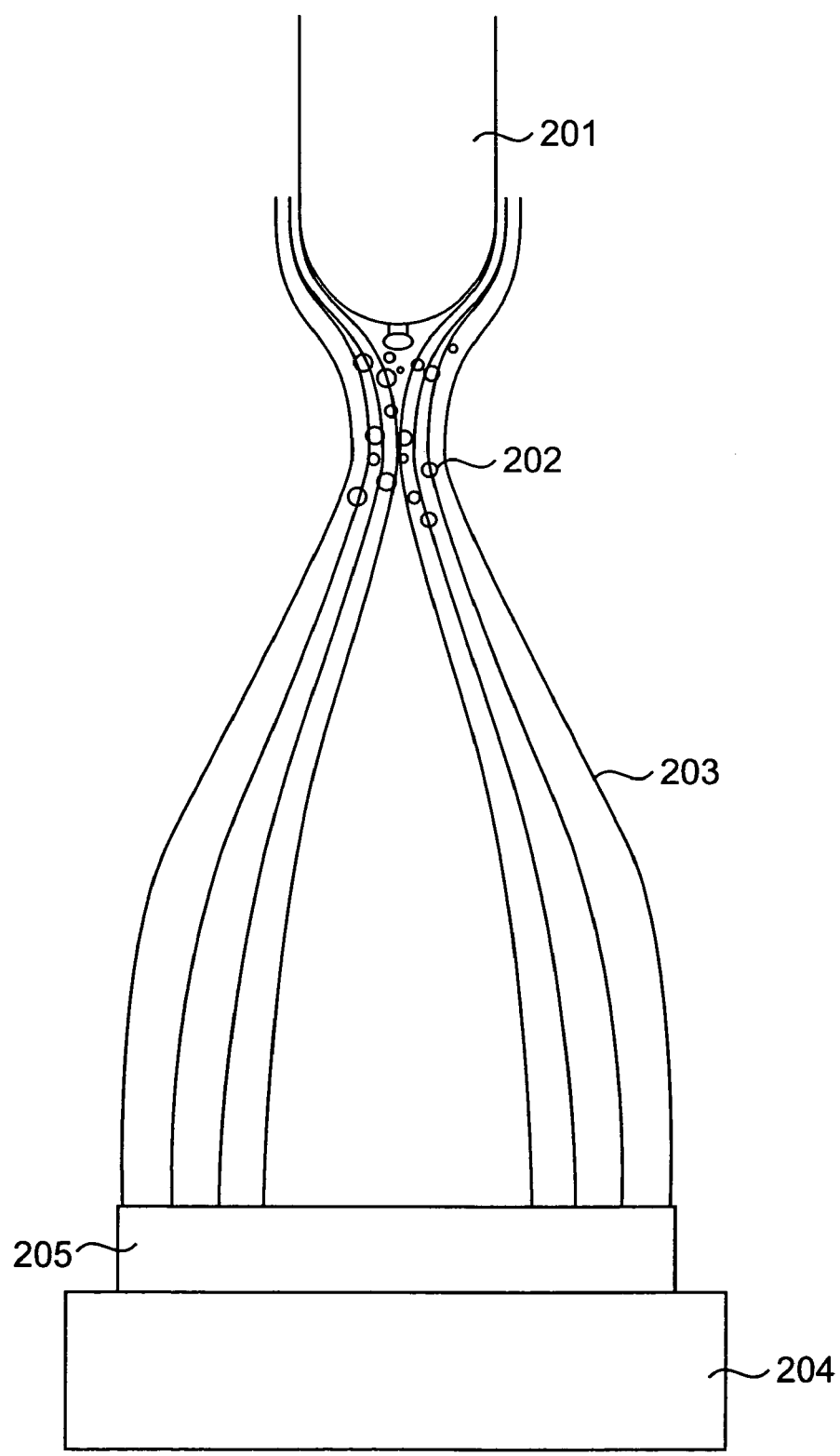
FIG. 1 is a view of an apparatus of the present invention wherein an electrostatic field directs and accelerates molten particles to a preform.

The present invention provides methods and apparatus for enhancing spray forming for the production of solid workpieces, known as preforms, and for powders. It has surprisingly been found that the amount or yield of powder collected during spray forming can be controlled to an unexpectedly high degree by using an electrostatic and/or electromagnetic field to direct the trajectory of particles in the spray forming process. Additionally, the speed and/or direction of the particles can be controlled to produce a solid workpiece using an electrostatic and/or electromagnetic field. Using an electrostatic and/or electromagnetic field, the particles can be directed to various areas of the preform at various times during the spray forming process to produce shapes. Using an electrostatic and/or electromagnetic field, particle size and trajectory can be controlled to avoid particle collisions, and the resulting growth in particle size that occurs when particles collide, or to cause particle collisions if larger particle size is desired for any purpose. Using an electrostatic and/or electromagnetic field, the particles can be directed to areas where heat can be added or removed from the particles to control the macrostructure of the preform or powder being produced. The shape of the electrostatic and/or electromagnetic field can also be manipulated to produce near net shapes by directing where particles build up to form the preform at various times during the process. Spray forming using an electrostatic field and/or an electromagnetic field can enhance the yield of the process as well as improve (and control) the density of the resulting preform.

The present invention describes methods and apparatus using electrostatic fields and/or electromagnetic fields for selectively controlling the yield, quality or density of solid workpieces (preforms) and powders produced by spray forming. Surprisingly, the methods and apparatus of the present invention have been unexpectedly found to provide enhanced yields of 95-99%, and unexpectedly provide workpieces that have a density that is 11-14% greater than the density of conventionally-formed workpieces.

Preferably, the methods and apparatus of the present invention comprise a source of molten particles; a means for collecting the molten particles; and a means for directing the molten particles from the source of molten particles to the means for collecting the molten particles.

The molten particles can be metallic or non-metallic. The term "metallic" includes metals and alloys, including, for example, iron, cobalt, nickel, aluminum, hafnium, zinc, titanium, niobium, zirconium, tin, copper, tungsten, molybdenum, tantalum, magnesium, stainless steels, bronze, brass, lithium alloys and nickel/cobalt based superalloys.

The source of molten particles may also be referred to herein as a "dispensing means." The dispensing means can be any known in the art including, for example, a container, an atomizer, a grinder, or other means of producing and/or dispensing the molten particles. The dispensing means is generally electrically insulated. Preferably, the dispensing means is a gas atomizing means. Any gas atomizing means known in the art may be used as the dispensing means in the present invention.

The acceleration, speed and/or direction of the molten particles can be manipulated and controlled by an electrostatic field and/or an electromagnetic field. The term "electrostatic field" can refer to a single electrostatic field or a plurality of electrostatic fields. The term "electromagnetic field" can refer to a single electromagnetic field or a plurality of electromagnetic fields.

The means for collecting the molten particles may be referred to herein as a "collecting means." Generally, the collecting means is electrically insulated. For spray forming powders, the collecting means can be a hopper or other container. The container may comprise a lid and a mechanism for closing the lid. The collecting means may have a geometric shape, including, for example, a near net shape. Preferably, the distance between the dispensing means and the collecting means is from about 10 cm to about 250 cm, more preferably, from about 20 cm to about 100 cm, and even more preferably, from about 25 cm to about 75 cm.

The invention may further comprise means for charging the molten particles before and/or after they leave the dispensing means. The means for charging the molten particles may comprise, for example, a thermionic emission source, a tribocharging device, or the like.

In one embodiment, an electrostatic field is produced between the dispensing means and the collecting means by connecting the collecting means to the positive or negative polarity of a high voltage DC power supply and by grounding the dispensing means. Preferably a positive polarity is used. Generally, the high voltage DC power supply is between about 4 kV and about 250 kV; more preferably, between about 8 kV and about 125 kV; and even more preferably between about 12 kV and about 100 kV. The molten particles may be induction charged by the electric field. The induction charge causes the molten particles to move along the electrostatic field lines, thereby controlling the speed and direction of the molten particles and directing the molten particles from the dispensing means to the collecting means.

In another embodiment, an electrostatic field is produced between the dispensing means and the collecting means by connecting the dispensing means to the positive or negative polarity of a high voltage DC power supply and by grounding the collecting means. Preferably, a positive polarity is used. By connecting the dispensing means to the positive or negative polarity of a high voltage DC power supply, the molten particles become electrically charged. The electrostatic field causes the electrically charged molten particles to move along the electrostatic field lines, thereby controlling the speed and direction of the molten particles and directing the molten particles from the dispensing means to the collecting means.

The apparatus can further comprise a high voltage DC power supply and one or more electrodes that are placed between the dispensing means and the collecting means to shape the electrostatic field between the dispensing means and the collecting means. The electrostatic field then directs the molten particles to the collecting means.

The apparatus can also comprise a plurality of high voltage DC power supplies each attached to one or more electrodes that are placed between the dispensing means and the collecting means that change the shape of the electrostatic field between the dispensing means and the collecting means in a time dependant manner to direct the molten particles to specific areas or points on the collecting means. This embodiment can produce near net shapes.

In another embodiment, an electromagnetic field is produced between the dispensing means and the collecting means by placing a magnetic coil between the dispensing means and the collecting means. The magnetic coil is connected to a power supply. The molten particles leaving the dispensing means are directed by the electromagnetic field to the collecting means. Preferably, the magnetic coil is capable of moving so that it can direct the molten particles to specific areas or points on the collecting means. The molten particles can be directed to produce, for example, near net shapes.

In another embodiment, a plurality of magnetic coils can be placed between the dispensing means and the collecting means. The electromagnetic fields that are produced by the plurality of magnetic coils, which are singly or multiply energized to different magnetic field intensities, direct the molten particles to specific areas or points on the collecting means. The molten particles can be directed to produce, for example, near net shapes.

The embodiments of the invention presented in the following figures are for purposes of illustration only, and are not intended to limit the scope of the invention or the appended claims.

In FIG. 1, a dispensing means 201 produces molten particles 202, and an electrostatic field 203 is produced between the dispensing means 201 and the collecting means 204. The electrostatic field 203 charges the molten particles 202, which then causes the molten particles 202 to accelerate toward the collecting means 204. The acceleration causes the solid workpiece (preform) 205 to build up on the collecting means 204 with a minimum of over-spray and bounce-off, thereby enhancing the yield of the process. The process can also enhance the density of the resulting solid workpiece (preform) 205. As shown in FIG. 1, the electric field is preferably intensified in the area where the molten particles 202 leave the dispensing means 201. The inventors have unexpectedly discovered that the electrostatic field is most intense and compressed at the point just after the molten droplet leaves the nozzle. Surprisingly, pulling a droplet apart works for water, but does not work for liquid metal. To atomize a liquid metal, the inventors have discovered compressing the liquid or molten metal droplets.

Figure 2:
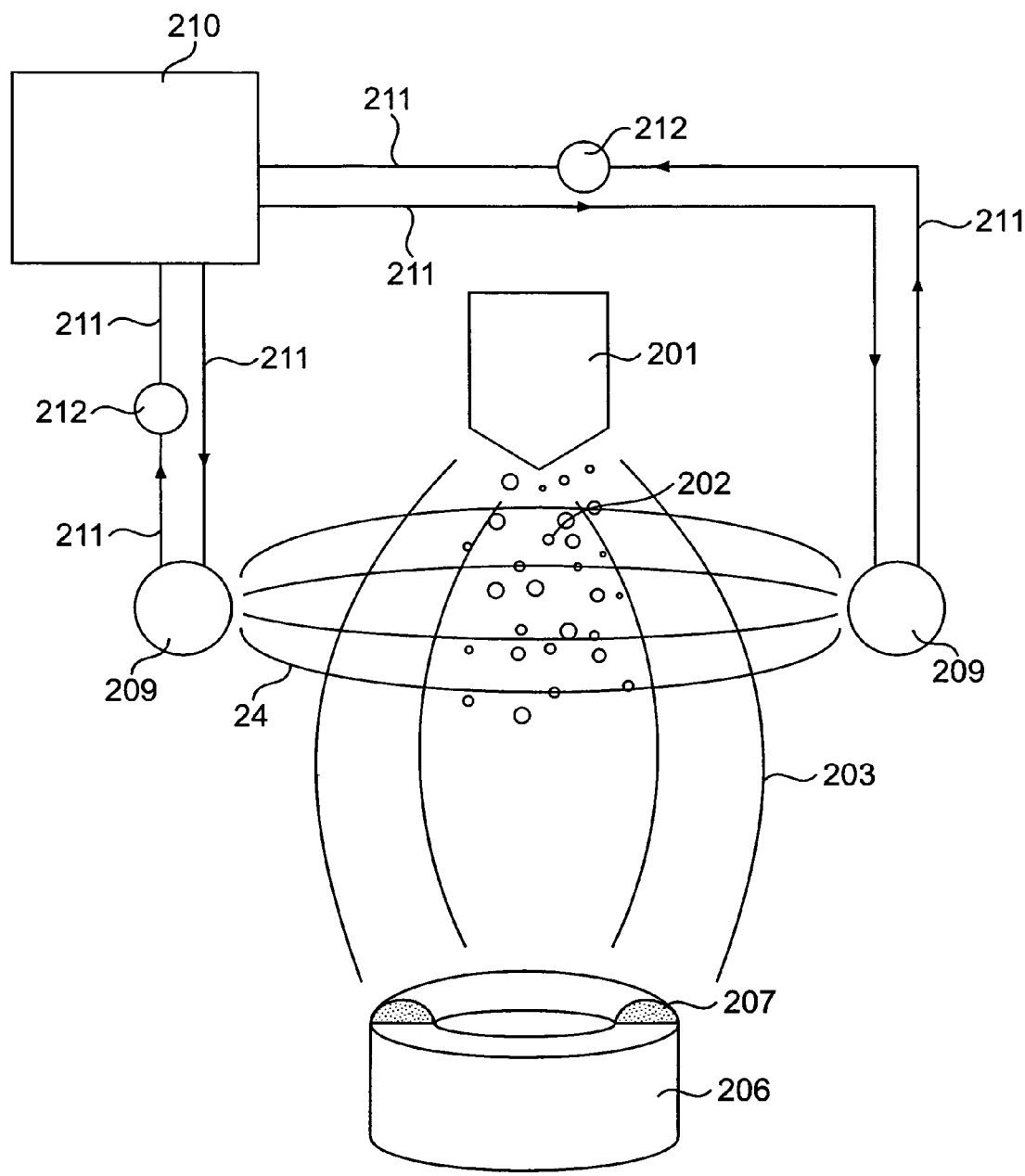
FIG. 2 is a view of an apparatus of the present invention wherein an electrostatic field directs and accelerates particles to produce a near net shape preform, and a non-equilibrium plasma controls the temperature of the molten particles.

In FIG. 2, a dispensing means 201 produces charged molten particles 202, and an electrostatic field 203 is produced between the dispensing means 201 and the shaped collecting means 206 to accelerate the charged molten particles 202 toward the shaped collecting means 206. The acceleration and directional control of the charged molten particles 202 enhances the density of the solid workpiece, and produces a near net shape solid workpiece 207. Optionally, a non-equilibrium plasma 24 is created in the path of the molten particles 202 between two heat sink electrodes 209 which are connected to an outside thermal mass 210 by a dielectric liquid which flows through pipes 211 by the motive force provided by pumps 212. The arrangement between the heat sink electrodes 209 and the outside thermal mass 210 allows heat to be removed from the molten particles 202. The non-equilibrium plasma 24 between the heat sinks 209 is produced, for example, by means of an AC glow discharge or a corona discharge. The non-equilibrium plasma 24 transfers heat from the molten particles 202 to the two heat sink electrodes 209 which transfer the heat to the outside thermal mass 210.

Figure 3:
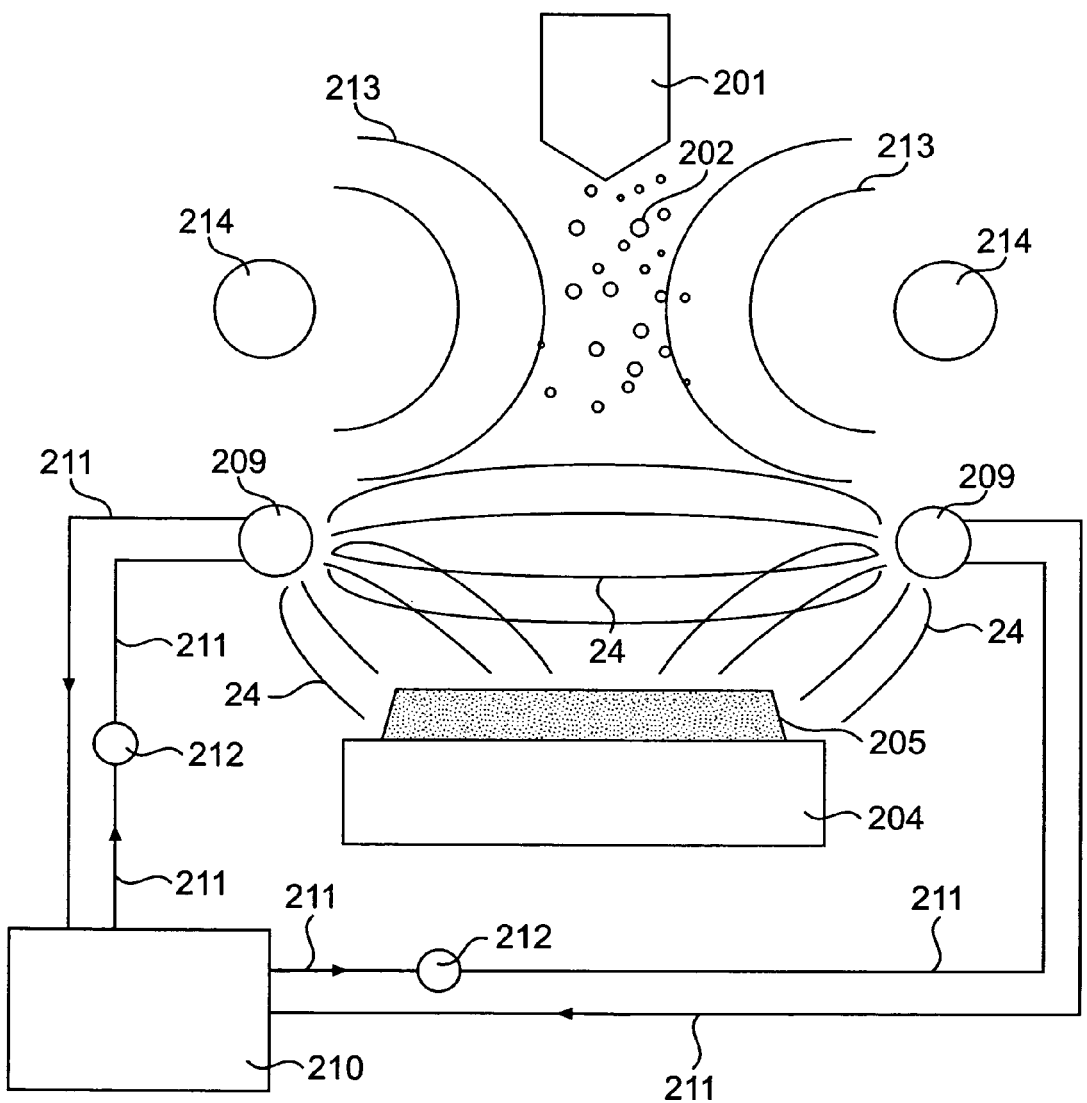
FIG. 3 is a view of an apparatus of the present invention wherein an electromagnetic field directs and accelerates molten particles to a preform, a first non-equilibrium plasma controls the temperature of the molten particles, and a second non-equilibrium plasma controls the temperature of the preform.

In FIG. 3, a dispensing means 201 produces charged molten particles 202, and an electromagnetic field 213 is produced by a magnetic coil 214 which directs the molten particles 202 towards the collecting means 204. This directional control of the molten particles 202 can reduce overspray, thereby enhancing the yield of the spray forming process. The invention can also enhance the density of the solid workpiece 205. Optionally, a non-equilibrium plasma 24 is created in the path of the molten particles 202 between two heat sink electrodes 209 which are connected to an outside thermal mass 210 by a dielectric liquid that flows through pipes 211 by the motive force provided by pumps 212. The arrangement between the heat sink electrodes 209 and the outside thermal mass 210 allows heat to be removed from the molten particles 202. The non-equilibrium plasma 24 between the heat sink electrodes 209 is produced, for example, by means of an AC glow discharge or a corona discharge. The non-equilibrium plasma 24 transfers heat to the outside thermal mass 210. The non-equilibrium plasma 24 extends from the heat sink electrodes 209 into the path of the molten particles 202 and to the electrically grounded solid workpiece 205 and the collecting means 204. In this embodiment heat is transferred from the molten particles 202, the solid workpiece 205 and the collecting means 204 by the non-equilibrium plasma 24 which allows heat to be transferred to the heat sink electrodes 209 which transfer the heat to the outside thermal mass 210.

Figure 4:
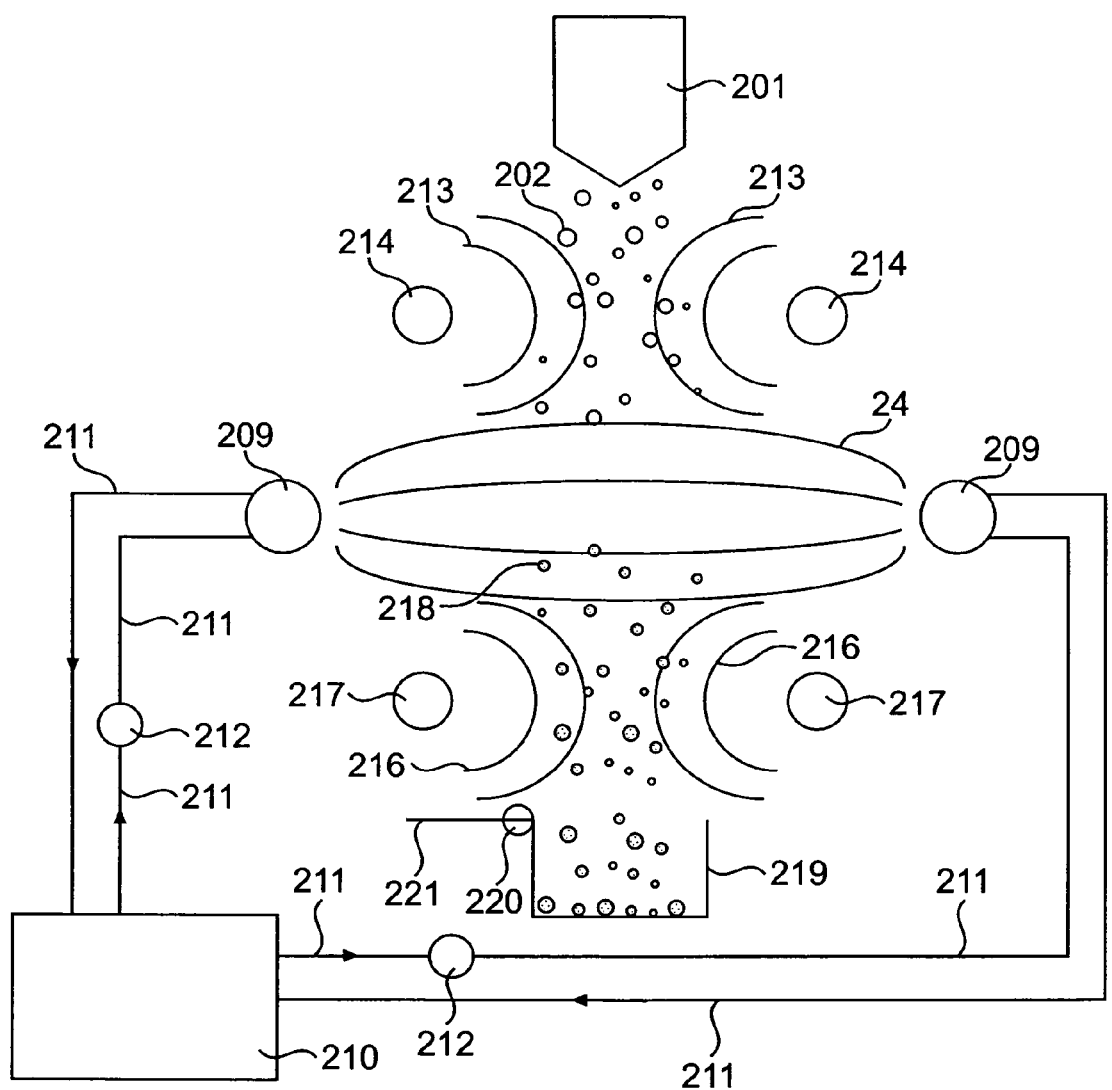
FIG. 4 is a view of an apparatus of the present invention wherein an electromagnetic field directs and accelerates molten particles to control particle collisions and resultant particle growth, and a non-equilibrium plasma cools the molten particles to form a powder.

In FIG. 4, a dispensing means 201 produces charged molten particles 202, and an electromagnetic field 213 produced by a magnetic coil 214 directs the molten particles 202 to spread out, thereby reducing the probability of their collision, and hence the formation of larger molten particles and larger powder particles. Optionally, a non-equilibrium plasma 24 is created in the path of the molten particles 202 between two heat sink electrodes 209 that are connected to the outside thermal mass 210 by a dielectric fluid which flows through pipes 211 by the motive force provided by pumps 212. The arrangement between the heat sink electrodes 209 and the outside thermal mass 210 allows heat to be removed from the molten particles 202. A second electromagnetic field 216 produced by a magnetic coil 217 directs the cooled powder 218 to facilitate collection in the container 219 which is automatically closed by a mechanism 220 that attaches a lid 221 The entire powder manufacturing process can be carried out in a full or partial vacuum to reduce or eliminate contamination of the powder by chemical interaction with gases.

The present invention may also optionally comprise a heat sink placed between the dispensing means and the collecting means; a means for transferring heat from the molten particles to the heat sink to control the temperature of the molten particles once they have been ejected from the dispensing means; and a means for removing heat from the collecting means. The apparatus can comprise a means for transferring heat from the molten particles to the heat sink to control the temperature of the molten particles once they have been ejected from the dispensing means. The means for transferring heat can be gas conduction and/or convection. In addition to or in place of gas conduction and/or convection, another means for transferring heat can be a non-equilibrium plasma.

The present invention also provides non-equilibrium plasmas for transferring heat between a heat-transfer device and a workpiece. In preferred embodiments, the non-equilibrium plasma is used for removing heat from molten particles after they are dispensed and/or electrostatically atomized, but before they are collected either as a solid workpiece or as a powder.

A class of plasmas known as non-equilibrium (NE) plasmas is produced when the temperature of the electrons in the gas exceeds the temperature of the neutral particles and large ions in the gas by at least 100%. Since the thermal conductivity of non-equilibrium plasmas depends on the electron temperature, the non-equilibrium plasmas will exhibit a high thermal conductivity. Since the temperature of neutral particles and large ions, which account for more than 99.9% of the mass present, is low, the overall heat content of the non-equilibrium plasma is low. Non-equilibrium plasmas used for heat transfer can be generated under very high and very low pressure conditions using gases which are inert or benign to the material(s) (e.g., the molten particles of the present invention) involved in the heat transfer. Thus, non-equilibrium plasmas can be used to add or remove heat from a workpiece without the undesirable mechanical, thermal, or chemical effects associated with plasmas in local thermal equilibrium.

The present invention also describes methods and apparatus for heat transfer between a heat-transfer device and a workpiece (e.g., molten particles and preforms) using non-equilibrium plasmas. Non-equilibrium plasmas eliminate the need for mechanical contact between the workpiece and the heat-transfer device. There are many applications in which mechanical contact between the heat sink and the workpiece is not physically possible without undesirable damage to or chemical contamination of the workpiece, including, for example, spray forming, casting and other processes which use molten or non-solid substrate states.

In a preferred embodiment of the present invention, heat transfer is accomplished using non-equilibrium plasmas wherein the neutral and heavy ions have a temperature less than about 1000 K, preferably less than about 800 K, and more preferably less than about 600 K. Since non-equilibrium plasmas are produced when the temperature of the electrons exceeds the temperature of the neutral particles and large ions by at least 100%, the electrons preferably have a corresponding temperature of at least about 100 K, more preferably in excess of about 2000 K.

"Heat-transfer device," as used herein, refers to a heat sink or a heat source. "Heat source" refers to the object that is becoming colder, i.e., supplying the heat. "Heat sink" refers to the object that is becoming warmer, i.e., accepting the heat. It will be appreciated that the same object can function as a heat source and as a heat sink, depending upon the temperature variation in the other object, e.g., the workpiece, during the spray forming process. Accordingly, by means of the invention it is possible to closely control the cooling (and heating) rate of the workpiece as a whole, as well as individual parts or sub-parts of the workpiece, and thereby to control those properties of the workpiece or parts thereof which are known to be affected by cooling or heating rate.

In the present invention, the heat-transfer device or heat-transfer device electrode can be electrically charged or held at a potential. "Heat sink electrode" refers to the electrical potential source and the heat sink when they are integrated into a single object. "Heat source electrode" refers to the electrical potential source and the heat source when they are integrated into a single object. "Heat-transfer device electrode" is used to refer to either a "heat sink electrode" or a "heat source electrode." "Being held at a potential" refers to a DC offset voltage upon which an AC waveform may be superimposed.

The distance between the heat-transfer device or heat-transfer device electrode and the workpiece and the voltage applied to the heat-transfer device or heat-transfer device electrode and/or the workpiece is selected to create a non-equilibrium plasma between the workpiece and the heat-transfer device or heat-transfer device electrode to provide heat transfer. The non-equilibrium plasma is in contact with the heat-transfer device or heat-transfer device electrode and the workpiece, while the workpiece is not in mechanical contact with the heat-transfer device or heat-transfer device electrode. The heat-transfer device or heat-transfer device electrode and the workpiece may be electrically connected, preferably through wires and a high voltage power supply.

Preferably, the heat-transfer device and the electrode producing the non-equilibrium plasma are a single element, e.g., "a heat-transfer device electrode." An alternative embodiment uses a charged electrode to produce the non-equilibrium plasma and a mechanically separate heat-transfer device, which is grounded or charged to about half the opposite potential of the electrode producing the non-equilibrium plasma. For example, the electrode may have a voltage of about 25,000 to about 150,000 volts to produce the non-equilibrium plasma, while the heat-transfer device has a voltage about half the voltage of the electrode, such as from greater than about 0 to less than about 75,000 volts. It will be appreciated in this regard that the minimum generally desirable voltage of the heat transfer device will be that voltage which is required to be applied to effect in the workpiece the desired temperature, and so may approach 0, while the maximum generally desirable voltage will be about one-half that of the electrode. Preferably, the electrode and the heat-transfer device are not electrically connected.

Generally, the workpiece is electrically grounded or held at a potential opposite to the potential of the heat-transfer device or heat-transfer device electrode by a high voltage power supply. An object held at the opposite potential is one with a positive DC voltage applied to it when the other electrode is negative or vice versa. Opposite potentials are used to create the field strength required to produce a plasma. The distance between the workpiece and the heat-transfer device or heat-transfer device electrode is from about 10 cm to about 250 cm, more preferably, from about 20 cm to about 100 cm, and even more preferably, from about 25 cm to about 75 cm. Generally, the electrical potential or voltage between the workpiece and the heat-transfer device or heat-transfer device electrode is from about 25,000 to about 150,000 volts DC, or from about 25,000 to about 150,000 volts AC.

The electrical potential applied between the workpiece and the heat-transfer device or heat-transfer device electrode produces a non-equilibrium plasma having a desired thermal conductivity. The non-equilibrium plasma is preferably a glow discharge or a cold corona discharge. Alternatively, radio frequency signals, microwave signals or radiation can be used to produce the non-equilibrium plasmas. The thermal conductivity of the non-equilibrium plasma is generally about 2-10 times greater than the thermal conductivity of helium, preferably, about 5-10 times greater, and more preferably, about 8-10 times greater, and may exceed 10 times greater.

The workpiece can be any workpiece known in the art, including metals and non-metals. As used herein, "workpiece" refers to and includes a single workpiece or a plurality of workpieces. Nonlimiting examples of workpieces according to the invention include powders and/or preforms produced by spray forming. The workpiece can be a plurality of workpieces having an average diameter of about 0.1 to about 10 cm. The workpiece can be a material or a section or portion of a material that requires a high rate of cooling to control solidification, thereby controlling grain structure and other metallurgical properties, such as, but not limited to, articles for gas turbine engines, including, for example, airfoils, blades, discs and blisks. Preferably, the workpiece is a molten particle or preform, as described herein.

The workpiece can be stationary or can move or pass through the non-equilibrium plasma. A dispensing means, as described herein, can be used to move or pass the workpiece through the non-equilibrium plasma. After the workpiece moves or passes through the non-equilibrium plasma, it can be captured or accumulated in any collecting means known in the art, as described herein.

The heat-transfer device or heat-transfer device electrode is connected to a thermal mass which allows heat to be added or removed from the workpiece by the non-equilibrium plasma. Heat can be transferred from the heat-transfer device to the thermal mass by any method known in the art. Preferably, the thermal mass will be a large thermal mass. A large thermal mass is one which can accept or donate a significant amount of thermal energy with only a small change in temperature. Heat can be transferred from the heat-transfer device to the large thermal mass by heat transfer means including, for example, a dielectric fluid, a heat pipe, a thermally conductive metal, a thermally conductive ceramic and the like. Dielectric fluids include, for example, silicon, mineral oil and the like. Conductive metals include, for example, copper, aluminum, brass, silver, gold and the like. Conductive ceramics include, for example, mullites, steatites and other ceramic forms. For example, a dielectric liquid can be circulated through the heat-transfer device or heat-transfer device electrode through pipes by a pump that is used to move heat between the heat-transfer device or heat-transfer device electrode and the large thermal mass to keep the temperature of the heat-transfer device or heat-transfer device electrode constant during the heat transfer process. In another embodiment, the heat-transfer device or heat-transfer device electrode can comprise a heat pipe to transfer heat between the heat-transfer device or heat-transfer device electrode and the large thermal mass to keep the temperature of the heat-transfer device or heat-transfer device electrode constant during the heat transfer process.

As used herein, the term "heat-transfer device" or "heat-transfer device electrode" can include a single heat-transfer device or heat-transfer device electrode or a plurality of heat-transfer devices or heat-transfer device electrodes that may or may not be mechanically and/or electrically separate. For example, a plurality of heat-transfer devices can be used, wherein each individual heat-transfer device is electrically connected to a high voltage power supply, such that the potential between the plurality of heat-transfer devices produces a non-equilibrium plasma. The electrode, in conjunction with the voltage applied by the power supply and the field gradient within the geometry, produces the non-equilibrium plasma. When a plurality of heat-transfer devices is used, the distance between the individual heat-transfer devices can be any desired distance, such as about 1 to about 2,500 mm, preferably about 1 to about 1,500 mm, and the voltage between the individual heat-transfer devices can be any desired voltage, such as about 25,000 to about 150,000 volts DC or about 25,000 to about 150,000 volts AC.

When a plurality of heat-transfer devices is used, some of the heat-transfer devices can produce a potential equal to about half the potential that is being used to produce the non-equilibrium plasma, but having the opposite polarity. For example, if two heat-transfer devices are used, the voltage applied to the first heat-transfer device producing the non-equilibrium plasma can be AC, and the second heat-transfer device can be connected to a separate high voltage power supply that produces a potential equal to about half the potential that is being used by the first heat-transfer device to produce the non-equilibrium plasma, but having a negative or positive polarity. In another embodiment, if two heat-transfer devices are used, the voltage applied to the first heat-transfer device producing the non-equilibrium plasma can be AC, and the second heat-transfer device can be connected to a separate high voltage power supply to produce a potential equal to about half the AC potential being used by the first heat-transfer device to produce the non-equilibrium plasma, but having a positive or negative DC polarity. In still other embodiments, when two heat-transfer devices are used, the voltage applied to the first heat-transfer device producing the non-equilibrium plasma can be AC, and the second heat-transfer device can be connected to a separate high voltage power supply producing an AC potential equal to about half the potential that is being used by the first heat-transfer device to produce the non-equilibrium plasma, but being out of phase with the potential of the first heat-transfer device that is producing the non-equilibrium plasmas. Thus, for example, the phase difference between the AC potential in the first heat-transfer device and the AC potential in the second heat-transfer device can be adjusted between about 1 degree and about 180 degrees, and is preferably about 180 degrees. In these embodiments, the voltages are preferably between about 5 kV and about 75 kV, more preferably between about 10 kV and about 50 kV, most preferably between about 15 kV and about 25 kV. Although two heat-transfer devices have been exemplified, it will be appreciated by one skilled in the art that these principles may readily be applied to more than two heat-transfer devices in view of the teachings herein.

In some cases, a chamber can be used to enclose or contain the workpiece, the dispensing means, the collecting means, the means for directing the molten particle, the heat-transfer device and the electrode or the heat-transfer device electrode, and the non-equilibrium plasma. Such a chamber can be used to regulate the gas species present and/or the pressure. For example, the chamber may be evacuated and completely or partially filled with an inert gas (e.g., argon or nitrogen), or vice versa, to achieve the desired final metallurgy, to control the oxidation of other non-metal materials being processed, and/or to prevent undesired chemical reactions during the processing of materials, such as oxidation and nitridation. In a preferred embodiment, the pressure in such an enclosed chamber is less than atmospheric pressure, preferably from about 0.1 to about 0.0001 torr, more preferably from about 0.01 to about 0.001 torr.

In some cases, the voltage between the heat-transfer device electrode and the workpiece may not be sufficient to initiate and/or maintain the non-equilibrium plasma. In such cases, an external means for generating and/or maintaining the non-equilibrium plasma can be used. Alternatively, an external means for generating and/or maintaining the non-equilibrium plasma can be used instead of using the electrodes and/or heat-transfer device electrodes. The external means can maintain and/or elevate the temperature difference between the electrons and the neutral and heavy ions in the non-equilibrium plasma by supplying energy to the electrons. The external means can be any known in the art, including, for example, electron beams, thermionic emissions, RF electromagnetic radiation, electromagnetic radiation in the range of frequencies from soft ultraviolet to hard x-rays, or magnetic fields.

The embodiments of the invention in FIGS. 6-9 are for purposes of illustration only, and are not intended to limit the scope of the invention or claims. Although FIGS. 6-9 refer to a heat sink, one skilled in the art will appreciate from the teachings herein that the heat sink can be replaced with a heat source. In FIGS. 6-9, the workpiece 101 is preferably a molten particle or preform, as described herein.

Figure 6:
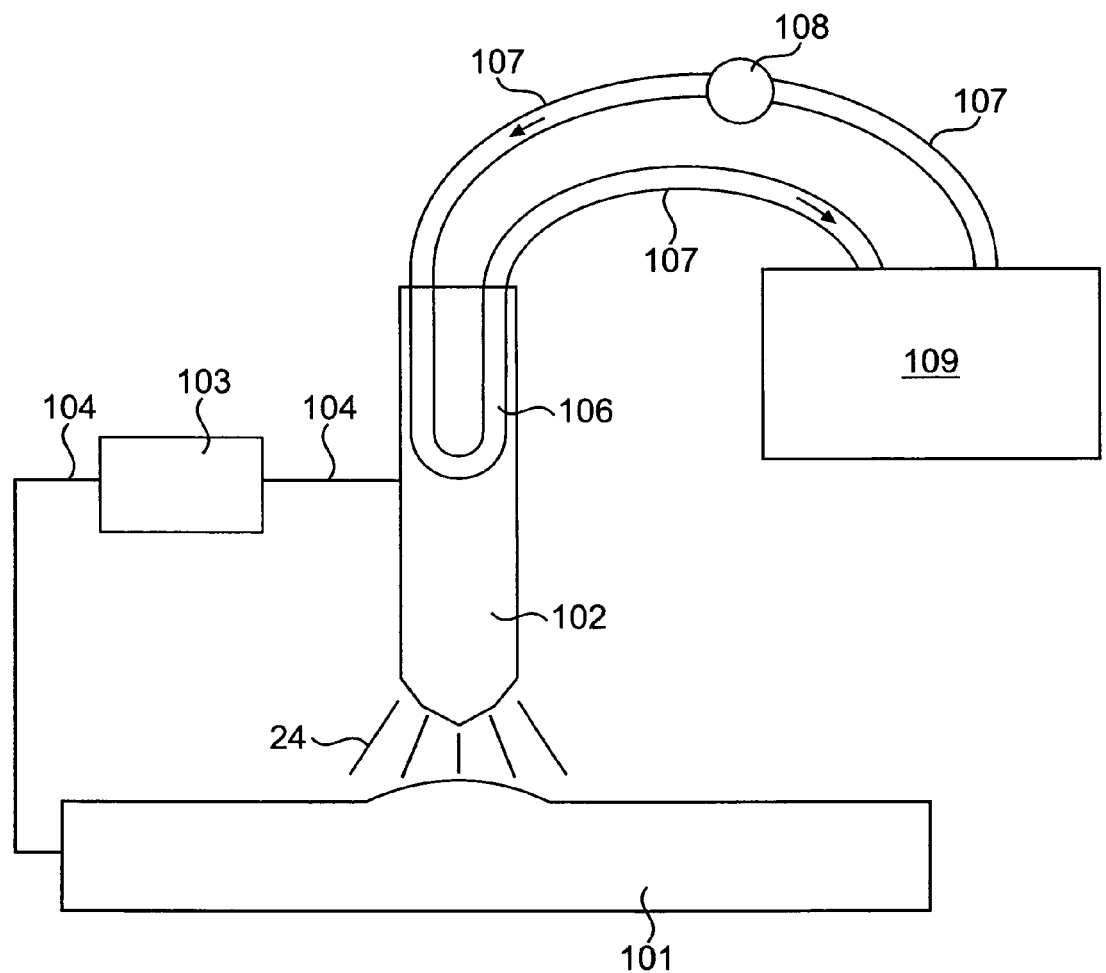
FIG. 6 is a view of a non-equilibrium plasma heat transfer apparatus wherein the heat-transfer device and the electrode producing the non-equilibrium plasma are a single element and a dielectric fluid is used to transfer heat from the heat-transfer device to a large thermal mass.

In FIG. 6, the workpiece 101 is electrically grounded or held at a potential opposite to the potential of the heat sink or heat sink electrode 102 by a high voltage power supply 103 connected by wires 104. An electrical potential is applied between the workpiece 101 and the heat sink or heat sink electrode 102 to produce a non-equilibrium plasma 24 having a desired thermal conductivity. In a preferred embodiment, a dielectric liquid 106 is circulated through the heat sink or heat sink electrode 102 through pipes 107 by a pump 108 that moves heat between the heat sink or heat sink electrode 102 and a large thermal mass 109 to keep the temperature of the heat sink or heat sink electrode 102 constant during the heat transfer process.

Figure 7:
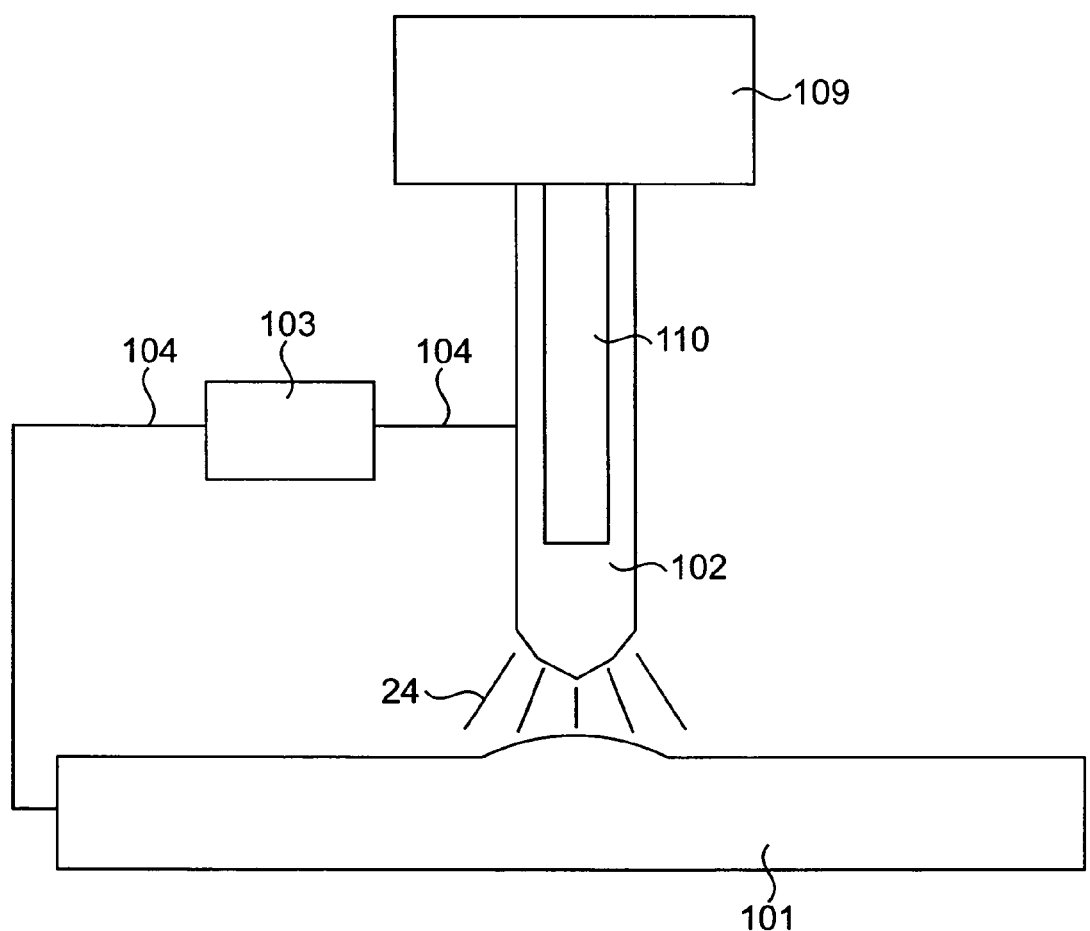
FIG. 7 is a view of a non-equilibrium plasma heat transfer apparatus wherein the heat-transfer device and the electrode producing the non-equilibrium plasma are a single element and the heat-transfer device is coupled to a large thermal mass via a heat pipe.

In FIG. 7, the workpiece 101 is electrically grounded or held at a potential opposite to the potential of the heat sink or heat sink electrode 102 by a high voltage power supply 103 connected by wires 104. An electrical potential is applied between the workpiece 101 and the heat sink or heat sink electrode 102 to produce a non-equilibrium plasma 24 having the desired thermal conductivity. In a preferred embodiment, the heat sink electrode 102 comprises a heat pipe 110 which transfers heat between the heat source or sink electrode 102 and a large thermal mass 109 to keep the temperature of the heat sink or heat sink electrode 102 constant during the heat transfer process.

Figure 8:
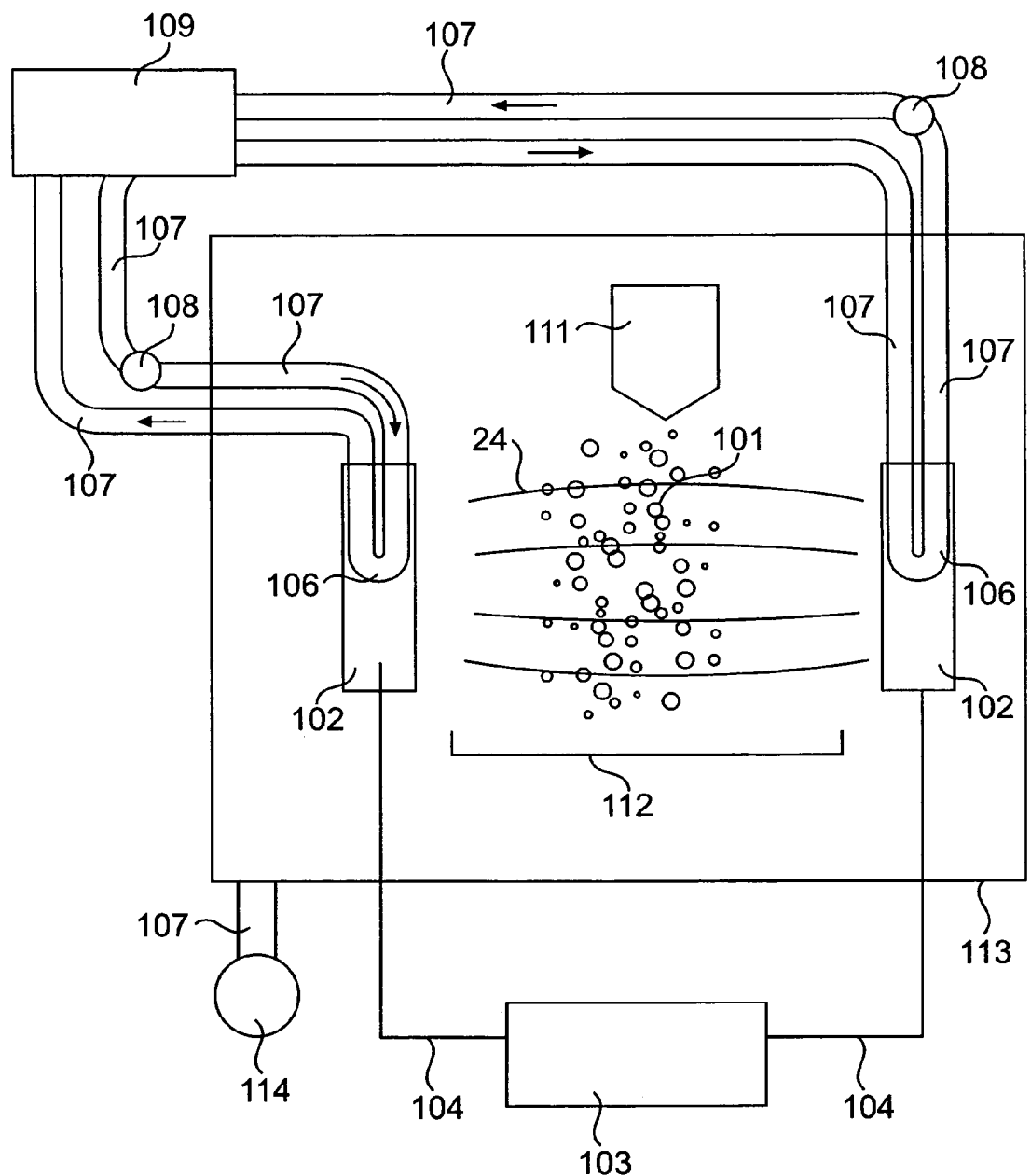
FIG. 8 is a view of a non-equilibrium plasma heat transfer apparatus that can be used to cool powders or small workpieces (e.g., molten particles or preforms) in a vacuum.

In FIG. 8, an AC electrical potential is applied between a first and second heat sink or heat sink electrode 102 by a high voltage power supply 103 connected by wires 104 to produce a non-equilibrium plasma 24 through which the workpieces 101 are passed. The source of the workpieces 101 is the dispensing means 111 which may comprise a container, atomizer, grinder or other means of producing or dispensing the workpieces 101. A means for collecting the heated or cooled workpieces 101 is provided by the hopper 112. The dispensing means 111 is contained within a chamber 113 and a vacuum pump 114 connected to the chamber 113 by a pipe 107 which serves to reduce the pressure within the chamber 113. This pressure reduction within the chamber 113 is often desirable to reduce or eliminate contamination by unwanted gasses and also serves to reduce the voltages required to produce the non-equilibrium plasma 24. In this embodiment, a dielectric liquid 106 is circulated through the heat sink or heat sink electrode 102 and through pipes 107 by pumps 108 that move heat between the heat sink or heat sink electrode 102 and a large thermal mass 109 to keep the temperature of the heat sinks or heat sink electrodes 102 constant during the heat transfer process. In this embodiment, a plurality of electrically charged heat sinks or heat sink electrodes may also be used and they may be oriented perpendicular to the direction of movement of the workpiece.

Figure 9:
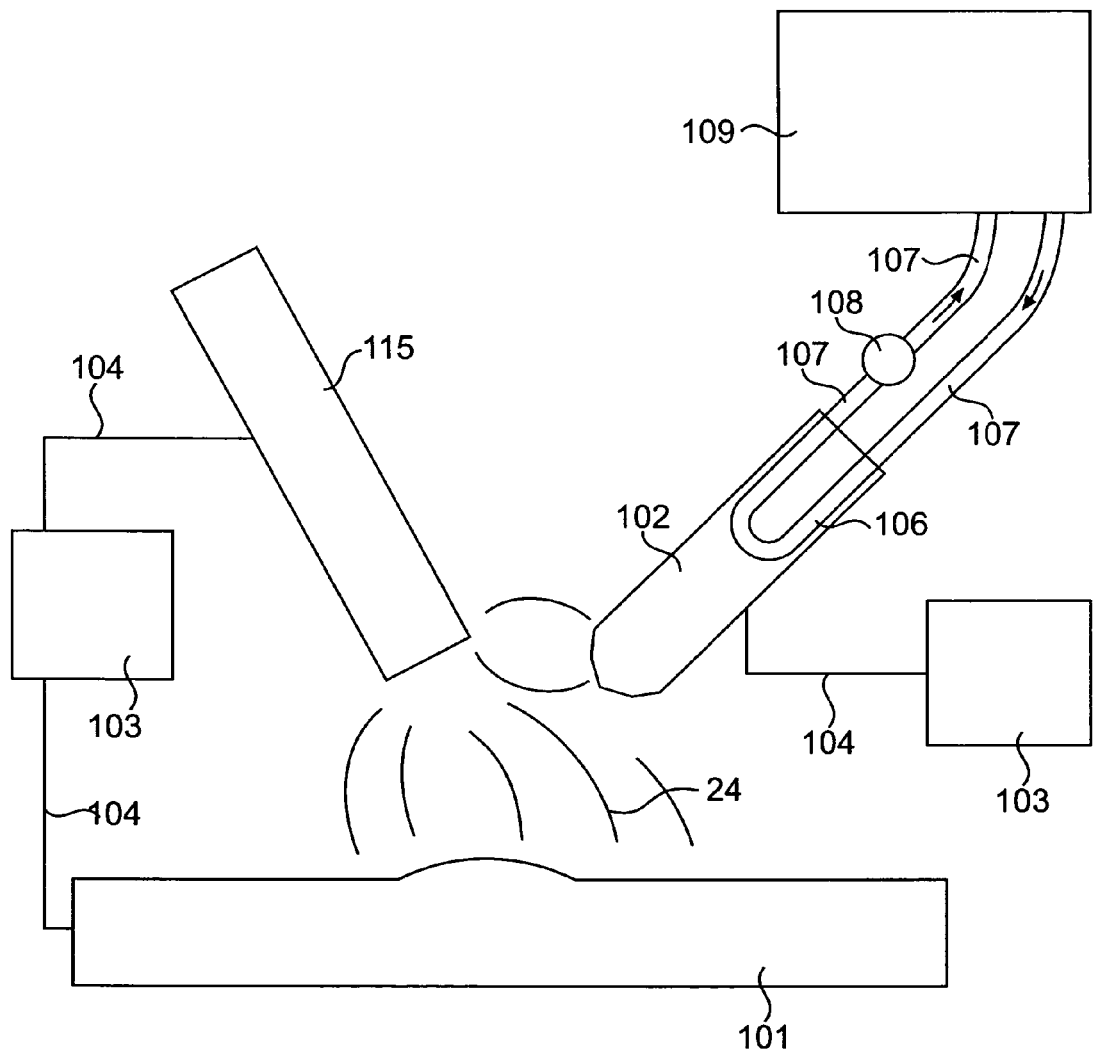
FIG. 9 is a view of a non-equilibrium plasma heat transfer apparatus wherein the heat-transfer device and the electrode producing the non-equilibrium plasma are separate elements.

In FIG. 9, the workpiece 101 is electrically grounded or held at a potential opposite to the potential of the electrode 115 by a high voltage power supply 103 connected by wires 104. An electrical DC potential is applied between the workpiece 101 and the electrode 115 to produce a non-equilibrium plasma 24 having the desired thermal conductivity, and which impinges on the surfaces of the workpiece 101, the electrode 115 producing the non-equilibrium plasma 24 and the heat sink or heat sink electrode 102. In this embodiment, a dielectric liquid 106 is circulated through the heat sink or heat sink electrode 102 and through pipes 107 by a pump 108 that is used to move heat between the heat sink or heat sink electrode 102 and a large thermal mass 109 to keep the temperature of the heat source or sink electrode 102 constant during the heat transfer process. In this embodiment, the heat sink or heat sink electrode 102 is either grounded or held at a potential opposite to that of electrode 115 producing the non-equilibrium plasma 24 and having approximately 50% of the potential applied to the electrode 115. The potential of the heat sink or heat sink electrode 102 is controlled by a high voltage power supply 103 which is connected to the heat sink or heat sink electrode 102 by a wire 104. In this case, the electrode 115 producing the non-equilibrium plasma 24 and the heat sink or heat sink electrode 102, which adds or removes heat, are two separate elements. Typically voltages in the range of 25,000 to 150,000 volts are applied to electrode 115 to produce the non-equilibrium plasma 24, while the potential of the heat sink or heat sink electrode 102 has a voltage about half the voltage of electrode 115, such as from greater than about 0 to less than about 75,000 volts. The minimum generally desirable voltage of the heat sink or heat sink electrode 102 will be that voltage which is required to be applied to effect in the workpiece the desired temperature, and so may approach 0, while the maximum generally desirable voltage will be about one-half that of electrode 115.

Heat transfer using non-equilibrium plasmas has a wide range of applications, including, for example, arc welding, Mig welding, Tig welding, laser welding, metal spraying of preforms and powders, powder manufacture, and other metal fabrication and manufacturing processes which require a high rate of cooling, such as solidification and grain structure control in the cooling of alloys, superalloy casts and welds. A surprising and unexpected aspect of the present invention, then, is the use of electron flow within a non-equilibrium plasma to transfer heat, which in aspects of the invention may be accomplished in a vacuum.

Preferably, the dispensing means of the present invention is an atomizing means. Atomization of molten particles using rapid electrostatic charging results in the rapid breakup of particles into smaller particles due to electrostatic repulsion forces. The production of small particles has a wide range of commercial and industrial applications, including, for example, powder production, spray forming and metal coating processes.

Advantages of the present atomization methods and apparatus over conventional gas atomization include, for example, that the present invention can be carried out in a vacuum so that chemical interactions with the molten material can be controlled or eliminated, and any voids in the solid workpiece (e.g., preform) produced by the present invention would collapse during subsequent working of the workpiece (e.g., preform) so that no defects would exist in the final product.

In one embodiment of the present invention, a high voltage DC power supply is used to rapidly electrostatically charge molten particles beyond the Rayleigh limit, such that the electrostatic forces within the particles exceed the surface tension of the material and the particles break up into smaller particles. The "Rayleigh limit" is the maximum charge a droplet can sustain before the electrostatic repulsion forces overcome the surface tension. This rapid electrostatic charge can also be used to further break up the particles resulting from the first rapid electrostatic charge. Thus, several size refinements using rapid electrostatic charging are possible. Preferably, electrostatic charging is applied one, two, three, four or more times to refine the particles to a desired size. The final size to which droplets can be atomized is based on the applied voltage, the starting diameter of the particle, the rate of charging of the particle, and the geometry of the electrostatic or electromagnetic field present.

In exemplary processes of the present invention, a material is placed in a container and liquified. The material can be metallic or non-metallic. The container can have one or more nozzles or orifices through which the molten material can flow. The container may also be referred to herein as a "dispensing means" or "melt chamber." The inside diameter of the orifice is preferably about 0.1 mm to about 10 mm, more preferably, about 0.15 mm to about 2 mm, yet more preferably, about 0.15 mm to about 0.3 mm, most preferably, about 0.15 mm. When the inside diameter of the orifice is less than about 0.1 mm, it is difficult to achieve a consistent flow of the liquid metal The size of the primary droplet(s) need not be minimized since the goal of the invention is not to achieve a liquid metal spray at the tip of the nozzle.

In one embodiment, the dispensing means is sealed so that a vacuum and/or pressure can be created. The molten material is forced or expelled through the orifice(s) by a positive pressure that is created in the head space above the molten material. The pressure in the head space can be increased and decreased (e.g., pulsed or oscillated) in a time dependant manner to cause molten particles to be formed at the orifice(s) due to the periodic interruption of flow of the molten material. When the particles are ejected from the orifice(s), they enter the particle formation and collection chamber. The particle formation and collection chamber is preferably sealed so that a vacuum or pressure can be created in the chamber and so that gases cannot contaminate the molten particles or final product.

The pressure in the head space above the molten material in the dispensing means is preferably equal to or less than pressure in the particle formation and collection chamber to prevent molten material from discharging from the orifice. The pressure in the head space above the molten material in the dispensing means is preferably increased by about 1 to about 1,500 mm of mercury at a frequency of about 1 to about 500 Hz, more preferably about 2 to about 200 Hz to cause interrupted flow (e.g., pulsed flow or oscillated flow) of the molten material through the orifice(s). Any method of interrupting flow by, for example, creating a positive or negative pressure differential between the head space and the dispensing means, or by electrical or mechanical means, may be used. This interrupted flow causes the molten particles to form. The molten particles formed at this point may be referred to herein as "primary molten particles" because they are the first particles formed in the process.

The primary molten particles can be charged in several ways. The molten particles can be rapidly charged by conduction charging in the orifice(s) (e.g., before being expelled from the orifice) or by an electrostatic discharge into the molten particles as the molten particles are expelled from the orifice(s), and/or after the molten particles are expelled from the orifice(s). Preferably, the primary molten particles are rapidly electrostatically charged. The rapid electrostatic charge can be created by, for example, an arc discharge or an electron beam. As used herein, "rapid" is from about 1 to about 500 microseconds, preferably about 1 to about 100 microseconds, most preferably about 1 to about 50 microseconds. The rapid charging of the primary molten particles creates a plurality of secondary molten particles that have a uniform diameter of about 5 to about 2,500 microns, preferably about 5 to about 250 microns. The secondary molten particles can be used to produce solid preforms or powders, or to coat a substrate(s), as described herein.

In an alternative embodiment, a nozzle and a dispensing means are arranged so that a flow control rod is moved by a mechanical or electromechanical actuator to allow the molten material to flow out of the nozzle through an orifice(s). Preferably, the flow control rod is moved vertically by the mechanical or electromechanical actuator. Optionally, pressure or a vacuum can be applied in the dispensing means. The container can comprise one or a plurality of nozzles and flow control rods. A high voltage power supply, capable of providing a voltage rise rate of at least 3 million volts per second, is connected to the nozzle by a conductor. Preferably, the voltage rise rate is about 100 to about 100 million volts/second, more preferably from about 500 kV to about 50 million volts/second, even more preferably from about 1 million to about 30 million volts/second. The rise rate is the slope of the waveform where the x axis is time and the y axis is voltage. The high voltage is applied to the nozzle at a high rise rate by the power supply and conductor and is synchronized with the momentary retraction of the flow control rod by the mechanical or electromechanical actuator which causes a primary molten particle to form. The high voltage applied at a high rise rate causes the rapid electrostatic charging of the primary molten particle which causes the primary molten particle to break up or atomize into smaller secondary molten particles due to electrostatic forces.

Figure 10:
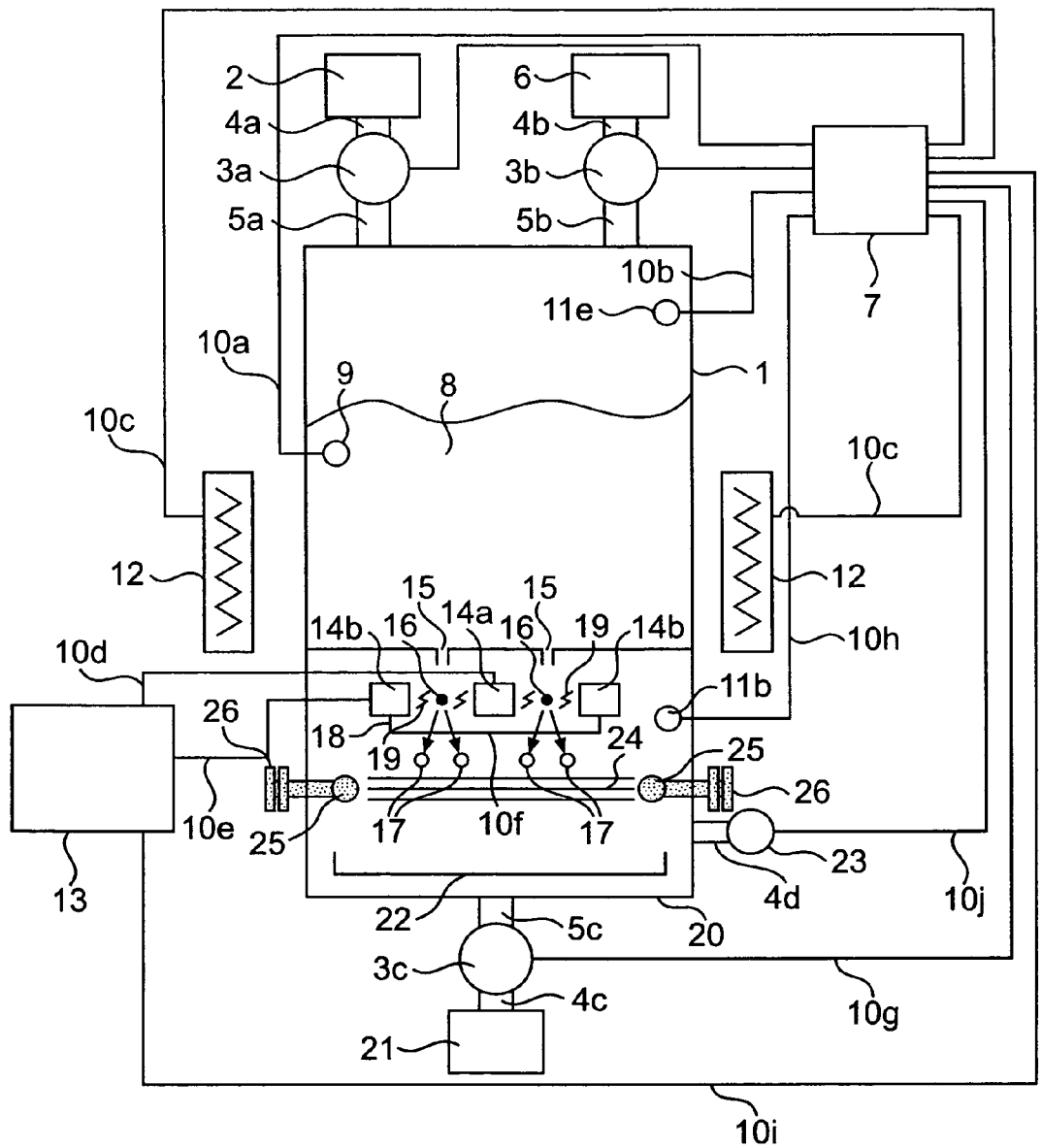
FIG. 10 is a view of an apparatus wherein a vacuum and pressure chamber serves as the dispensing means (e.g., melt chamber) for a molten material, pulsed pressure in the head space above the molten material produces molten particles through a plurality of nozzles at the base of the dispensing means, and rapid electrostatic charging is applied as the molten particles exit the nozzles to produce smaller molten particles.

The embodiment in FIG. 10 describes an apparatus for producing small molten particles that can be collected as a solid or used to coat a substrate. The apparatus comprises a vacuum and pressure vessel 1 which serves as the dispensing means. A vacuum source 2 is connected by a pipe 4a to a valve 3a which is in turn connected to the vacuum and pressure vessel 1 by a tube 5a. A pressure source 6 is connected by a pipe 4b to a valve 3b which is in turn connected to vacuum and pressure vessel 1 by a tube 5b. A computer 7 reads the temperature of the molten material 8 by a temperature sensor 9 which is connected to the computer 7 by wire 10a. The computer 7 reads the pressure in the vacuum and pressure vessel 1 by a pressure sensor 11a which is connected to the computer by wire 10b. The induction heat sources 12 are connected to the computer 7 by wires 10c. The positive side of the high voltage power supply 13 is connected to an electrode 14a by an insulated wire 10d and the negative side of the high voltage power supply 13 is connected to electrodes 14b by an insulated wire 10e which passes through a vacuum tight insulated connector 18 and wire 10f. A second vacuum source 21 is connected by a pipe 4c to a valve 3c which is connected to the particle formation chamber 20 by a tube 5c and is connected to the computer 7 by wire 10g. A pressure sensor 11b is connected to the computer 7 by wire 10h. The high voltage power supply 13 is connected to the computer for control by wire 10i.

In use, when the system initially starts, the computer 7 senses the pressure in vacuum and pressure vessel 1 and in the particle formation chamber 20 by the pressure sensors 11a and 11b, respectively. The computer 7 then controls the evacuation of the particle formation chamber 20 by the valve 3c controlling the second vacuum source 21 to produce a pre-set partial pressure level specific to the material to be atomized, and controls the first vacuum source 2 and the pressure source 6 by valves 3a and 3b, respectively, to maintain a partial pressure in the vacuum and pressure vessel 1 equal to that in the particle formation chamber 20. The pressure is varied from atmospheric pressure down to a lower pressure until the desired flow rate and resulting particle size is achieved.

The computer 7 then senses the temperature of the material 8 by the temperature sensor 9 and provides power to the induction heaters 12 by wires 10c until the material achieves the desired pre-set melt temperature which causes the material to liquefy. At this point, a normal atomization cycle begins.

Once the computer 7 senses that the pre-set melt temperature has been reached, a positive pressure burst is applied to the vacuum and pressure vessel 1 by the computer 7 opening the valve 3b to the pressure source 6 thereby forcing some of the molten material 8 through the orifices 15 to form the primary molten particles 16. The computer 7 then closes the valve 3b and momentarily opens valve 3c and/or valve 3a to equalize the pressure between the vacuum and pressure vessel 1 and the particle formation chamber 20 which stops the molten material 8 from flowing. The high voltage power supply 13 is then turned on by the computer 7 and a rapid charging of the primary molten material particles 16 by the electrical arcs 19 causes the electrostatic forces within the primary molten particles 16 to exceed the surface tension energy resulting in the formation of smaller secondary molten particles 17.

The secondary molten particles 17 will then pass through a non-equilibrium plasma 24 created by second electrodes 25 which each transfer the heat to the outside of the particle formation chamber 20 to heat exchangers 26. The resulting cooled atomized particles are then collected by the collecting means 22 either as a solid preform or as powder, depending on the amount of cooling provided by the non-equilibrium plasma 24.

The cycle will then begin again at the point where normal atomization begins. Throughout the process, the computer 7 senses the temperature of the material 8 by the temperature sensor 9 and provides power to the induction heater 12 by wires 10c to maintain the desired pre-set melt temperature to maintain the material as a liquid. At the end of the atomization cycle, the computer 7, via a wire 10j, opens a vent 23 which is connected to the particle formation chamber 20 by a pipe 4d and is connected to the air outside the particle formation chamber 20, which causes the pressure within the particle formation chamber 20 to equalize with the outside air pressure. Thereafter, the particle formation chamber 20 can be opened to remove the product.

Figure 11:
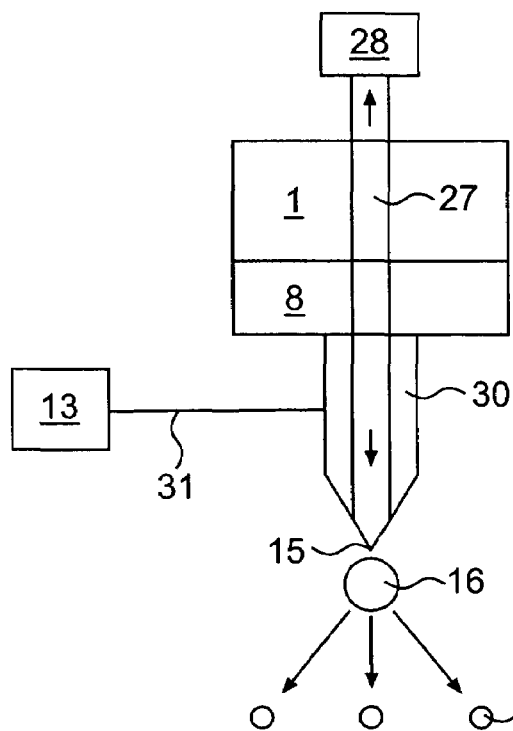
FIG. 11 is a view of an apparatus wherein a flow control rod in a dispensing means (e.g., melt chamber) is manipulated to produce molten particles, and rapid electrostatic charging is applied as the molten particles exit the nozzle to produce smaller molten particles.

In FIG. 11, a nozzle 30 and a dispensing means 1 are arranged so that a flow control rod 27 is moved by a mechanical or electromechanical actuator 28 to allow the molten material 8 to flow out of the nozzle 30 through an orifice 15. A high voltage power supply 13, capable of providing a high voltage rise rate, is connected to nozzle 30 by a conductor 31. The high voltage is applied to the nozzle 30 at a high rise rate by the power supply 13 and conductor 31 and is synchronized with the momentary retraction of the flow control rod 27 by the mechanical or electromechanical actuator 28 which causes a primary molten particle 16 to form. The high voltage applied at a high rise rate causes the rapid electrostatic charging of the primary molten particle 16 which causes the primary molten particle 16 to break up or atomize into smaller secondary molten particles 17 due to electrostatic forces.

Figure 12:
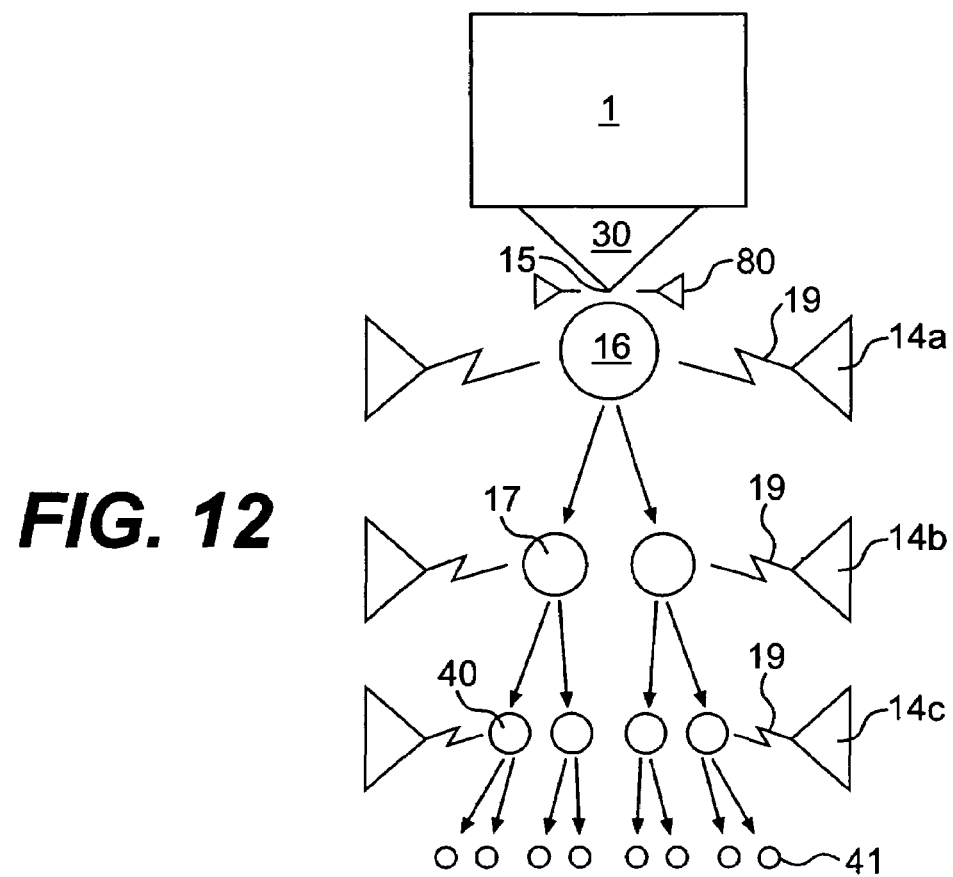
FIG. 12 is a view of multiple electrostatically induced atomizations wherein a droplet is atomized to form a plurality of smaller droplets which are further atomized to form a plurality of still smaller droplets.

In FIG. 12, a nozzle 30 and dispensing means 1 are arranged so that the primary molten particle 16 exits the orifice 15. Thereafter, the electrode 14a releases an electrical arc 19 that causes the electrostatic forces within the primary molten particle 16 to exceed the surface tension energy, resulting in the formation of smaller secondary molten particles 17. Subsequently, another electrode 14b releases an electrical arc 19 that causes the electrostatic forces within the secondary molten particles 17 to exceed the surface tension energy, resulting in the formation of smaller tertiary molten particles 40. Thereafter, another electrode 14c releases an electrical arc 19 that causes the electrostatic forces within the tertiary molten particles 40 to exceed the surface tension energy, resulting in the formation of smaller quaternary molten particles 41.

The electrodes 14a, 14b, 14c are rings of varying diameters; according to the electric potentials applied. Generally, they have diameters of about 1 to about 20 centimeters, preferably about 5 to about 15 centimeters. The electrodes 14a, 14b, 14c can be extractor, expansion or compression rings, preferably they are an expansion or compression ring. An expansion ring is generally a bare metal wire ring that is at an electric potential such that an attractive or expansive force is exerted on the charged droplet(s). A compression ring is generally a metal wire ring coated with a dielectric material of varying thickness. When an electric potential is applied to the compression ring, an opposite charge is induced upon the surface of the dielectric material, forming a squeezing (or compressive) force upon the droplet(s).

Preferably, an extractor ring 80 is also used in the apparatus of the present invention. The extractor ring 80 is generally the ring closest to the nozzle 15 that encourages extraction of the primary drop 16 from the nozzle 15.

According to the invention, the atomization process is manipulated using the methods and apparatus of the invention to effect the production of smaller droplets. It has been found that the extractor ring, when used in accordance with the invention as described herein plays a significant role in controlling and/or maximizing the division process. While not intending to be bound by any particular theory, the wire rings seem to permit some expansive (sucking) force to be applied upon the droplet as it passes the ring plane, while PVC rings seem to permit a compressive force to be applied upon the droplets. The importance of maintaining the environment in the vicinity of the electrostatic field at a temperature above the melting point of the liquid metal cannot be over-emphasized. As the droplets become smaller their surface area to mass ratio increases and they cool more rapidly.

Figure 46A:
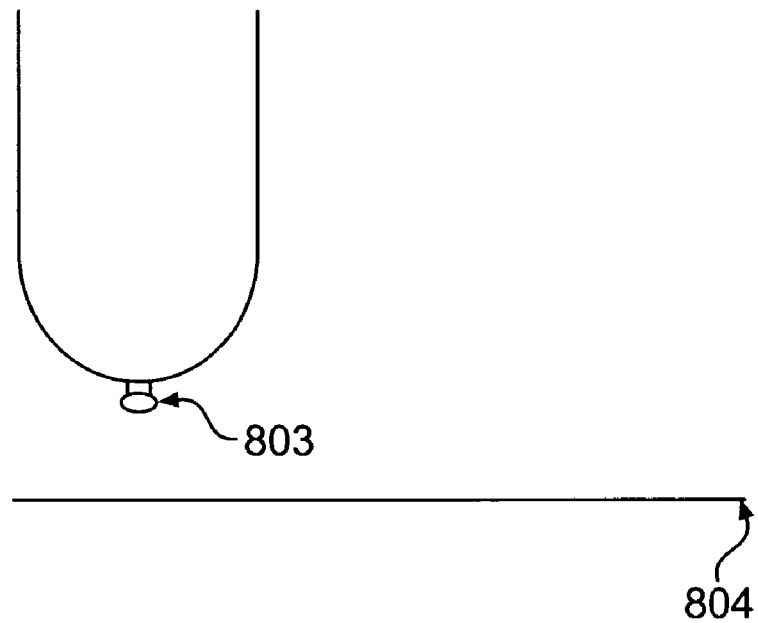
Figure 46B:
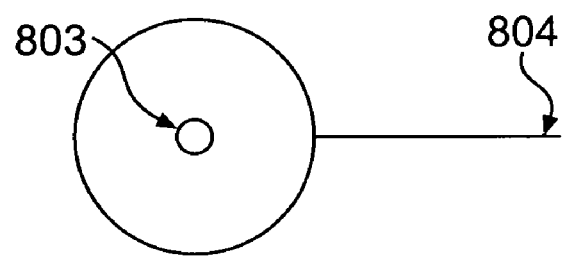

Referring to FIGS. 46A-B, the distance between the nozzle 803 and the extractor ring 804 is generally about 1 to about 50 millimeters. The diameter of the extractor ring 804 varies according to the voltages that are applied. The extractor ring 804 will be at an electric potential less than the nozzle 803 to cause liquid to be pulled from or extracted from the nozzle 803.

A positive high voltage DC source connected to the liquid metal reservoir produces an electric field between the nozzle and the grounded collector cup. The force of the field produced, acting together with gravity, causes atomized droplets of similar size to be collected. This phenomenon is called primary atomization.

Figure 13:
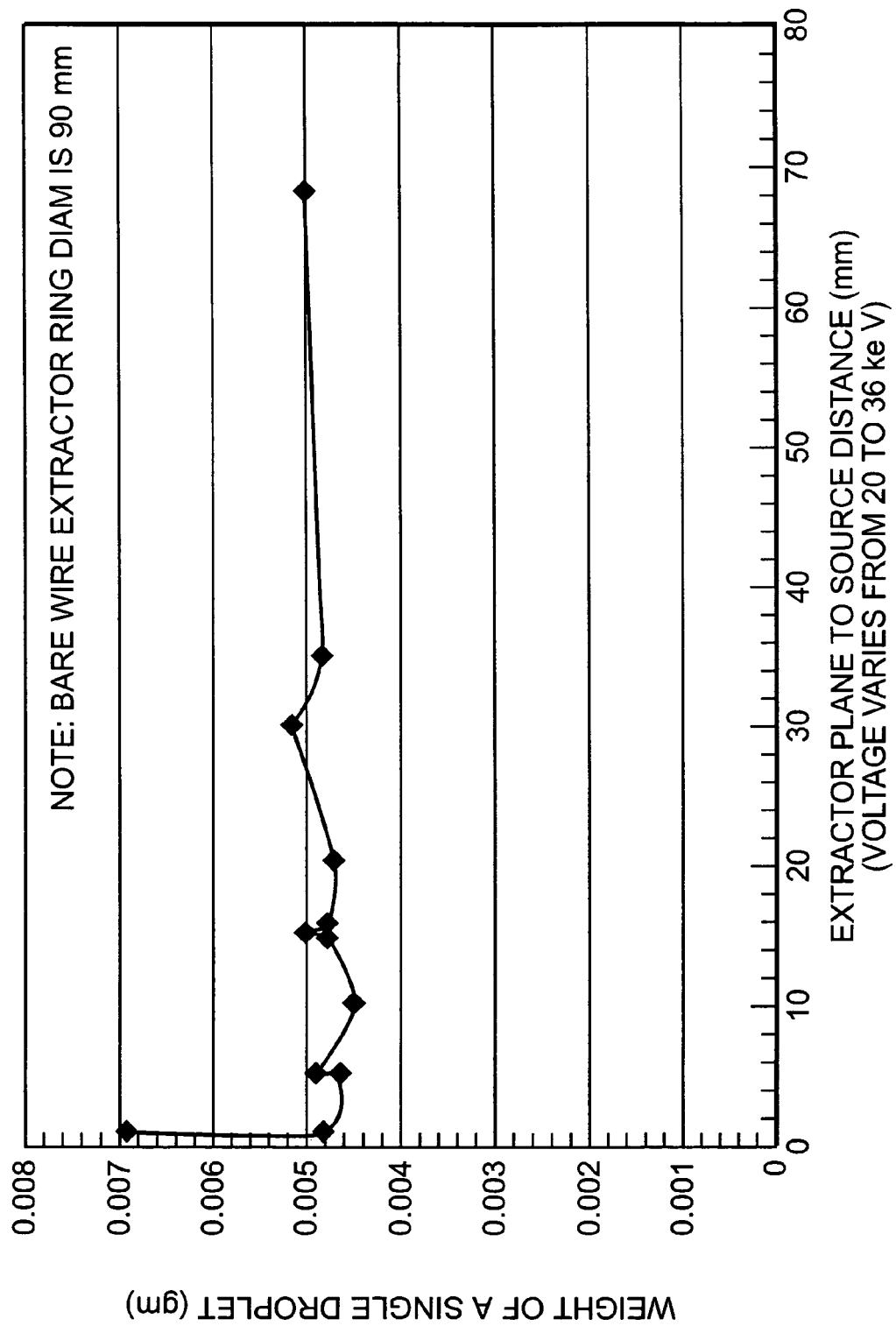
FIG. 13 is a graph showing how primary atomized droplets are not sensitive to high voltage levels or electrode gaps once a critical value is reached for a particular geometry.
Figure 14:
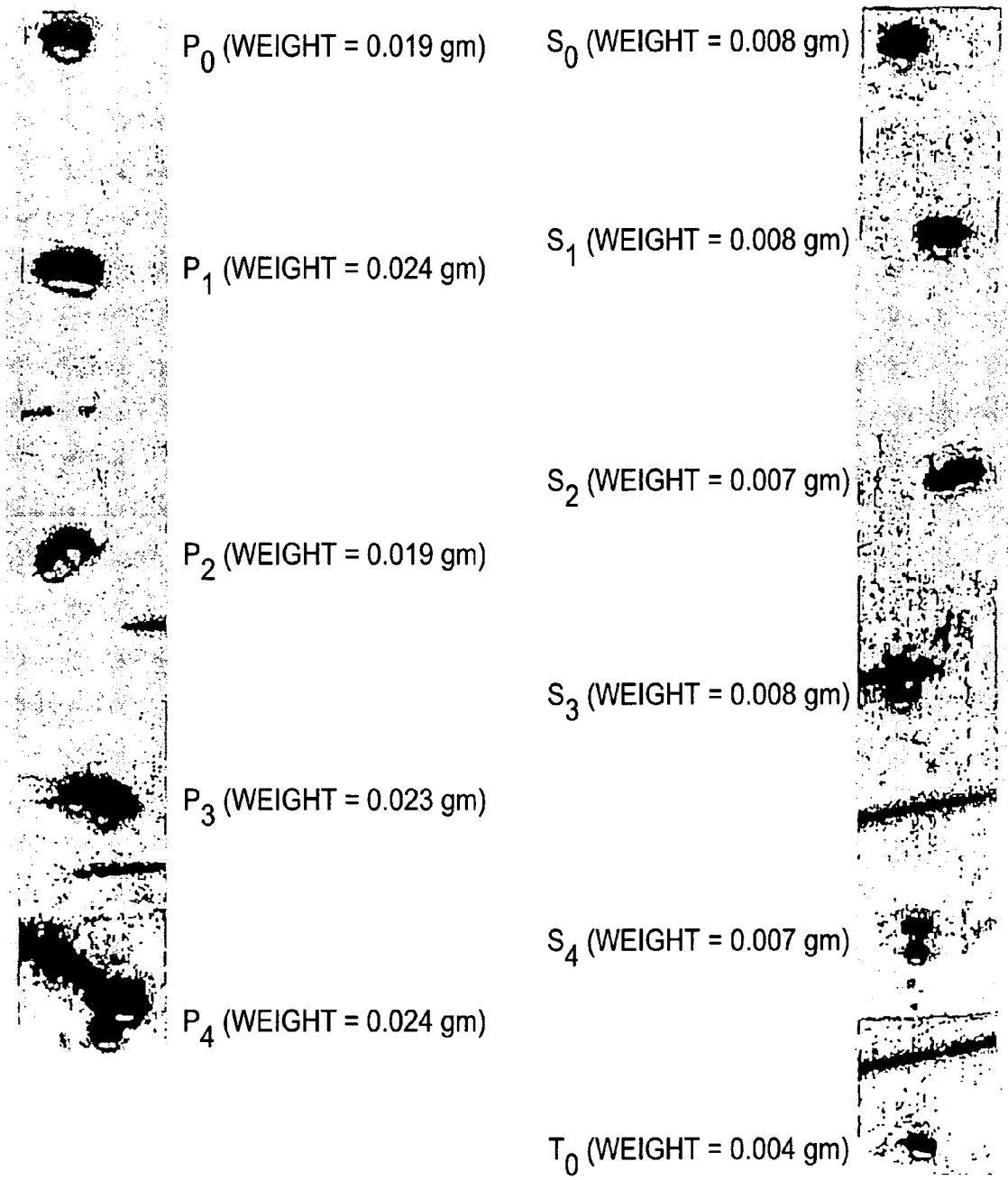
FIG. 14 is a photograph of the droplets shown in FIG. 12.

The placement of an extractor ring between the nozzle and collector cup and concentric to the droplet path causes lateral forces to be applied to the droplet, which can produce successively smaller droplets. This phenomenon is called secondary and tertiary atomization, as shown in FIGS. 12 and 14. It is preferred to maximize the number of tertiary droplets produced. FIG. 13 shows the weight of the droplets produced versus the gap between the nozzle and the extractor. This figure clearly illustrates that once a critical value is reached, primary atomization is not sensitive to the high voltage potential applied, or to the distance between the nozzle and the extractor. Table 2 and Table 3 show the results of experiments using bare copper wire extractors with different ring diameters.

FIG. 14 shows evidence abstracted from the same experimental sample. All droplets were produced by the same experiment. The choice of solidified droplets $P_0$ to $P_4$ demonstrates the way in which the primary droplets are subdivided. The choice of solidified droplets $S_0$ to $S_4$ shows this phenomenon then repeats upon the secondary droplets to produce tertiary droplets such as solidified droplet $T_0$. Droplets $P_4$ and $S_4$ appear severed, but they are whole, and droplet $T_0$ seems large for its weight. Unfortunately, these apparent anomalies arise from lens distortion due to the scanning and copying processes involved in producing FIG. 14.

Figure 47:
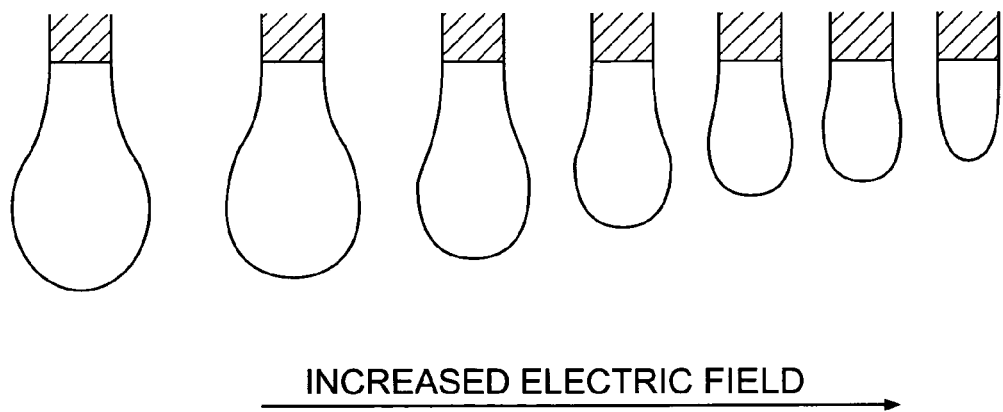

While not intending to be bound by any particular theory, the division of an initial liquid metal drop into smaller droplets seems to be the result of three separate processes. Consider a case in which a liquid metal drop is emitted in the direction of gravity from the capillary nozzle of a positively-charged reservoir towards a grounded baseplate. Assume that the surrounding environment is sufficiently warm for the drop (or atomized droplets) to remain liquid. The size of the drop emitted depends directly upon the electric field applied to the reservoir. The drop will form at the nozzle in a manner shown in FIG. 47, the size of the drop being governed by the field applied up to a critical value. Thereafter, only the rate at which the drop leaves the capillary nozzle is affected by the field.

The possibility of liquid metal spray occurring directly from the nozzle tip can be eliminated because the aperture of the nozzle (preferably about 0.15 mm inside diameter) is too large to permit formation of a Taylor-cone upon the free surface. The basic phenomenon of a liquid film deformation is that the outward electric stress ($\sigma_E$) has to overcome the stress ($\sigma_S$) due to surface tension (i.e., $\sigma_E \geq \sigma_S$). A charged drop begins to atomize when the applied force is in excess of the Rayleigh limit $q_r = 8\pi(\epsilon_0 . T . r^3)^{1/2}$ where $\epsilon_0$, T, and r are permissivity of free space, surface tension of a liquid, and drop radius, respectively. The downward force of gravity combines with the electrostatic force to cause the drop to be ejected from the nozzle before sufficient charge can accumulate to constitute a force that can overcome the liquid metal surface tension forces. Liquid metals have high intermolecular binding energies and thus have high values of surface tension so that drops are not readily torn off from the apex, even at reasonable field strengths. Hence, sufficient charge can never be created upon the liquid metal surface at the nozzle aperture by a DC field to satisfy the Rayleigh Criterion.

Now consider a case in which the liquid metal drop is emitted from the reservoir in a manner similar to that described in the paragraph above, but in this case the drop passes through an extractor ring connected to ground, or to a negative potential with respect to the droplet collector cup, and is positioned concentric to the nozzle center and slightly below the nozzle tip (e.g., within about 1 to about 2 centimeters). As the drop falls toward a position that is coplanar with the ring plane, the field intensity between the drop and the ring increases.

Figure 48:
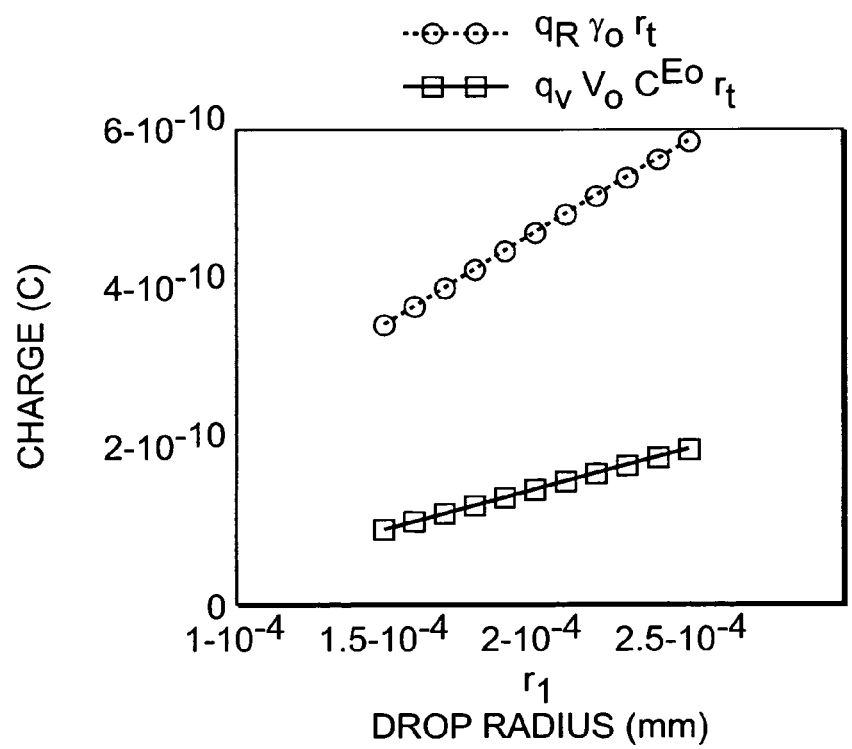

If the potential difference between the drop and the ring is large enough to impart sufficient charge upon the drop, then the Rayleigh Limit may be reached. As the drop continues to fall toward the ring plane, the Rayleigh limit is surpassed and highly charged particles with small mass are ejected, since the electrostatic forces have exceeded the surface tension forces. These particles should be ejected at the surface of the drop where the electrostatic field is densest, and it can be estimated that up to 25% of the charge is carried away by the particles, leaving the majority of the mass of the drop remaining with a lesser charge. Since the charge remaining on this residual drop is less than that required to satisfy the Rayleigh Criterion, no further atomization will occur unless the drop is recharged by induction along its flight path (see FIG. 48).

Finally, a case similar to that described in the paragraph above can be considered, where some charge remains upon the residual drop. This drop can be equated with the primary drop described throughout the present invention (see FIGS. 12 and 14). If this drop is permitted to pass through a ring shaped electrode of a type similar to the extractor ring situated at some distance between the capillary nozzle and the collector, and connected to ground or to a negative potential, then some electrostatic force is exerted upon the drop as it passes through the vicinity of the ring plane. If this force is sufficient to cause distortion of the drop, then the middle of the drop may be constricted sufficiently that surface tension forces will act along a path of least resistance at the neck by forming two (or possibly more) secondary drops.

Thus, this process can be repeated as the droplets pass through other strategically placed rings. However, as the mass of the initial drop is subdivided, so the charge on each droplet is reduced also (i.e., the charge to mass ratio is reduced) and some charge is lost to the immediate environment due to leakage. The drops may regain some positive charge by induction as they pass down the electrostatic force field, but the charge effect will reduce with distance from the capillary nozzle, and the effect will be further reduced as the rings through which the drops have already passed act to nullify the electrostatic field. Any droplets produced in this manner would be third stage, or tertiary drops.

Thus, the possibility exists for successive atomization of a drop of liquid metal by a DC. electric field provided that certain criteria are met.

One criterion is reducing the flow rate of the liquid metal by controlling the high voltage that is applied to the reservoir. This permits the drop a slower passage through the ring system and so maximizes the atomization effect.

Another criterion is positioning the ring electrodes with successively negative and positive potentials in sandwich fashion such that the drops are alternately atomized, and then recharged by induction. For example, a ring that is funnel-shaped may be used to investigate whether exposing the liquid metal drop to an intense field for a longer period can increase the charge imparted by induction, and also whether such a funnel-shaped electrode, when connected to a polarity opposite to that induced upon the drop will permit greater atomization to occur. However, in this situation there has to be some trade-off between the drop's downward velocity and the potential applied to the funnel electrodes. Too high a charging voltage on the electrode will retard the drop's ability to leave the nozzle with minimum mass, while too little voltage will produce a shorter flight time in the shearing field. To some extent these effects can be minimized by varying the positions of the ring electrodes along the drop's flight path, and it is these effects that we are currently studying.

Another criterion is maintaining a heated flight path that is longer than previously employed in order to facilitate the layering of rings. This flight path should be maintained at a temperature which ensures that all constituents of the eutectic alloy remain liquid. Though the eutectic isotherm for pure Wood's Metal is 70° C., that for a recycled alloy, where the relative constituency may have changed, may be considerably higher.

At some stage successive atomization will no longer occur. Intuitively, there may be a limiting size of drop which cannot be further subdivided by electrostatic shearing. As the drop becomes smaller, there is less opportunity for the electrostatic forces to form a distorted shape which can then usurp the surface tension forces to help form smaller droplets because as the drop's mass becomes smaller there will be a tendency for the drop to 'float' on the field rather than be severed by it.

Tables 2 and 3 in Example 3 indicate that a finite number of groups (ostensibly 3 or 4) containing drops of similar sizes resulted from each experimental sample. While examining FIG. 14, we can understand why this situation occurs.

As the partially charged drop falls through the ring electrodes, electrostatic shearing forces act upon the drop. However, imperfections in construction mean that the ring is not exactly concentric to the drop's flight path, therefore the electrostatic field intensity acting upon the drop is not totally uniform. The drop is not divided exactly in a manner of binary division. Instead, two or more droplets of unequal mass are produced from each drop that is emitted from the nozzle. This produces samples containing the grouping that we have witnessed so far. Our aim therefore is to provide an opportunity for sufficient successive atomizations to occur until the requisite particle size distribution is achieved.

In preferred embodiments, the atomization methods and apparatus further comprise non-equilibrium plasmas for removing heat from the molten particles after they are electrostatically atomized but before they are collected either as a solid workpiece or as a powder. Alternatively, non-equilibrium plasmas can be used to remove heat from the molten particles after they are applied to a substrate. FIGS. 26-34 show various preferred embodiments. In particular, FIGS. 26-29 provide examples of methods of making a molten metal stream or droplets in a vacuum for atomizing, while FIGS. 30-34 provide examples of methods used to collect the atomized liquid metal in a vacuum. The atomization methods, electrostatic methods, and non-equilibrium plasmas described in FIGS. 26-34 are preferably those of the present invention, as described herein.

Figure 26:
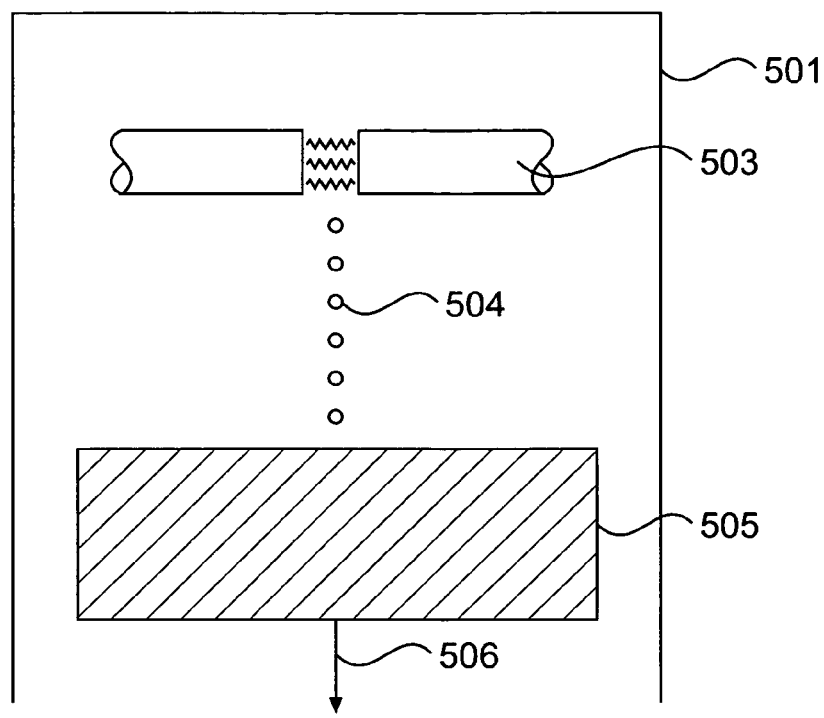

FIG. 26 shows twin electrode melting as the source for the molten metal for electrostatic atomizing. The vacuum chamber 501 surrounds the electrodes 503 and the atomizing source 505. Molten metal 504, either as droplets or a stream, falls from the electrodes 503 to the electrostatic atomizer 505. The atomized material 506 flows out of the atomizer 505 and into a collecting means (not shown), examples of which are described in FIGS. 30-34.

Figure 27:
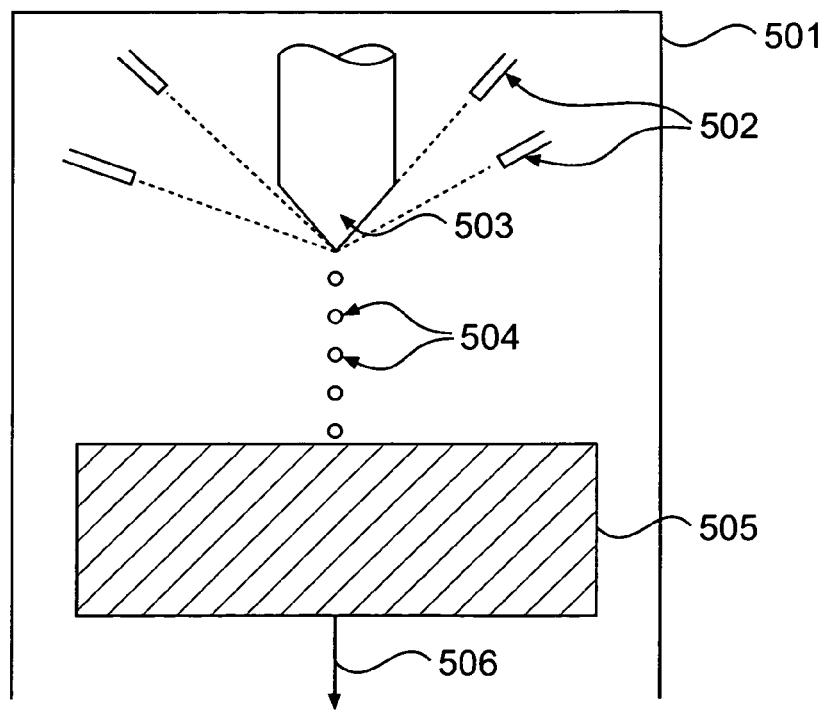

FIG. 27 shows electron beam melting as the source for the molten metal for electrostatic atomizing in vacuum. The vacuum chamber 501 surrounds the electron beam source 502, the electrode 503, the atomizing source 505 and the collector (not shown). Molten metal 504, either as a stream or droplets, falls from the electrode 503 to the electrostatic atomizer 505. The atomized material 506 flows from the electrostatic atomizer 505 into a collection means (not shown), examples of which are described in FIGS. 30-34.

Figure 28:
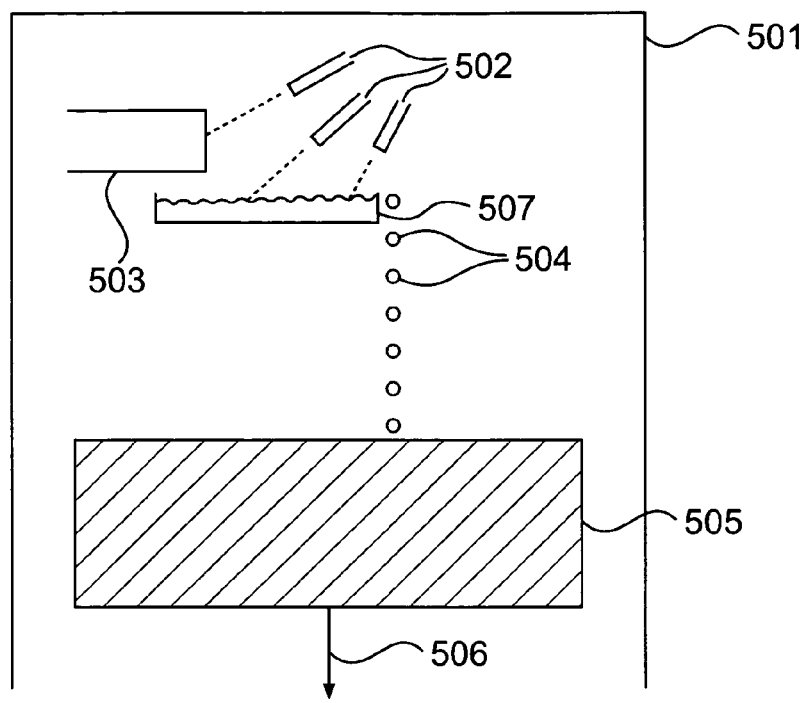

FIG. 28 shows electron beam cold hearth melting as the source for molten metal for electrostatic atomizing in vacuum. The vacuum chamber 501 surrounds the electron beam source 502, the electrode 503, the water-cooled copper cold hearth 507, the atomizing source 505, and the collection device (not shown). Molten metal 504, either as a stream or droplets, falls from the water-cooled copper cold hearth 507 to the electrostatic atomizer 505. The atomized material 506 flows from the electrostatic atomizer 505 into a collection means (not shown), examples of which are described in FIGS. 30-34.

Figure 29:
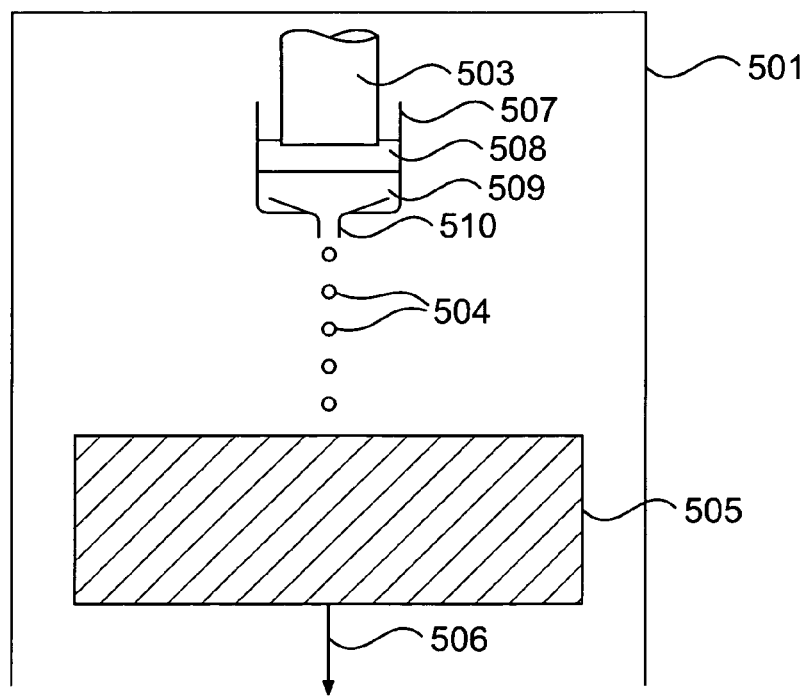

FIG. 29 shows ESR/CIG melting as the source for the molten metal for electrostatic atomizing in vacuum. Alternatively, a VAR/CIG melt source may be used in place of the ESR/CIG melt source. The vacuum chamber 501 surrounds the melt source, the electrostatic atomizer 505 and the collection device (not shown). The ESR/CIG melt source includes an electrode 503 and a water-cooled copper crucible 507. A molten slag 508 acts to melt the electrode 503 to form a molten metal pool 509. The molten metal 204, either as a stream or droplets, flows through the CIG nozzle 510, and falls into the electrostatic atomizer 505. The atomized material 506 flows from the electrostatic atomizer 505 into a collection means (not shown), examples of which are described in FIGS. 30-34.

Throughout the description of FIGS. 26-34, the molten metal 504 is preferably atomized using the methods described herein.

Figure 30:
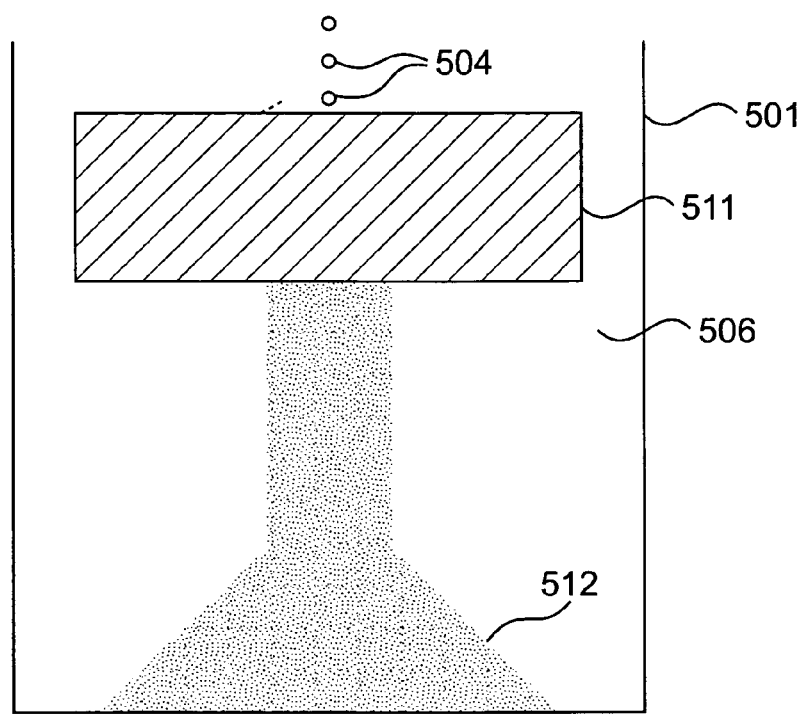

FIG. 30 shows the atomized powder being collected in the bottom of the atomizing chamber. The vacuum chamber 501 contains a melting and atomizing means described in FIGS. 26-29. The stream or droplets of molten metal 504 from the melt sources described in FIGS. 26-29 passes through the atomizing zone 511. The atomized material 506 is collected at the bottom of the chamber 512.

Figure 31:
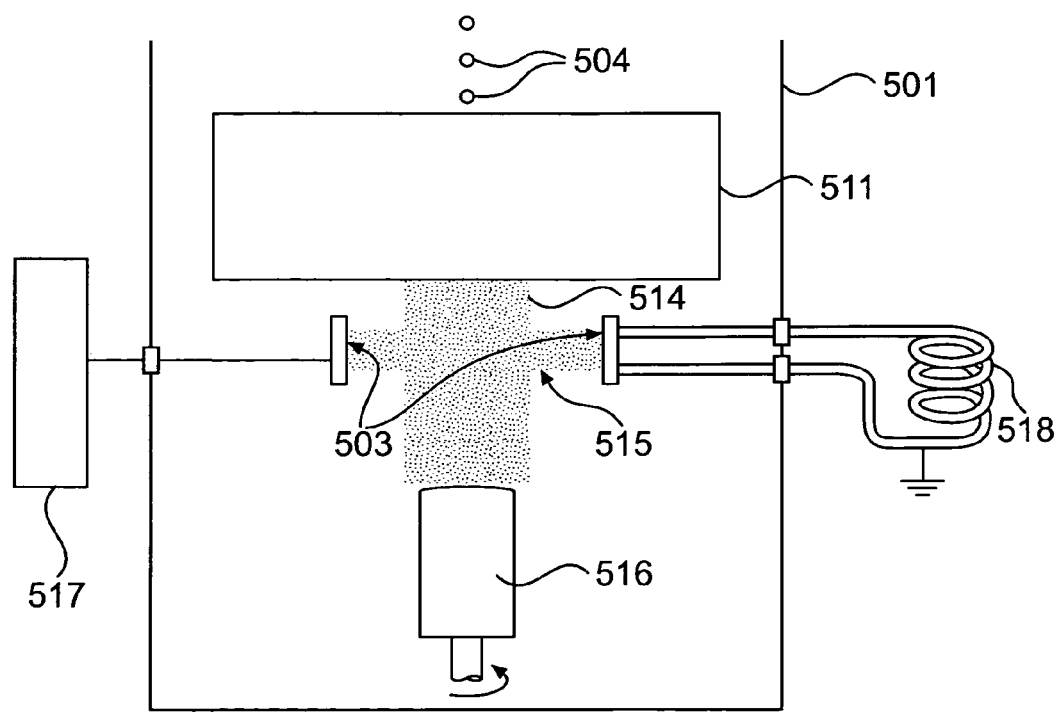

FIG. 31 shows electrostatically atomized powder being collected as a solid preform after the powder is cooled via a non-equilibrium plasma. The vacuum chamber 501 contains a melting and atomizing means described in FIGS. 26-29. The stream or droplets of molten metal 504 from the melt sources described in FIGS. 26-29 passes through the atomizing zone 511. The atomized powder 514 passes through a non-equilibrium plasma 515 and is collected as a solid preform 516. The non-equilibrium plasma 515 is generated by producing a potential difference between two electrodes 503 from a power source 517. The heat from the atomized powder 514 is conducted through the non-equilibrium plasma 515 and the electrode 503 into a dielectric heat transfer medium to a heat exchanger 518.

Figure 32:
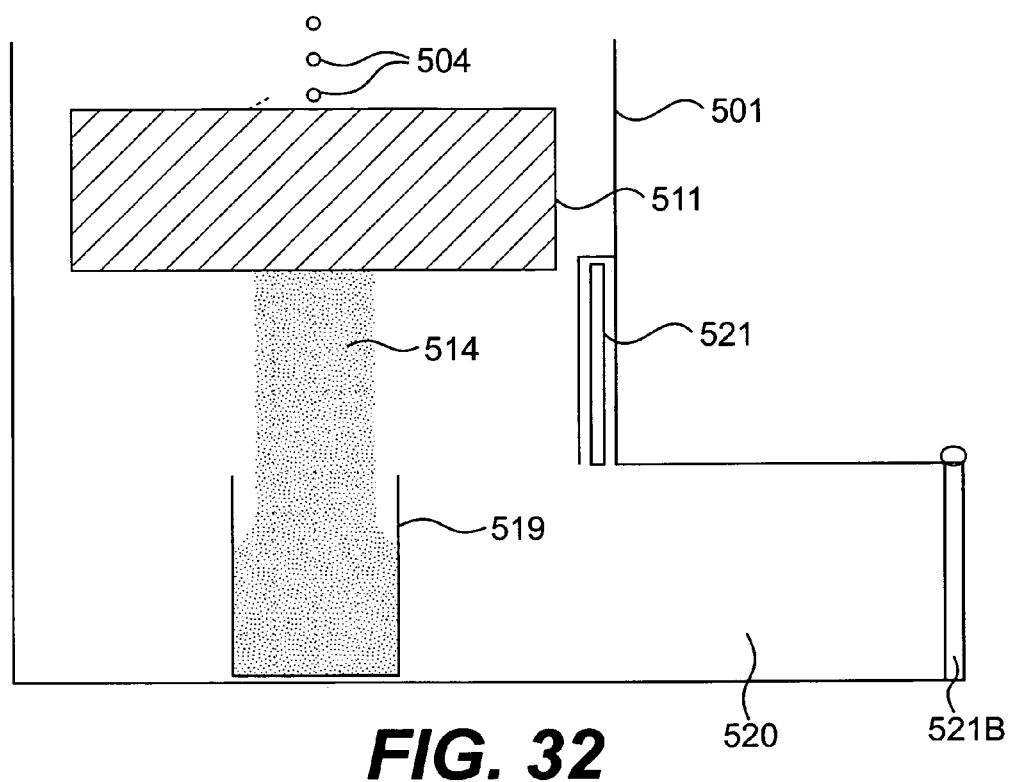

FIG. 32 shows electrostatically atomized powder being collected in a can, where the can is transferred into a smaller chamber without breaking the vacuum. In the smaller chamber, the lid may welded to the can prior to hot working to a final product. The vacuum chamber 501 contains a melting and atomizing means described in FIGS. 26-29. The stream or droplets of molten metal 504 from the melt sources described in FIGS. 26-29 passes through the atomizing zone 511. The atomized powder 514 is directed into a can 519 via the process described in FIG. 34. When the can 519 is sufficiently full of atomized powder 514, it is transferred in the chamber 520 and the chamber 520 is sealed by a vacuum lock 521. A lid can then be applied to the filled atomized powder can and the can released to the atmosphere via a second lock 521B for thermomechanical processing.

Figure 33:
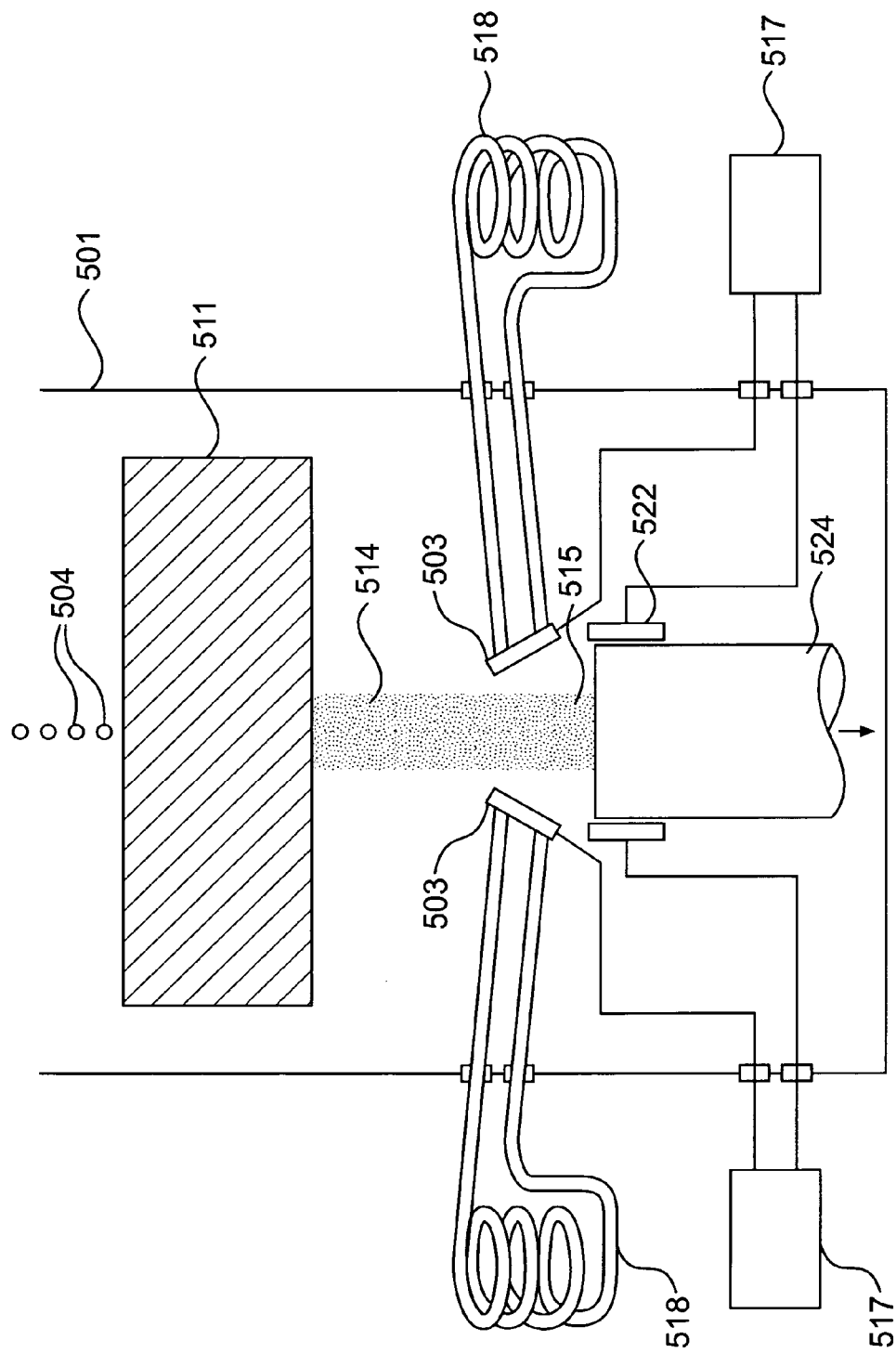

FIG. 33 shows the production of a solid ingot in a mold from a powder produced by electrostatic atomization. The vacuum chamber 501 contains a melting and atomizing means described in FIGS. 26-29. The stream or droplets of molten metal 504 from the melt sources described in FIGS. 26-29 passes through the atomizing zone 511. The atomized powder 514 is collected in a mold 522 and the solid ingot 524 withdrawn from the mold 522. Power supplies 517 provide the potential difference to form a non-equilibrium plasma 515 emanating from the electrodes 503. Heat is conducted from the surface of the solidifying ingots 524 to the electrodes 503 which are cooled with a dielectric liquid. The liquid is passed through heat exchangers 518 and returned to the electrodes 503.

Figure 34:
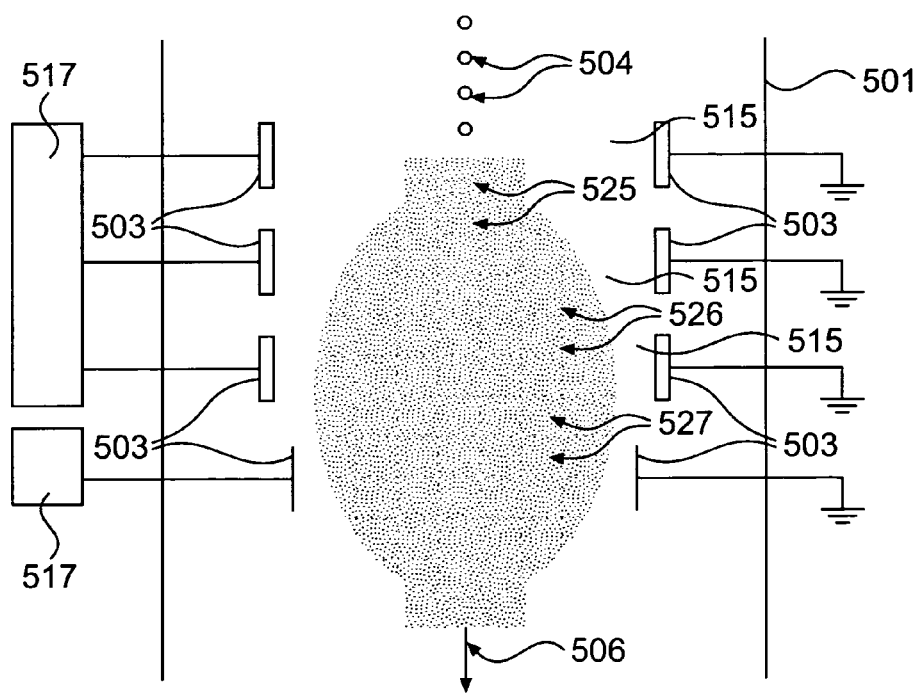

FIG. 34 shows three stages of electrostatic atomizing using plasma and one stage of electrostatic steering of the atomized powder. The vacuum chamber 501 contains a melting and atomizing means described in FIGS. 26-29. The stream or droplets of molten metal 504 from the melt sources described in FIGS. 26-29 passes through the atomizing zone 511. The non-equilibrium plasma 515 for imparting the atomizing conditions is provided by the potential difference between the electrodes 503. The potential difference is supplied by a high-voltage power supply 517. The atomized material from the first stage 525 passes to the second atomizing stage, and atomized materials of smaller size from the second stage 526 pass to the third stage. Atomized materials from the third stage 527 pass through the steering stage to be steered in a direction which depends on the potential between the electrodes 503. Power for these electrodes is supplied by power supply 517.

Using various features described above, it would be readily apparent to one of ordinary skill in the art that the following exemplary embodiments can be implemented. Of instance, in one embodiment, the present invention describes apparatus comprising dispensing means, collecting means, and means for directing molten particles from the dispensing means to the collecting means comprising an electrostatic field and/or an electromagnetic field. Optionally, the apparatus may further comprise atomization apparatus and/or non-equilibrium heat transfer apparatus.

In another embodiment, the present invention describes spray forming methods comprising directing molten particles from dispensing means to collecting means by producing an electrostatic field and/or electromagnetic field between the dispensing means and the collecting means. Optionally, the apparatus may further comprise atomization apparatus and/or non-equilibrium heat transfer apparatus.

In another embodiment, the present invention is directed to apparatus comprising a melt chamber that comprises at least one orifice; a means for expelling a molten material through the at least one orifice in the melt chamber; and a means for applying a rapid electrostatic charge to the molten material. Preferably, the means for forcing the molten material through the at least one orifice in the melt chamber is a mechanical or electromechanical actuator or a pressure means. In a preferred embodiment, the apparatus further comprises a means for cooling the molten particle. Preferably, the means for cooling the molten particle comprises a means for generating a non-equilibrium plasma.

In another embodiment, the present invention describes methods for forming particles comprising producing a first molten particle; and applying a rapid electrostatic charge to the first molten particle, wherein the rapid electrostatic charge causes the first molten particle to form at least one smaller second particle. Preferably, the first molten particle is expelled through at least one orifice in the melt chamber via mechanical means or by a pressure means. In a preferred embodiment, the at least one smaller second molten particle is cooled, preferably by a non-equilibrium plasma.

In another embodiment, the present invention is directed to apparatus for transferring heat between a heat-transfer device and a workpiece comprising the heat-transfer device, wherein the heat-transfer device is electrically charged or held at a potential; the workpiece, wherein the workpiece is mechanically separate from the heat-transfer device; and means for transferring heat between the workpiece and the heat-transfer device comprising a means for generating a non-equilibrium plasma. The heat-transfer device can be either a heat sink or a heat source.

In yet another embodiment, the present invention is directed to methods of transferring heat between a heat-transfer device and a workpiece comprising producing a non-equilibrium plasma capable of transferring heat between the heat-transfer device and the workpiece, wherein the heat-transfer device is electrically charged or held at a potential, and wherein the heat-transfer device is mechanically separate from the workpiece. The heat-transfer device can be either a heat sink or a heat source.

Accordingly, in various embodiments, non-equilibrium plasmas are advantageously employed to effect optimal heat transfer, and the non-equilibrium plasma must act with a heat sink/source that has a thermal conductivity capable of removing the desired quantity of heat. While two or more electrodes have been used in the past to produce a plasma in a region of high heat, such as a weld zone, so that the plasma would serve to conduct heat outward from the weld zone, thereby increasing the surface area for heat, embodiments of the present invention are directed to the discovery that a non-equilibrium plasma may be used to introduce heat into a workpiece as well as from a workpiece. It has further been surprisingly discovered that under the correct conditions a non-equilibrium plasma can be used to efficiently transfer heat in a vacuum.

The novel methods of the present invention are particularly useful in preparing any metal article, such as articles for gas turbine engines, including, for example, airfoils, blades, discs and blisks.

Accordingly, in one aspect, there is provided according to the present invention an apparatus comprising: a dispensing means; a collecting means; and a means for directing a molten particle from the dispensing means to the collecting means comprising at least one of an electrostatic field or an electromagnetic field. In another aspect is provided the apparatus described above, wherein the means for directing the molten particles from the dispensing means to the collecting means comprises an electrostatic field or an electromagnetic field. The apparatus may further comprise at least one magnetic coil, and may also further comprise a means for charging the molten particles. In one embodiment, the means for charging the molten particles may comprise a thermionic emission source or a tribocharging device. The dispensing means of the apparatus may be a gas atomizer, and may further comprise a means for transferring heat from the molten particles. The means for transferring heat from the molten particles may comprise gas conduction and/or convection and/or a non-equilibrium plasma.

In another aspect, there is provided according to the present invention an apparatus comprising: a dispensing means; a collecting means; and a means for directing a molten particle from the dispensing means to the collecting means comprising at least one of an electrostatic field or an electromagnetic field, and further comprising a means for transferring heat from the collecting means. The means for transferring heat from the collecting means may comprise a means for generating a non-equilibrium plasma. In a particular aspect, the means for transferring heat from the molten particles comprises a first heat sink, wherein the first heat sink is electrically charged or held at a potential; and a means for transferring heat from the molten particles to the first heat sink comprising a means for generating a non-equilibrium plasma. The non-equilibrium plasma may be a glow discharge or a cold corona discharge.

In another aspect, there is provided according to the present invention an apparatus comprising: a dispensing means; a collecting means; and a means for directing a molten particle from the dispensing means to the collecting means comprising at least one of an electrostatic field or an electromagnetic field, and further comprising a means for expelling the molten particle through at least one orifice in the dispensing means; and a means for applying a rapid electrostatic charge to the molten material. The means for expelling the molten particle through the at least one orifice may comprise a mechanical or electromechanical actuator. In one aspect, the means for expelling the molten particle through the at least one orifice may be a pressure means that produces a pressure in the dispensing means that is greater than the pressure on the outside of the dispensing means. The pressure means may cause interrupted flow of the molten particle from the dispensing means. The rapid electrostatic charge may be an arc discharge or an electron beam.

In another aspect, the present invention provides for a spray forming method comprising directing molten particles from a dispensing means to a collecting means by producing at least one of an electrostatic field or an electromagnetic field between the dispensing means and the collecting means. The electromagnetic field may be produced by, for example, means comprising at least one magnetic coil. The method according to this aspect of the invention may further comprise charging the molten particles. Charging the molten particles may be accomplished, for example, using a thermionic emission source or a tribocharging device. In one aspect, the dispensing means may be a gas atomizer. According to this aspect of the invention, the method may further comprise transferring heat from the molten particle. Transferring heat from the molten particles may be accomplished, for example, by gas conduction and/or convection and/or non-equilibrium plasma. In another aspect, the method of the invention further comprises producing a second electromagnetic field. According to the invention, the method, may further comprise transferring heat from the collecting means, which may be by a non-equilibrium plasma.

In another aspect, the present invention provides for a spray forming method comprising directing molten particles from a dispensing means to a collecting means by producing at least one of an electrostatic field or an electromagnetic field between the dispensing means and the collecting means, further comprising applying a rapid electrostatic charge to the molten particle, wherein the rapid electrostatic charge causes the molten particle to form at least one smaller molten particle. In a particular aspect, the rapid electrostatic charge may be an arc discharge or an electron beam. In another aspect, the method of the invention may further comprise transferring heat from the molten particle comprising producing a non-equilibrium plasma that transfers heat from the molten particle to a first heat sink, wherein the first heat sink is electrically charged or held at a potential. The non-equilibrium plasma may be a glow discharge or a cold corona discharge.

In another aspect, the invention is directed to an apparatus comprising a melt chamber comprising at least one orifice; a means for forcing a molten material through the at least one orifice in the melt chamber; and a means for applying a rapid electrostatic charge to the molten material. The rapid electrostatic charge may be an arc discharge or en electron beam. The apparatus of the invention may further comprise a means for cooling the molten material. In a particular aspect, the means for cooling the molten material may comprise a first heat sink, wherein the first heat sink is electrically charged or held at a potential; and a means for transferring heat from the molten material to the first heat sink comprising a means for generating a non-equilibrium plasma. The non-equilibrium plasma may be a glow discharge or a cold corona discharge.

In another aspect, there is provided a method for atomizing a particle comprising producing a first molten particle; applying a rapid electrostatic charge to the first molten particle, wherein the rapid electrostatic charge causes the first molten particle to form at least one smaller second molten particle. According to the method of the invention, the first molten particle may be produced by melting a material in a melt chamber, and expelling the first molten particle through at least one orifice in the melt chamber. The rapid electrostatic charge may be an arc discharge or en electron beam. The method of the invention may further comprise cooling the second molten particle by producing a non-equilibrium plasma that transfers heat from the second molten particle to a first heat sink, wherein the first heat sink is electrically charged or held at a potential. The non-equilibrium plasma may be a glow discharge or a cold corona discharge.

In another aspect, the invention provides for an apparatus for transferring heat between a first heat-transfer device and a workpiece comprising a first heat-transfer device, wherein the first heat-transfer device is electrically charged or held at a potential, and wherein the first heat-transfer device is a heat sink or a heat source; a workpiece, wherein the workpiece is mechanically separate from the first heat-transfer device; and means for transferring heat between the workpiece and the first heat-transfer device comprising a means for generating a non-equilibrium plasma. The non-equilibrium plasma may be a glow discharge or a cold corona discharge. The apparatus of the invention may further comprise an external means for generating or maintaining the non-equilibrium plasma. The external means for generating or maintaining the non-equilibrium plasma may be a thermionic emission, an RF electromagnetic radiation, an electromagnetic radiation, a magnetic field or an electron beam. The first heat-transfer device of the apparatus of the invention may comprise a plurality of heat-transfer devices. In a particular aspect, the apparatus of the invention may further comprise a second heat-transfer device that may be mechanically and electrically separate from the first heat-transfer device, wherein the second heat-transfer device is a heat sink or a heat source, and wherein the potential between the first heat-transfer device and the second heat-transfer device produces a non-equilibrium plasma.

In another aspect is provided a method for transferring heat between a first heat-transfer device and a workpiece comprising producing a non-equilibrium plasma that transfers heat between the first heat-transfer device and the workpiece, wherein the first heat-transfer device is electrically charged or held at a potential, wherein the first heat-transfer device is mechanically separate from the workpiece, and wherein the first heat-transfer device is a heat sink or a heat source. The non-equilibrium plasma may be a glow discharge or a cold corona discharge. The method may further comprise generating or maintaining the non-equilibrium plasma via an external means. In an aspect, the external means for generating or maintaining the non-equilibrium plasma comprises a thermionic emission, an RF electromagnetic radiation, an electromagnetic radiation, a magnetic field or an electron beam.

In another aspect, the invention provides for a preform produced by the methods of the invention. The preform of the invention may be a near net preform. There is also provided an article of manufacture produced by the method of the invention.

In another embodiment, present invention includes an apparatus comprising, a dispenser, a collector, a means for directing a molten particle from the dispenser to the collector comprising at least one of an electrostatic field or an electromagnetic field, and a heat transferring device from the collector comprising a non-equilibrium plasma generator.

In yet another embodiment, the present invention includes an apparatus comprising, a dispenser, a collector, a means for directing a molten particle from the dispenser to the collector comprising at least one of an electrostatic field or an electromagnetic field, and heat transferring device from the molten particle comprising a non-equilibrium plasma generator.

EXAMPLES

The following examples are for purposes of illustration only, are not indented to bind the scope of the present invention to any particular theories or embodiments described therein, and are not intended to limit the scope of the invention or the appended claims.

Example 1

Clean metal spraying experiments revealed that Wood's metal could easily be charged positively or negatively. It was observed that as the melting point of the metal increased, the ability to positively charge the metal did not change or improved slightly, while the ability to negatively charge the metal decreased. It was determined that the metals were positively charged to about 78% of the Rayleigh limit.

This example demonstrates that as the temperature of the metal increases, the electron emission rate increases. Thus, the ability to positively charge the metal is unaltered or improved, while the ability to negatively charge the metal is reduced.

Example 2

In this example, the feasibility of deflecting charged metal particles in a controlled and repeatable manner using an electrostatic field was investigated. To this end, molten metal particles comprising tin were positively charged and then passed within 2 cm of an electrostatically charged plate. The particle sizes were about 0.050 inches to about 0.250 inches. The polarity and magnitude of the charge on the plate was varied in different trials.

Figure 5:
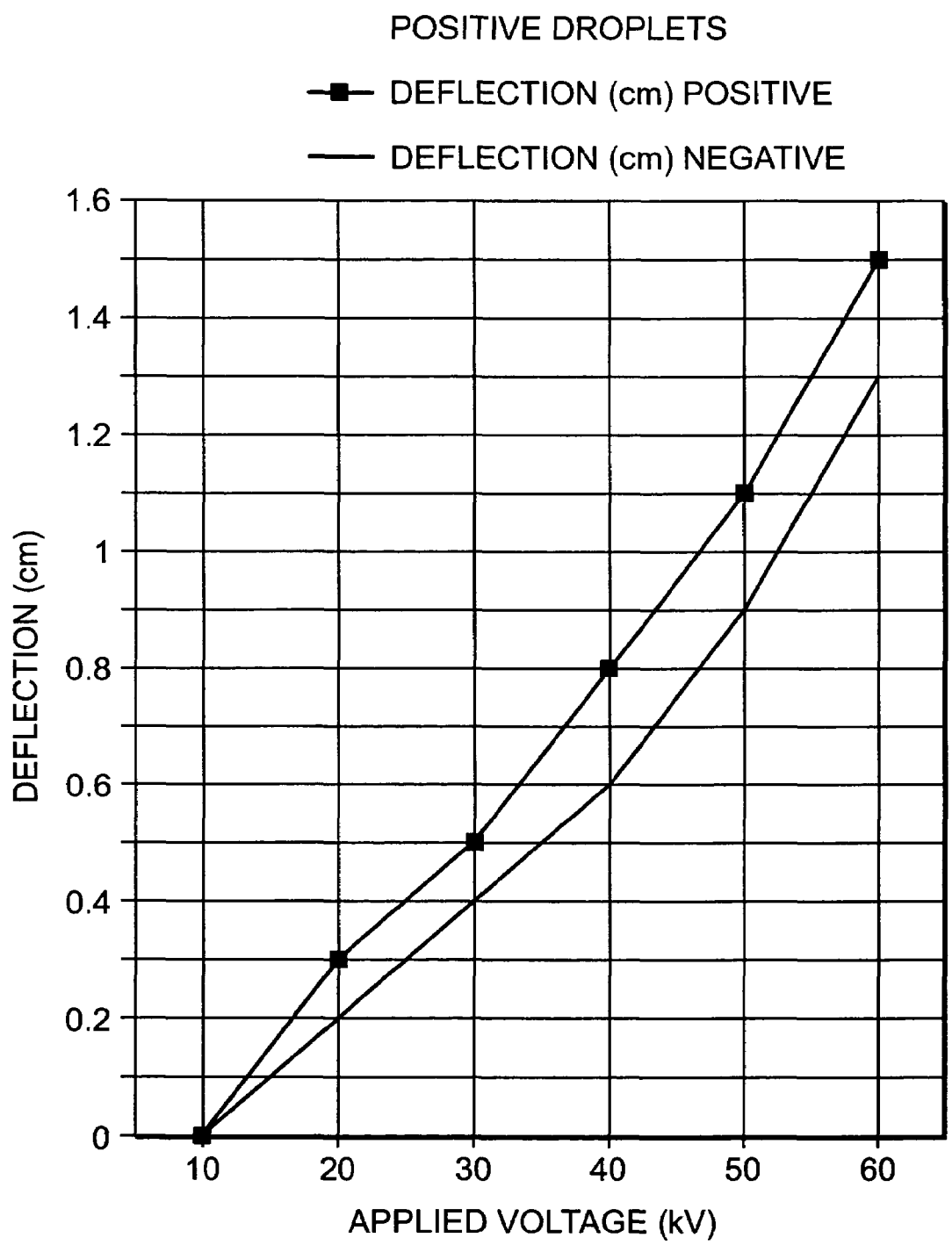
FIG. 5 is a graph showing deflection versus applied voltage for a molten tin particle, as described in Example 2.

The results indicated that the positively charged plate repelled the positively charged particles and the negatively charged plate attracted the metal particles. The deflection characteristics versus the applied voltage are shown in FIG. 5 for the molten particles comprising tin.

Example 3

In this example, a video tape data analysis was developed to analyze the results obtained in Example 2 to provide a statistically viable comparison between the video of the spray forming process with and without an electrostatic field applied.

An 8 mm video tape was digitized and replayed frame by frame on a high contrast NTSC video monitor. Each frame was judged as demonstrating good or poor collection efficiency based on three criteria. (1) Attenuation: If less than 80% of the particles directly targeted the preform then the frame was judged as demonstrating poor collection efficiency. (2) Bounce: If the particles appeared to bounce off the preform then the frame was judged as demonstrating poor collection efficiency. (3) Glow: If the particles produced a glow over the preform, it was indicative of a combination of poor attenuation and bounce off, and was judged as demonstrating poor collection efficiency.

After the frames were categorized as demonstrating good or poor collection efficiency, groups of frames were selected for analysis. The frames for analysis were chosen based on a review of the strip chart of the voltage and current. An electrostatic event zone was defined as a period of time wherein high voltage was being applied and current was being drawn. Thus, any momentary changes in the collection efficiency could be eliminated from consideration in the experiment by comparing the number of frames demonstrating good collection efficiency versus the total number of frames in the electrostatic event zone as compared to the neutral zones. It was estimated that the synchronization between the video tape of the clean metal spray run and the strip chart were accurate within ±0.3 seconds. Thus, 0.3 seconds were added to the beginning and end of each electrostatic event to ensure that the event was fully captured. Three electrostatic event zones were found and selected for analysis. Three neutral zone periods, where no current was drawn, were selected for comparison controls.

The results of the analysis of the experimental data are shown in Table 1 below. The results in Table 1 indicate that in neutral Zones 1, 2 and 5, an average of 13.7% of the frames demonstrated good collection efficiency. In Zone 6, where an average of 198 watts of electrostatic power was applied, 31.6% of the frames demonstrated good collection efficiency. In Zone 4, where an average of 245 watts of electrostatic power was applied, 39.3% of the frames demonstrated good collection efficiency. In Zone 3, where an average of 2000 watts of electrostatic power was applied, 59.3% of the frames demonstrated good collection efficiency.

This example shows that a significant improvement in the number of frames demonstrating good collection efficiency corresponded with the electrostatic events, that the improvement in the number of frames demonstrating good collection is proportional to the power drawn, and that the significant improvement observed is not merely additive.

Example 4

This experiment demonstrated successful atomization of liquids (colored water, molten Wood's metal) using an apparatus according to the invention comprising a high voltage DC source. The apparatus permitted limited atomization of liquid metal when the flow was in an upward direction against gravity, or in a downward direction with gravity. A number of controlling parameters such as nozzle size, ambient conditions, spacing between electrodes, dielectric medium between electrodes, and shape and size of extractor electrode were varied such that atomization of liquid metal was substantially effected using only a DC source. Atomization involving DC alone according to the invention was exemplified by demonstrating (i) liquid metal flow against the direction of gravity; and (ii) liquid metal flow in the direction of gravity.

Figure 15:
FIG. 15 shows an apparatus used for liquid metal flow against the direction of gravity.

The apparatus used for liquid metal flow against the direction of gravity is shown in FIGS. 15 and 15A. FIG. 15A shows the liquid metal reservoir 801, a connecting tube 802, a nozzle 803 and an extractor ring 804. A copper reservoir was connected to the nozzle assembly by means of a copper tube. Solid pieces of eutectic alloy (Wood's metal) were placed in the reservoir and heated to approximately 100° C. by radiation from two 150 watt halogen bulbs. A pressure difference between the wider reservoir and the nozzle caused the liquid to flow to the tip of the nozzle, and the flow rate from the nozzle was regulated by the amount of alloy placed in the reservoir. The reservoir and nozzle assembly was connected directly to the high voltage terminal. A copper spheroid which was placed within 1/16th of an inch from the nozzle tip surrounded the replaceable nozzle, and a copper tube thermally connected this spheroid to the reservoir assembly. In this way, not only heat was imparted to the eutectic alloy by conduction along the majority of its path, but also a charge buildup area was extended. The whole arrangement was painted black to behave as a black body absorber. A brass extractor ring was suspended at varying distances directly above the nozzle opening and was connected to a grounded electrical terminal by means of an adjustable mounting assembly.

For liquid metal flow in the direction of gravity, a similar copper reservoir was connected to a nozzle assembly by means of a short downward tube of thinner internal diameter than the reservoir, and this arrangement was attached directly to the positive high voltage terminal. An extractor ring was placed at varying distances below, or to the side of, the nozzle tip, and a collector cup, placed directly below the nozzle and partially filled with water, collected atomized samples.

Figure 16:
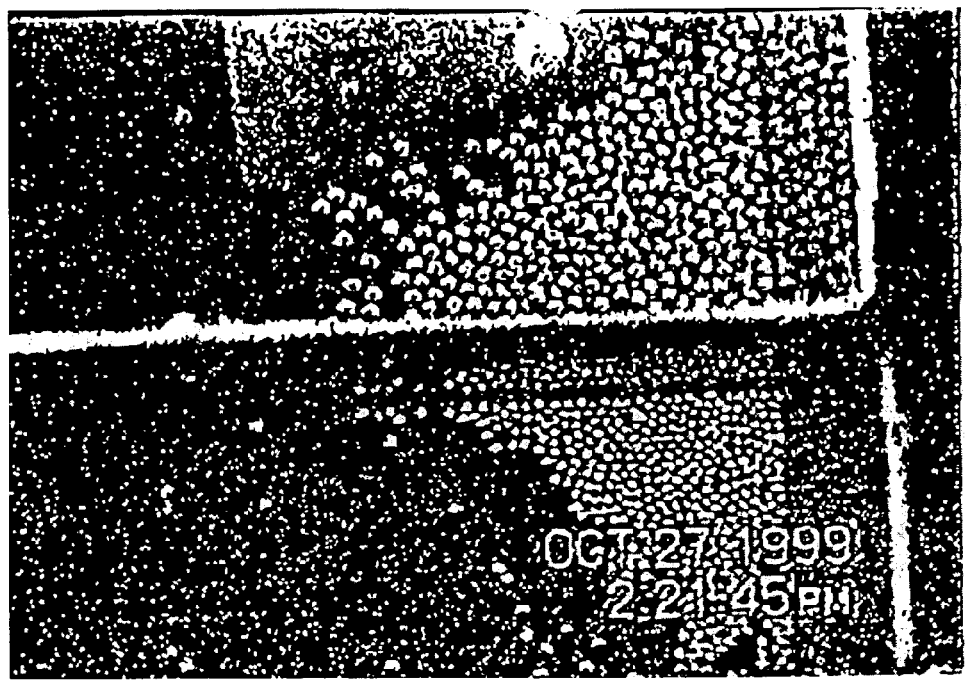
FIGS. 16 and 17 show drops and droplets collected from an exemplary series of experiments described in Example 4. For each figure, the larger drops (upper portion of the figure) are those collected during the control experiments, and the smaller droplets (lower portion of the figure) are those collected during experiments using an electrostatic field according to the invention.
Figure 17:
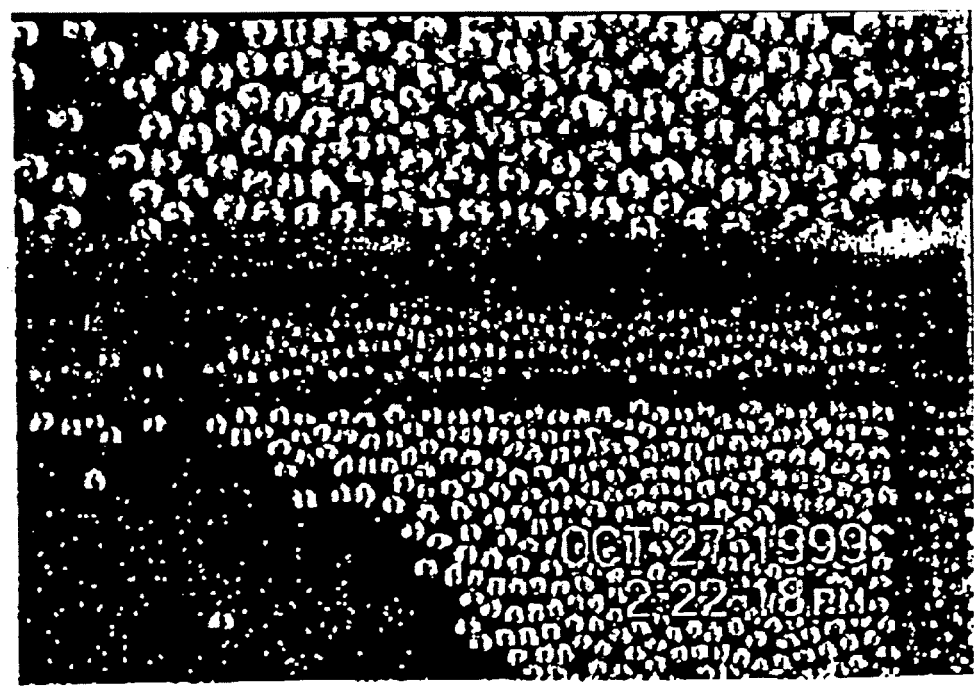
Figure 18A:
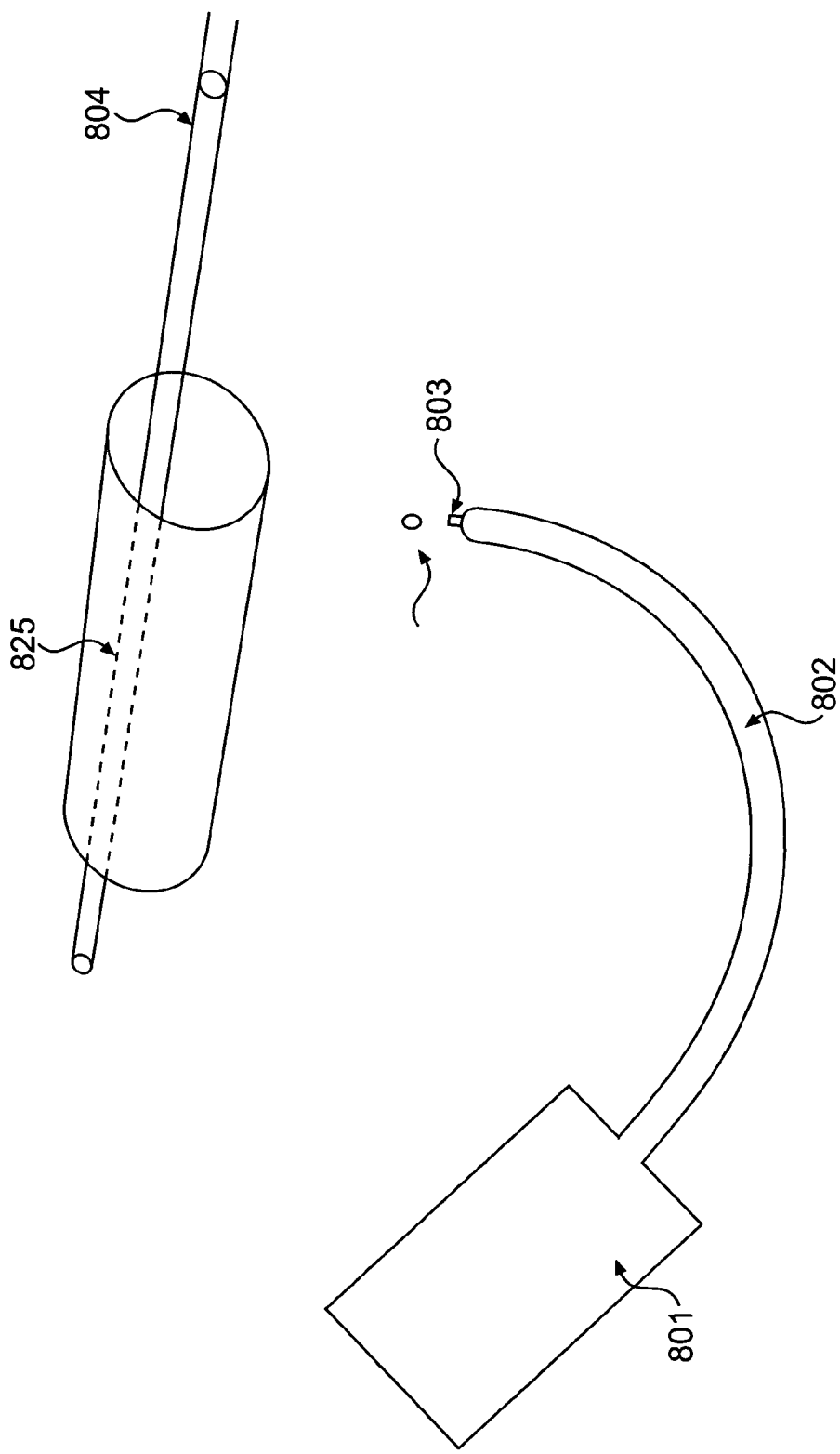

A sensitive electronic balance was used to weigh drops and droplets from atomization experiments. Control experiments were performed when drops were produced by gravitational force and free hydrostatic pressure (for downward liquid) alone. Repeat experiments were then conducted using a similar head of molten metal, and a high voltage (max 36 keV, max 0.2 mA) was applied to the fluid. Equal numbers of drops and droplets (nominally 100) were weighed, and their weights compared. FIGS. 16 and 17 show the drops and droplets collected from one such series of experiments. For each figure, the larger drops (upper portion of the figure) are those collected during the control experiments, and the smaller droplets (lower portion of the figure) are those collected during experiments using electrostatic field.

It was observed that atomization of a liquid metal utilizing an electric field between two electrodes alone was hampered by two over-riding factors: (a) in air, at atmospheric pressure, arcing occurred at a voltage lower than that required to atomize the liquid metal by electrostatic means; and (b) at pressures slightly less than atmospheric, there was an inability to create potential differences between the electrodes sufficiently high enough to enable atomization to occur. The reason for this is thought to be that the formation of plasma permitted an easy path for current flow.

In order to address these factors and the resultant uncontrolled voltage breakdown, a preferred embodiment of the invention employed a piece of CPVC pipe or other dielectric material 825, preferably ⅛th of an inch thick, placed in such a way as to surround the extractor ring and its supporting arm 804 (see FIGS. 18A and 18-25). By incorporating this CPVC 825 into the assembly, substantially higher potential differences between nozzle 803 and extractor 804 could be achieved before arcing occurred. This meant that more electrical energy was available for atomization, though the distance between the electrodes could only be increased to a point where leaking would occur to neighboring components.

For liquid metal flow against the direction of gravity, the nozzle aperture that permitted the best atomization was on the order of 0.3 to 0.4 mm, which is accordingly a preferred nozzle aperture size for this purpose. For apertures smaller than this, difficulty was encountered in securing a liquid metal flow. Apertures larger than this permitted too great a surface area of liquid metal at the nozzle tip, which could not be satisfactorily atomized using the particular experimental apparatus. It will be appreciated that larger apertures may be achieved by varying the design of the apparatus, with the exercise of no more than routine skill once the present teachings are understood. Liquid metal atomization was captured on video camera, but could only continue for as long as the head of pressure in the reservoir permitted flow of fluid to the nozzle tip. A prelude to atomization could be witnessed as high voltage was increased by either an increase in fluid flow rate, or as a vertex (Taylor Cone)

forming on the surface of the liquid metal at the tip of the nozzle. Although not intending to be bound by any particular theory, it may be that if too long a time elapses between achieving a complete flow of fluid from the reservoir to the nozzle tip and increasing the high voltage from zero to a level sufficient to permit atomization, then satisfactory atomization would not occur. Instead, cooling and oxidation of the free liquid surface would be apparent and the liquid metal would flow downward. The potential difference between the nozzle and the grounded steel base plate was sufficient to increase the liquid flow. Thus, a "pipe" of solidified metal would slowly form down the side of the nozzle assembly until the pressure difference at the reservoir decreased to zero.

Following this approach, the inventors successfully achieved atomization by means of a combination of mechanical and electrical forces. In an exemplary experiment, a plunger was placed over the open end of the reservoir to increase the pressure difference at the nozzle tip. It was found that production of droplets by electrostatic atomization required less potential difference between the electrodes, and droplet sizes were smaller.

In another experiment, the eutectic alloy was removed from the reservoir assembly and was replaced by water. The water was then drained from the assembly, leaving the inner walls wet. The eutectic alloy was then returned to the reservoir and reheated. When liquid metal flow from the nozzle occurred, drops were ejected by the force of steam that was trapped within the nozzle assembly. When a high voltage was applied, the drops became atomized into smaller droplets, some of which adhered to the underside of the CPVC.

Figure 18:
FIGS. 18-25 show various views of a section of CPVC pipe, placed in the assembly of the apparatus of the invention in such a way as to surround the extractor ring and its supporting arm, permitting substantially higher potential differences between nozzle and extractor before arcing and voltage breakdown.
Figure 19:
Figure 20:
Figures 21, 22, 23:
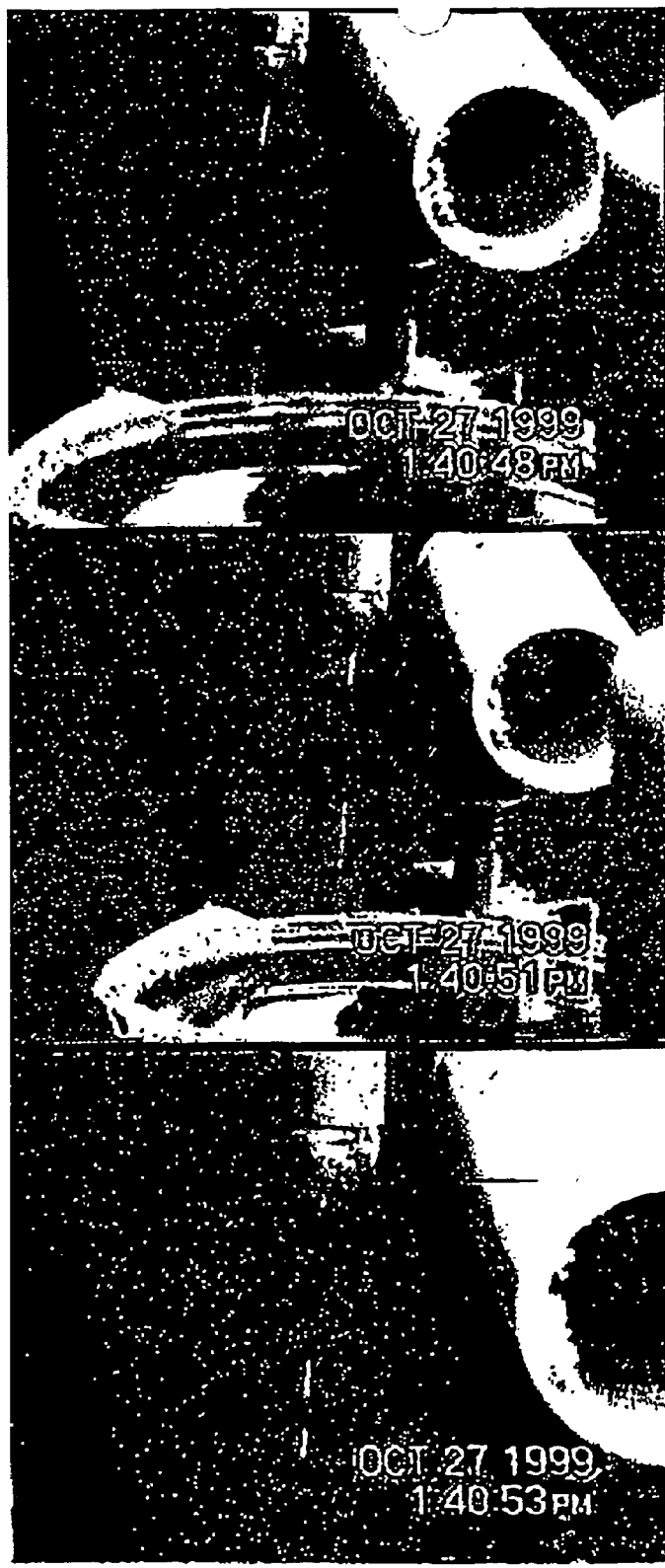
Figure 24:
Figure 25:

FIGS. 18, 19 and 20 show consecutive frames of the atomization of liquid metal against gravity without any applied mechanical force other than that due to the head of liquid in the reservoir. It was found that liquid metal flow in this direction was controlled more easily. Conditions could be created such that a continuous flow of molten metal was produced and nozzle apertures could be much smaller. Nozzles having preferred aperture sizes in the range of about 0.1 mm to about 10 mm, more preferably, about 0.15 mm to about 2 mm, yet more preferably, about 0.15 mm to about 0.4 mm, and even more preferably, about 0.15 mm to about 0.3 mm, most preferably about 0.15 mm, are employed. It was observed in use that gravitational forces alone could not overcome the adhesive forces of surface tension upon the inner walls of the nozzle, and the cohesive forces within the surface of the metal. In such instances, it was found that electrostatic atomization could produce droplets with diameters of substantially smaller magnitude.

The atomized droplets produced without applied external force were substantially larger than the aperture of the nozzle. For example, using a nozzle with an aperture diameter of 0.5 mm and an outer diameter of 1.2 mm, the observed droplet diameter was 1.4 mm. Generally, smaller nozzle sizes permitted the production of smaller drops to be emitted from the nozzle.

Drops produced by gravitational forces alone were irregular in size and are not completely spherical. Droplets produced when electrostatic atomization occurs were found to demonstrate a more regular size distribution and were more nearly spherical. It is believed that gravity acts upon the mass of liquid within the reservoir and nozzle assembly to produce a tendency for liquid flow. Application of high voltage produced a force field which combined with gravity to produce a greater tendency for liquid flow.

The liquid metal drops emitted from the nozzle were charged by electrostatic means. Positioning the extractor electrode in a coplanar position with the tip of the nozzle appeared to produce the strongest field for electrostatic atomization to occur. The application of DC high voltage to a liquid metal source was found to produce atomized droplets. The size distribution of droplets emitted from the nozzle was determined by nozzle size, hydrodynamic and electrostatic forces. If the charge upon the drops was sufficiently high, there was evidence to suggest that they may be subject to binary division by purely electrostatic means. For a nozzle with an outer diameter of 0.64 mm, the measured weight ratio of drops produced without high voltage to those produced with high voltage was approximately 2:1. For a nozzle with an outer diameter of 0.40 mm, the measured weight ratio increased to approximately 4:1.

As the aperture of the nozzle was decreased, the size of the droplets produced decreased rapidly, indicating that the fluid emitted was severed before surface tension forces caused it to adhere to the nozzle tip. These observations suggest that electrostatic forces begin to predominate over mechanical forces. The plume of spray evident in FIG. 24 indicates that liquid metal ionization may have occurred as a result of a Taylor Cone being produced on the surface of the fluid that is being emitted from the nozzle. As electrostatic forces play a more dominant role in the atomization process, a high rise-rate AC signal may be advantageously incorporated into the system to create an extremely efficient method of producing high quality pure metallic grains of similar size.

Example 5

Practical difficulties arise when cooling molten or near-molten metals under low pressures. Heat transfer from a metal surface into a gas medium happens via convection, radiation, and conduction. For many low-pressure and near-vacuum applications, heat transfer by convection is negligible, while radiative heat transfer alone may be insufficient. According to the present invention, a solution is provided to this problem by increasing the effective thermal conductivity of the gas medium by introducing non-equilibrium ionization in the gas medium. This may be carried out at low pressure and under near-vacuum conditions. The non-equilibrium plasma thermal conductivity gain achieved by the present invention was demonstrated by a series of experiments performed in a vacuum chamber which provided comprehensive temperature decay characteristics data under a variety of conditions.

Figure 35:
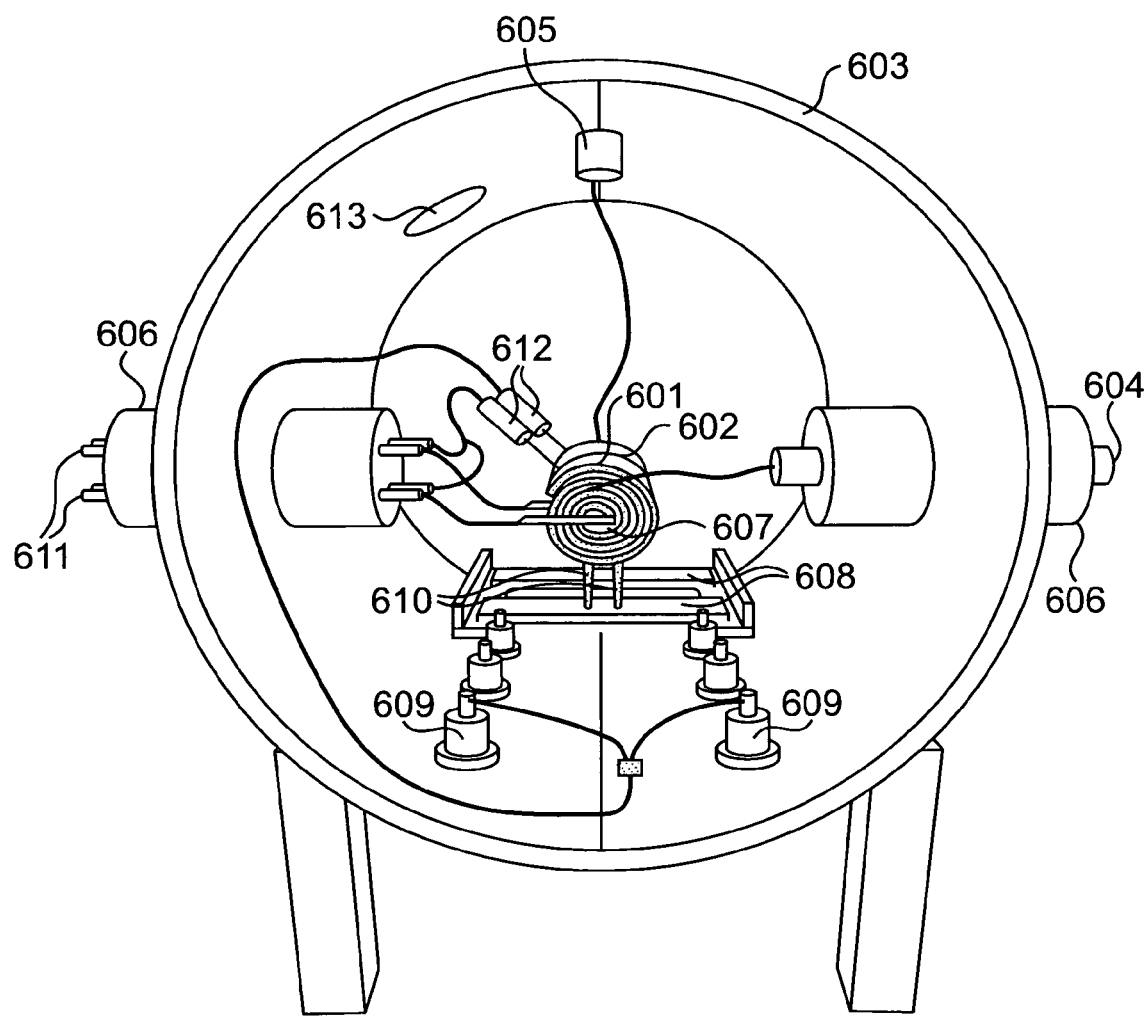
Figure 36:
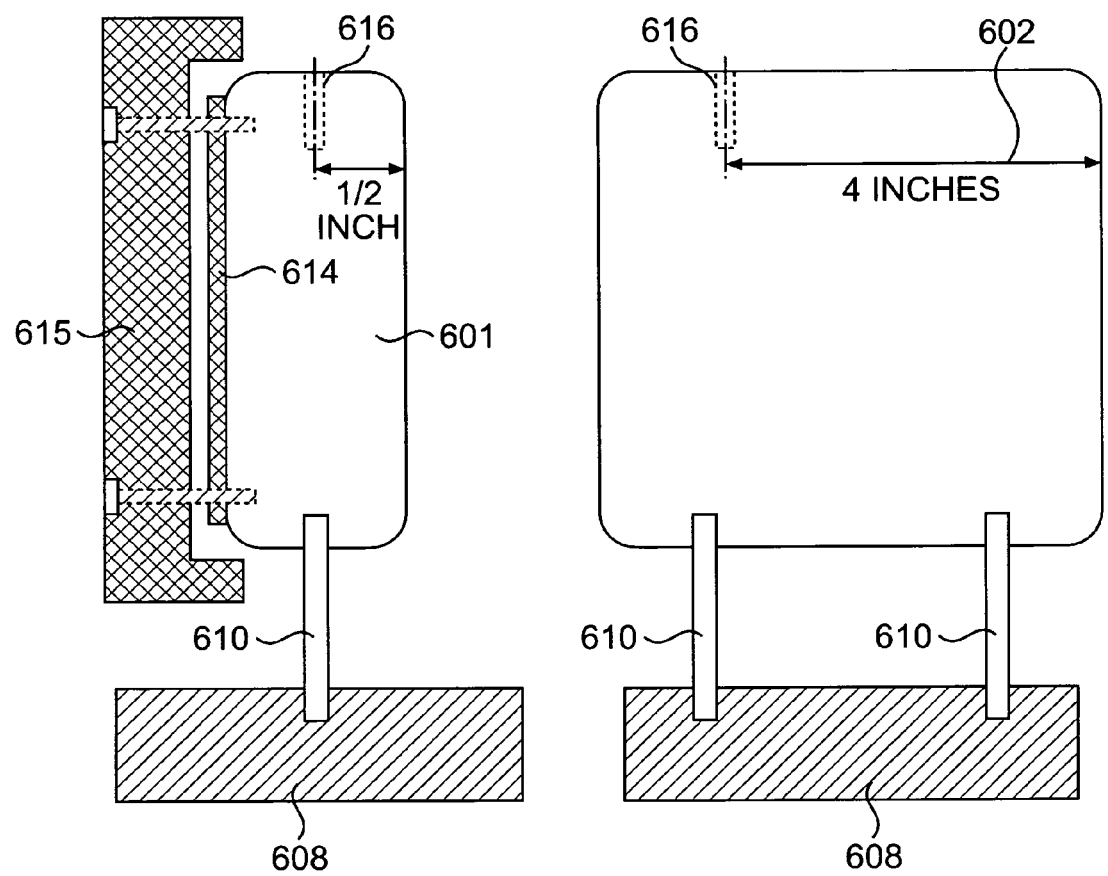

With reference to FIGS. 35-36, a stainless steel disk, Block A 601, was heated using a 1 kW Calrod element 614. A large stainless steel cylinder, Block B 602, was located at a distance of 4 inches from Block A 601 and functioned primarily as an electrode, and secondarily as a heat sink. FIG. 35 shows a schematic diagram of the experimental setup, and FIG. 36 shows the dimensions of the blocks. FIG. 35 shows the vacuum chamber 603, the high voltage connection to Block A 604, the HDPE insulators 606, Block A with Calrod element and ceramic cover 607, the steel bases for Blocks A and B 608, the thermocouple terminals 609, the ceramic tube supports 610, the terminals for the thermocouple and Calrod element 611, the thermocouples 612, the ground connection to Block B 605, and the viewing port 613. FIG. 36 shows the relationship between Block A 601 and Block B 602, the holes for the thermocouples 616, the Calrod element 614, the ceramic cover 615, the ceramic tube supports 610, and the steel bases 608.

This example presents the results of heat transfer gain in a non-equilibrium plasma. In this experiment, an ORAM high voltage power supply (model number DSR 100-100-JTTF, input: 240V AC single phase, 60 Hz, output: 0 to −100 kV rectified) provided the non-equilibrium plasma between the blocks. Throughout all experiments, the Calrod element 614 remained attached to the smaller block A 601, while the larger block B 602 continued to absorb a portion of the heat conducted from block A. Generally, block A 601 was connected to the high voltage negative terminal 604 and block B 602 was grounded 605, although a few experiments were performed to examine the effect of polarity reversal on heat decay.

In order to obtain comprehensive information for study, several variables were introduced into the experimental plan. These included different gases (air, Ar, He), different vacuum pressures (atmosphere, $10^{-1}$ and $10^{-2}$ Torr), different plasma currents (up to 25 mA and/or voltages up to 50 kV), and different spacings between the block faces (1½ inches and 4 inches). For comparison of data, attempts were made to ensure that two parameters were held reasonably constant (1) the initial temperature of block A at the start of the decay process, and (2) the duration of the heat decay measurement process.

A non-intrusive instrument for continuously measuring the temperature of the high-voltage block from outside the cathode was not available. An infrared optical pyrometer obtained for this purpose proved unsatisfactory, hence the necessity of using thermocouples. Even though the voltage control was set low, the high voltage source could unexpectedly generate a short pulse up to 60 kV when first switched on due to the type of circuit used within the control unit, and to the inherent cyclical nature of the high voltage generator.

Thermocouples were successfully employed to measure the temperatures of the two blocks. However, the temperature of the high voltage block (cathode) could not be monitored continuously. Instead, the high voltage was switched off at five minute intervals during which temperatures were recorded from digital multimeters with thermocouple module attachments. The meter arrangement was then disconnected from access terminals protruding from the side of the vacuum chamber, and the high voltage was again switched on. This measuring procedure meant that the high voltage was disconnected once for a period of approximately 35 to 40 seconds during each five minute interval. The Calrod heating element remained disconnected during all heat decay measurements. Therefore, it presented no obstacle to high voltage plasma production.

The complete experimental procedure in air contained the following stages. The vacuum chamber was pumped down to approximately $10^{-4}$ Torr. The Calrod heater for block A was switched on while the pump cycle continued. The heater was switched off close to the required initial temperature for start of decay measurements. Pumping down of the vacuum chamber was continued until the desired pressure was reached. The foregoing steps were repeated until the desired pressure and initial temperature were reached.

Thereafter, the heater was switched off and the initial t=0 details of block A temperature, block B temperature, vacuum chamber's top skin temperature, and vacuum chamber pressure were immediately recorded. The high voltage block (cathode) thermocouple meter arrangement was disconnected. The exposed terminals were covered with an insulator cap. The high voltage controller was switched on and smoothly brought it to the required voltage or current. Each minute thereafter, the grounded block temperature, vacuum chamber top skin temperature, vacuum pressure, applied voltage (in kV) and current (mA) displayed on the high voltage control panel were monitored. At five minute intervals, switched off the high voltage supply was switched off, the insulating cap was removed, all terminals exposed from the cap area were briefly grounded, and the thermocouple meter arrangement was connected as described above. This was continued for an elapsed time of 131 minutes.

For experiments in insert gas, one skilled in the art would recognize that the pumping and heating steps would have to be modified slightly to ensure the chamber was filled with gas, and that pressures higher than required were not attained.

In order to test all instruments, plasma tests were carried out in air at atmospheric pressure. This served several purposes: (i) the vacuum chamber door could be left open for observation of plasma or arcing, (ii) the high voltage equipment could be used without the background noise of vacuum pumps, etc., for detection of voltage breakdown, and (iii) the lighting could be dimmed for better observation of the experimental area.

Figure 37:
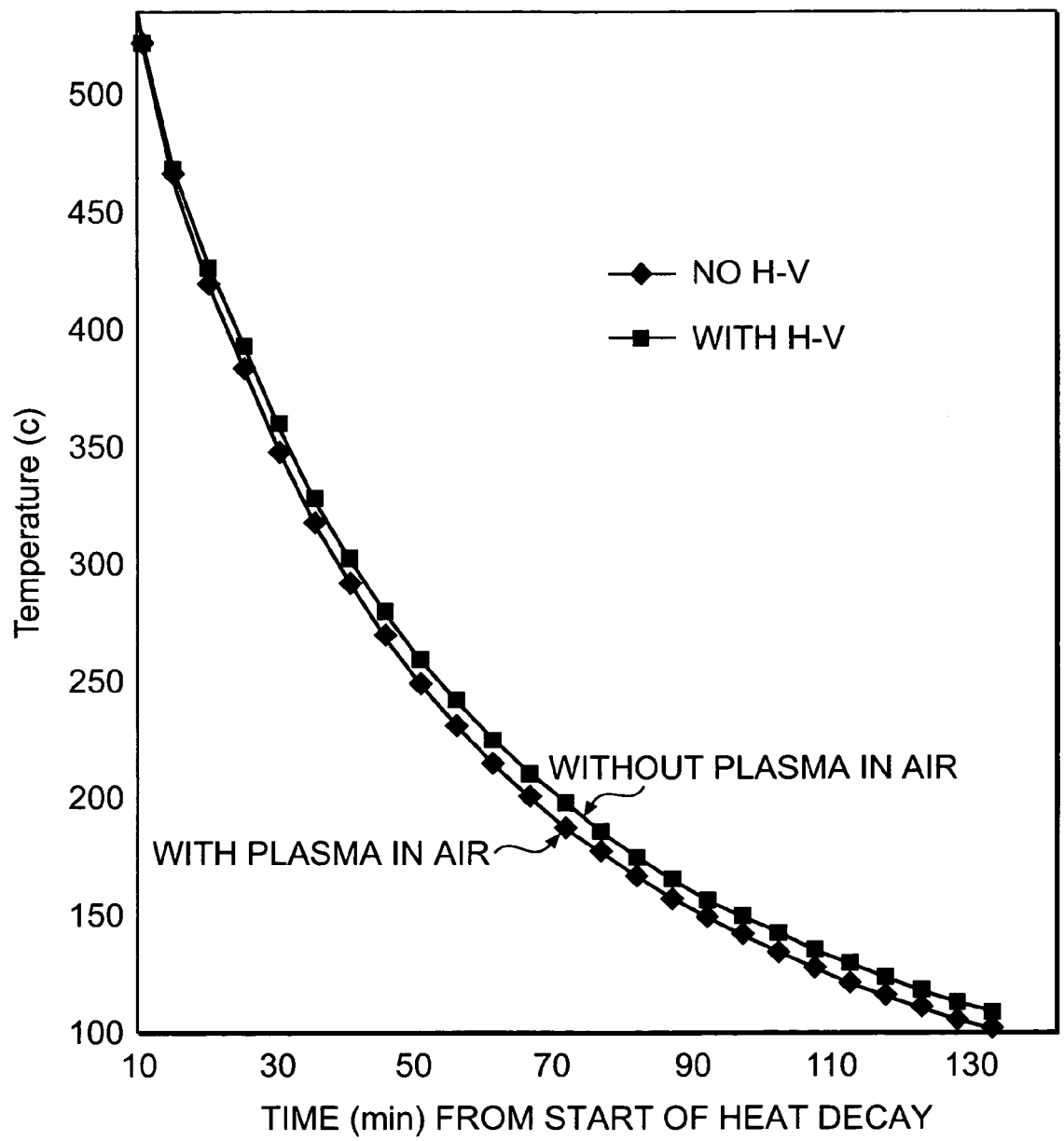

The non-equilibrium plasma was first witnessed when the gap between the block faces was 1½ inches and the voltage was in the 41 kV to 47 kV range. The non-equilibrium plasma was poorly visible, being blue-green in color, and was localized and faint. Attempts to increase the current to a steady flow above 1 mA to achieve more brightness resulted in arcing problems and voltage breakdown. 51 kV was found to be the maximum voltage that could be applied for steady experimental results, but current flow was less than 0.5 mA, i.e., lower than the multimeter's detection threshold. The non-equilibrium plasma was being produced and was accompanied by a sizzling "boiling oil" sound which began at approximately 27 kV. FIG. 37 demonstrates the results when 51 kV was applied in air at atmospheric pressure.

Attempts to place two point sources (spike) in block B (grounded block) in an effort to improve the visible non-equilibrium plasma volume were ineffective and were not continued. Non-equilibrium plasma was created at the point tips from 34 kV, being faint blue-green color. The two spikes were removed after these initial tests and not used again.

Figure 38:
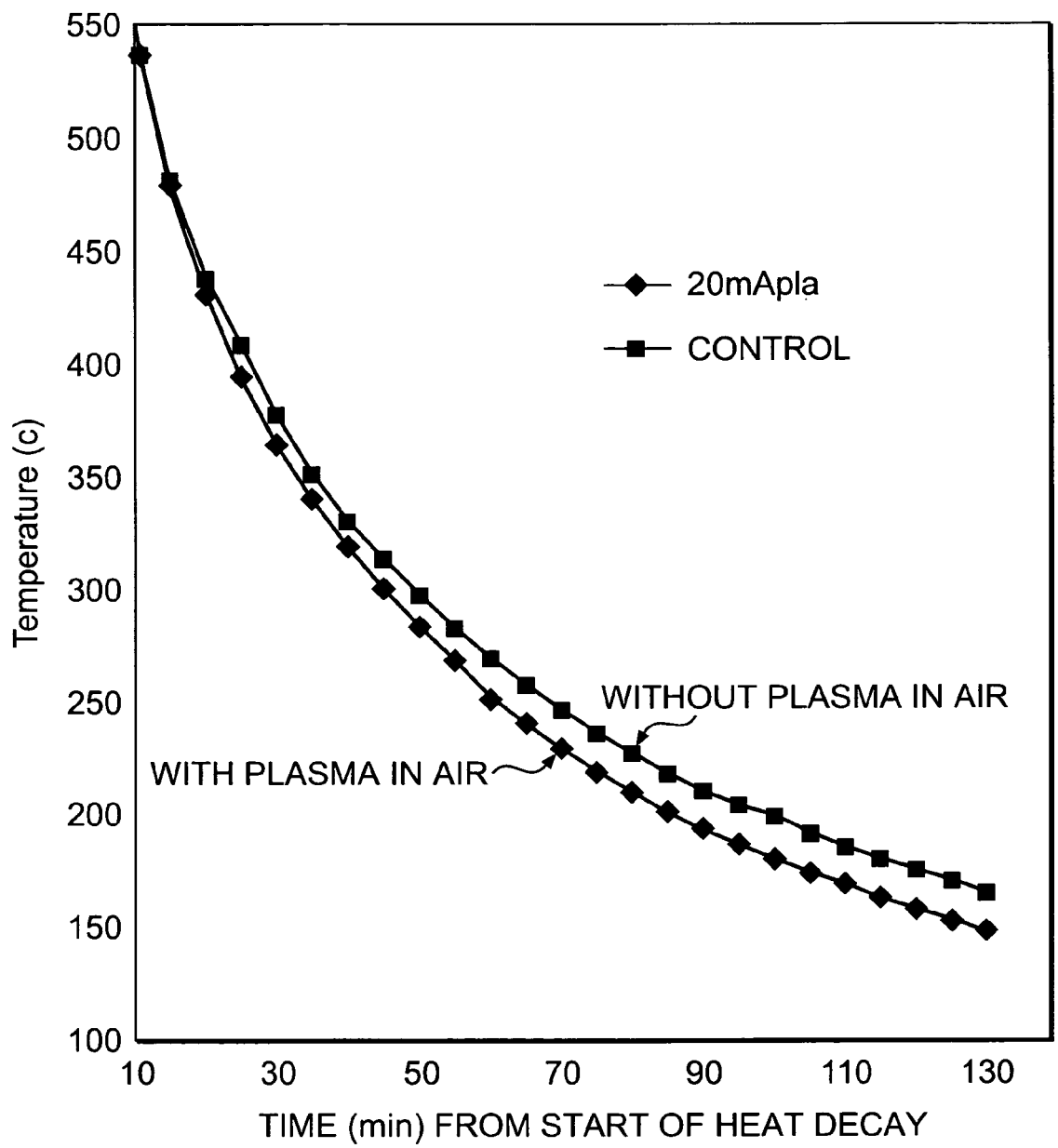
Figure 39:
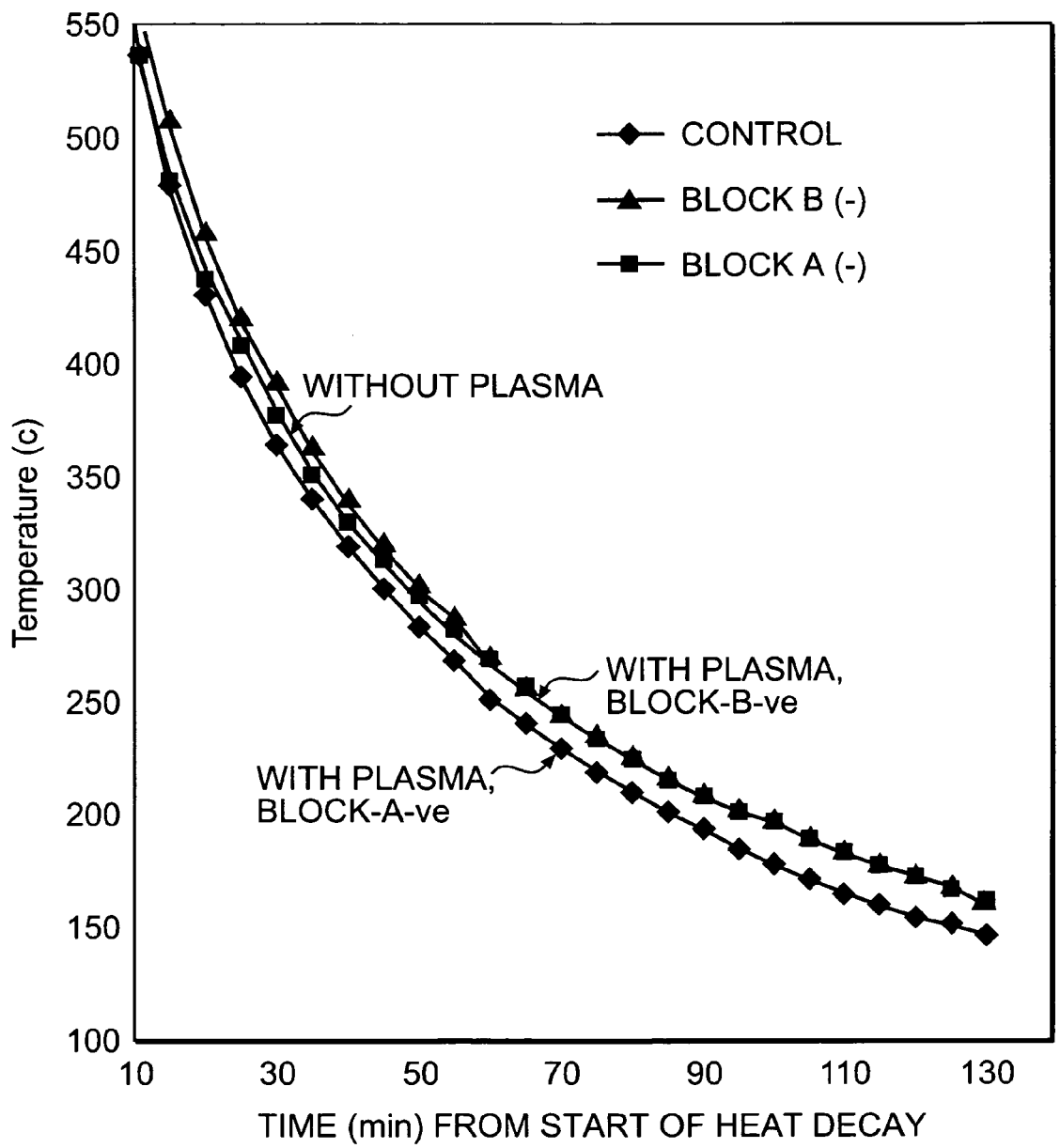

The first tests in partial vacuum were conducted with all other conditions being the same. A CCD camera was fixed to the window of the vacuum chamber so that the non-equilibrium plasma could be monitored throughout the experiment, and video recorded when desired. The chamber was pumped down and kept at a steady pressure of $10^{-1}$ Torr. At this pressure, extensive non-equilibrium plasma was easily created with voltages less than 1 kV. A steady purple color was visible and an initial experiment was conducted with approximately 20 mA current. FIG. 38 demonstrates the results achieved during this trial. In order to investigate how temperature decay changes, the polarity of the blocks are reversed, the wiring of the block was changed. Block A was grounded and the larger block B was connected to the negative high voltage terminal. All other conditions remained the same, except that the thermocouples were interchanged for safety reasons. The experimental run was then repeated. The non-equilibrium plasma that was formed was extensive, purple, and was captured on videotape. FIG. 39 compares the temperature decay data when block A acted as cathode, against the result when polarity was reversed and block B acted as cathode.

For the remainder of the experimental study, the heated block A was kept at negative potential while the passive block B remained grounded. The gap between the block faces was next increased to 4 inches, and the resulting effect was examined. This proved to be a more convenient gap to work with because the larger spacing meant that greater plasma currents, hence greater electron densities, could be achieved without arching, and the plasma region was more visible through the viewing window. This became more important at lower pressures, when the optically bright part of the plasma occupied only a portion of the space between the blocks.

Figure 40:
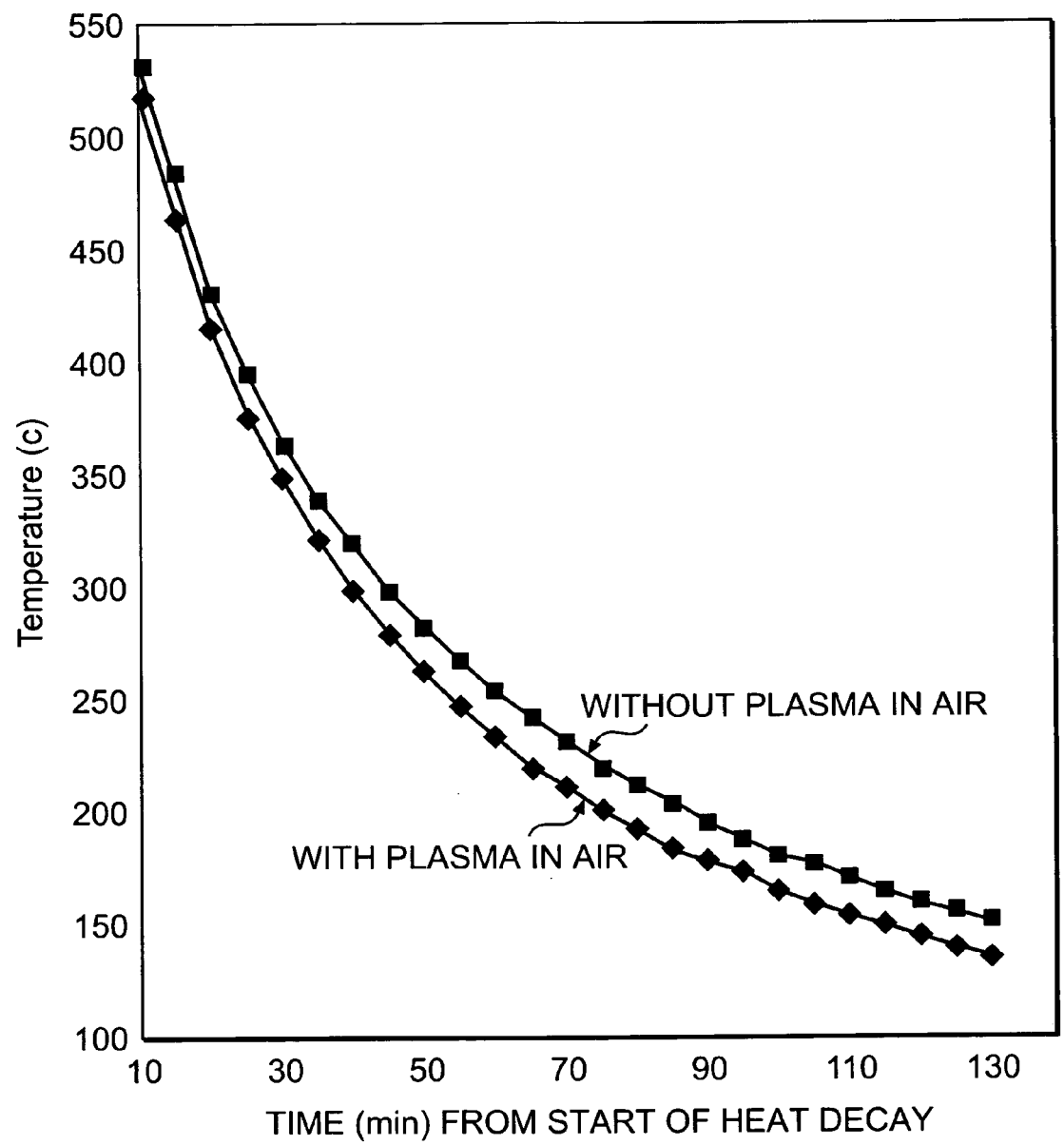
Figure 41:
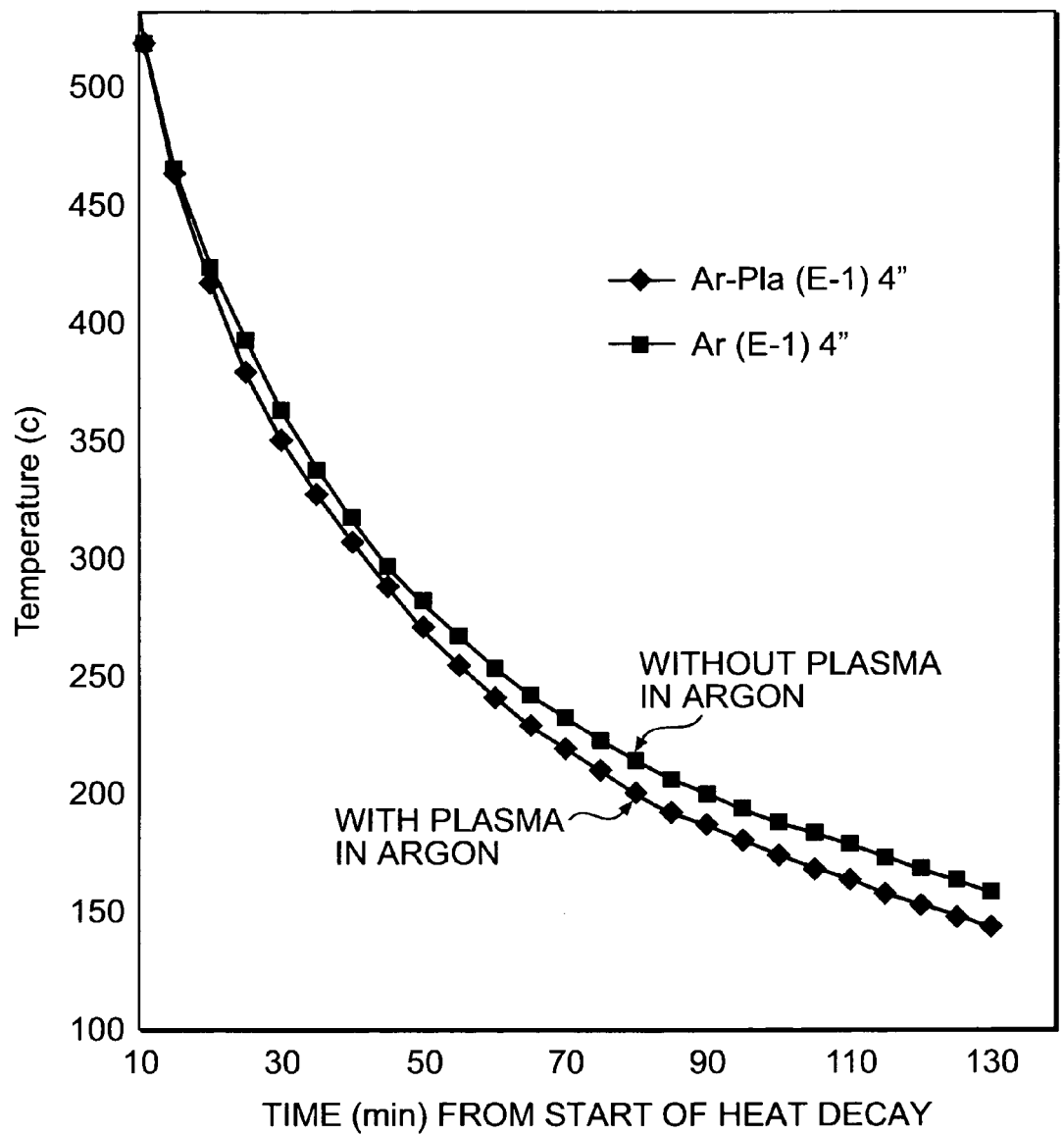
Figure 42:
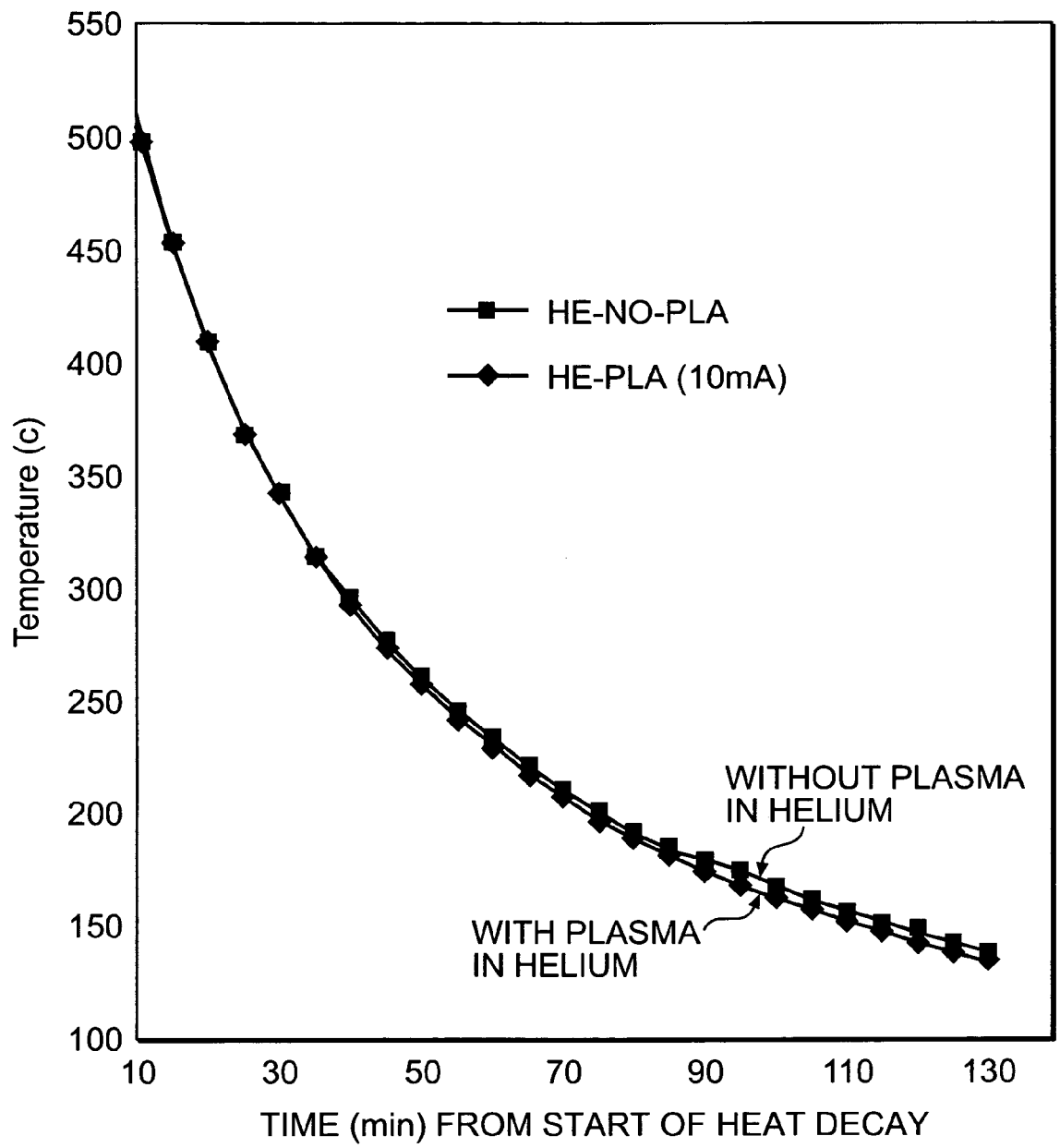

The majority of the remaining tests were therefore carried out with the 4 inch gap. By reasoning similar to the above, a larger gap (e.g., 8 inches) may have provided even better results, but internal constraints within the vacuum chamber prevented this. Given the limitations of the equipment and geometric constraints, the 4 inch gap proved most practical. FIGS. 40-42 show the temperature decay curves in non-equilibrium plasma air, argon, and helium using the 4 inch gap, placed along with the coated decay curves.

Figure 43:
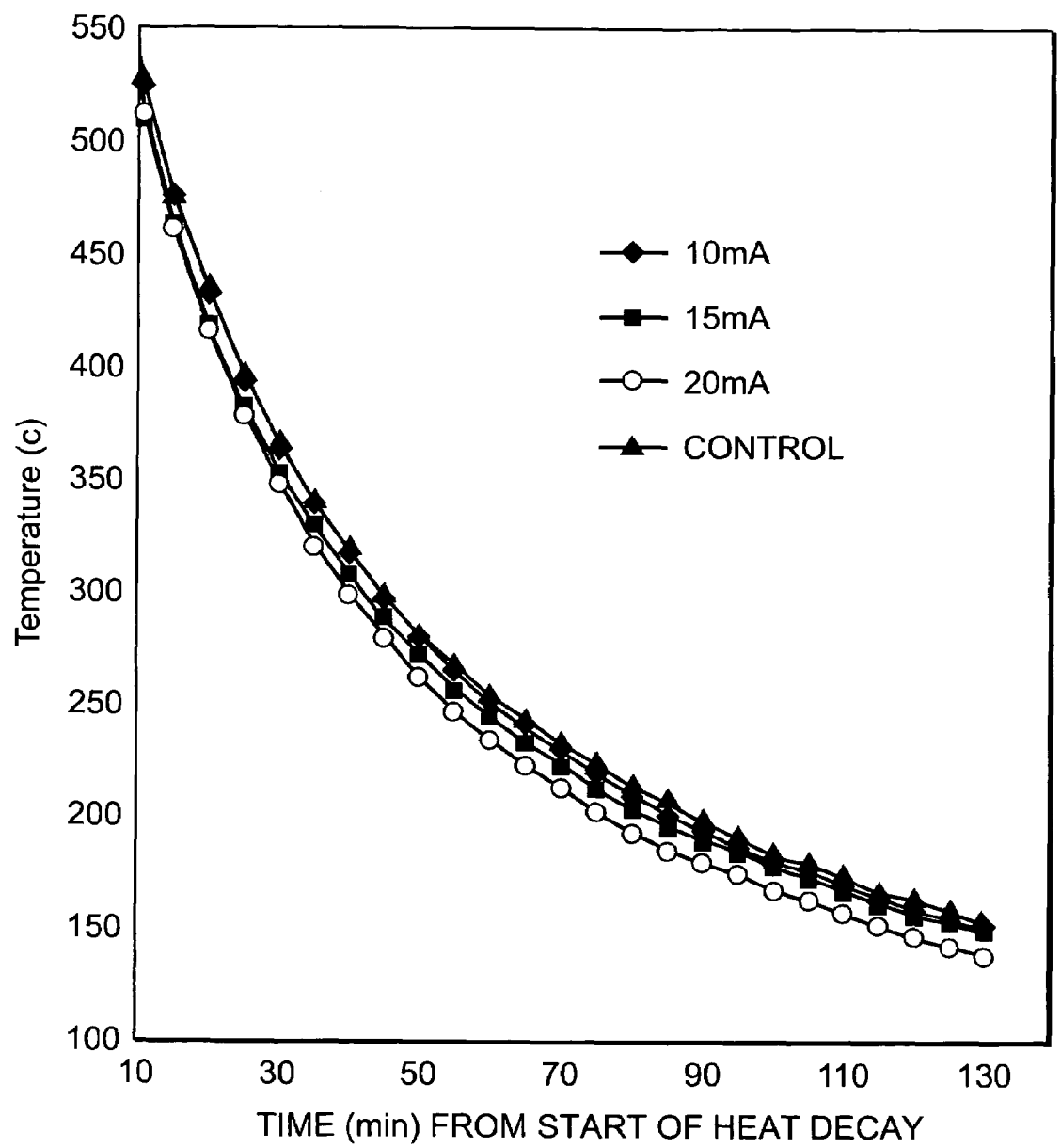

Since the non-equilibrium plasma heat decay in air at $10^{-1}$ Torr demonstrated results comparable with the best of the other gas media tested, air was chosen as the medium to examine the effect of varying current on the heat decay process. Tests were conducted at 10, 15, 20, and 25 mA non-equilibrium plasma currents. Unfortunately, limitations of the high voltage power supply controller resulted in frequent arcing and voltage breakdowns, affecting data acquisition process. As a result, some of the experimental trials were not run to completion. FIG. 43 compares the heat decay curves at $10^{-1}$ Torr for various non-equilibrium plasma currents.

Feasibility tests in air at pressure less than $10^{-1}$ Torr (e.g., $10^{-2}$, $10^{-3}$ Torr) suggest that higher voltages are required to produce similar non-equilibrium plasma currents. The low pressure tests also demonstrated that the non-equilibrium plasma structure within the block gap resembled the classical discharge model, with glow column and Faraday dark space becoming more apparent as pressure was decreased. Due to the limitations of the equipment, maintaining a constant current at the lower pressures proved to be more difficult, and the arcing problem became more pronounced.

Figure 44:
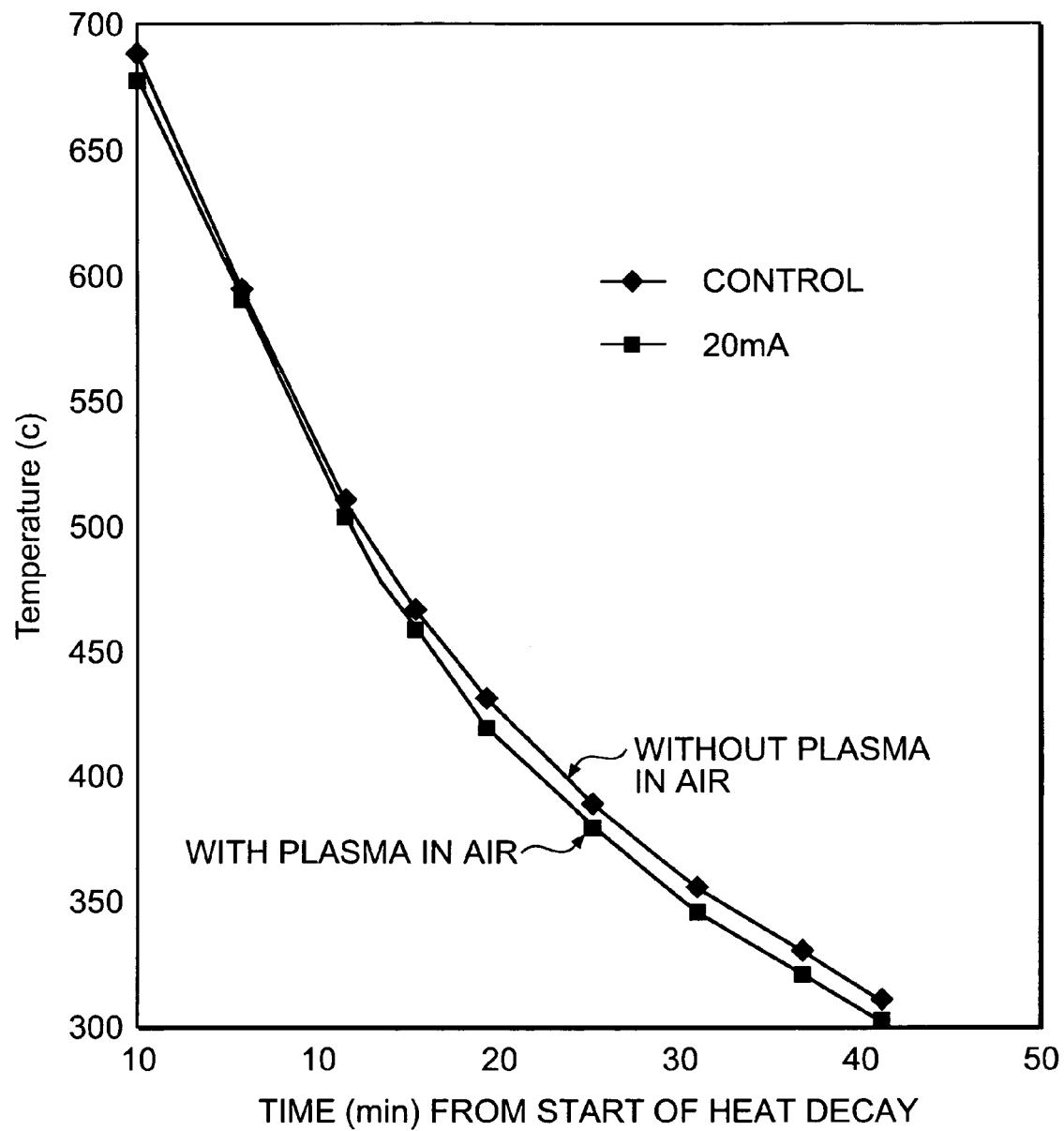
Figure 45A:
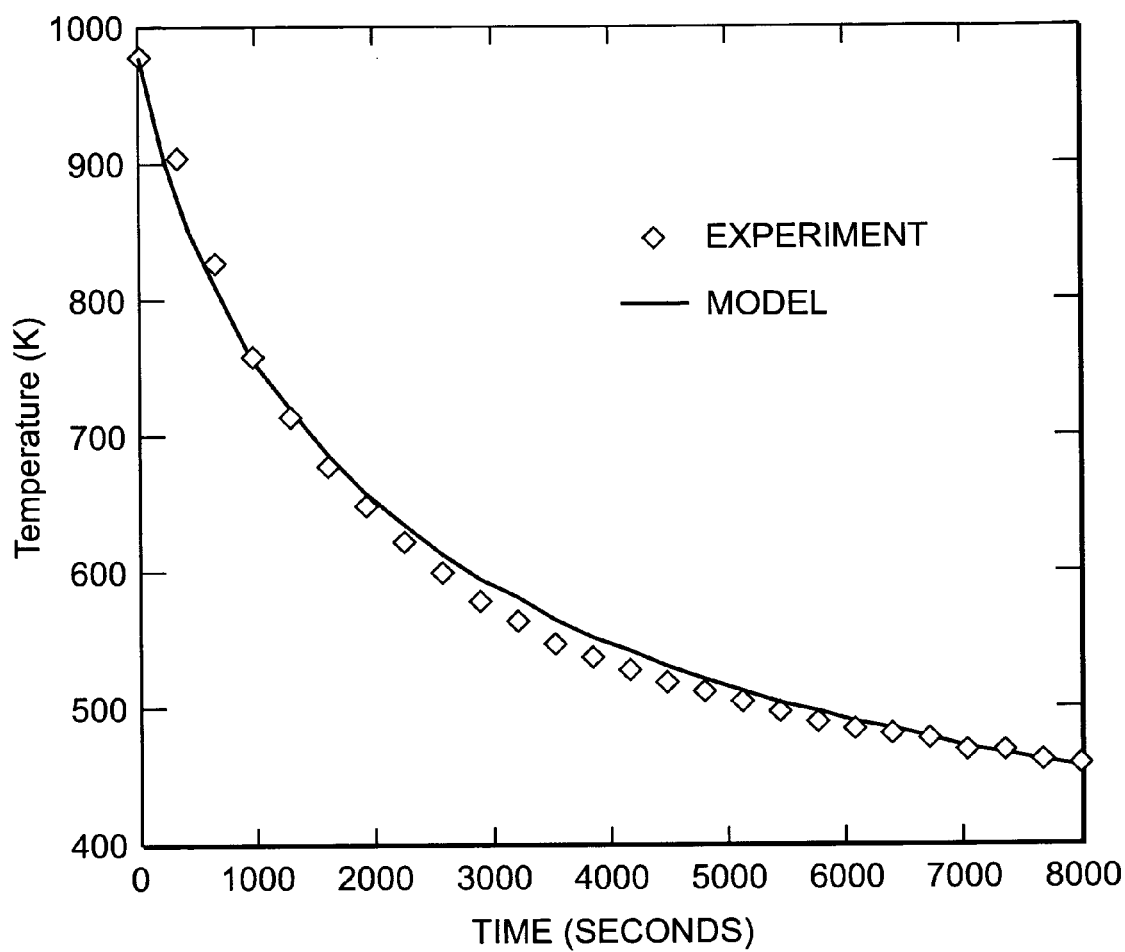
Figure 45B:
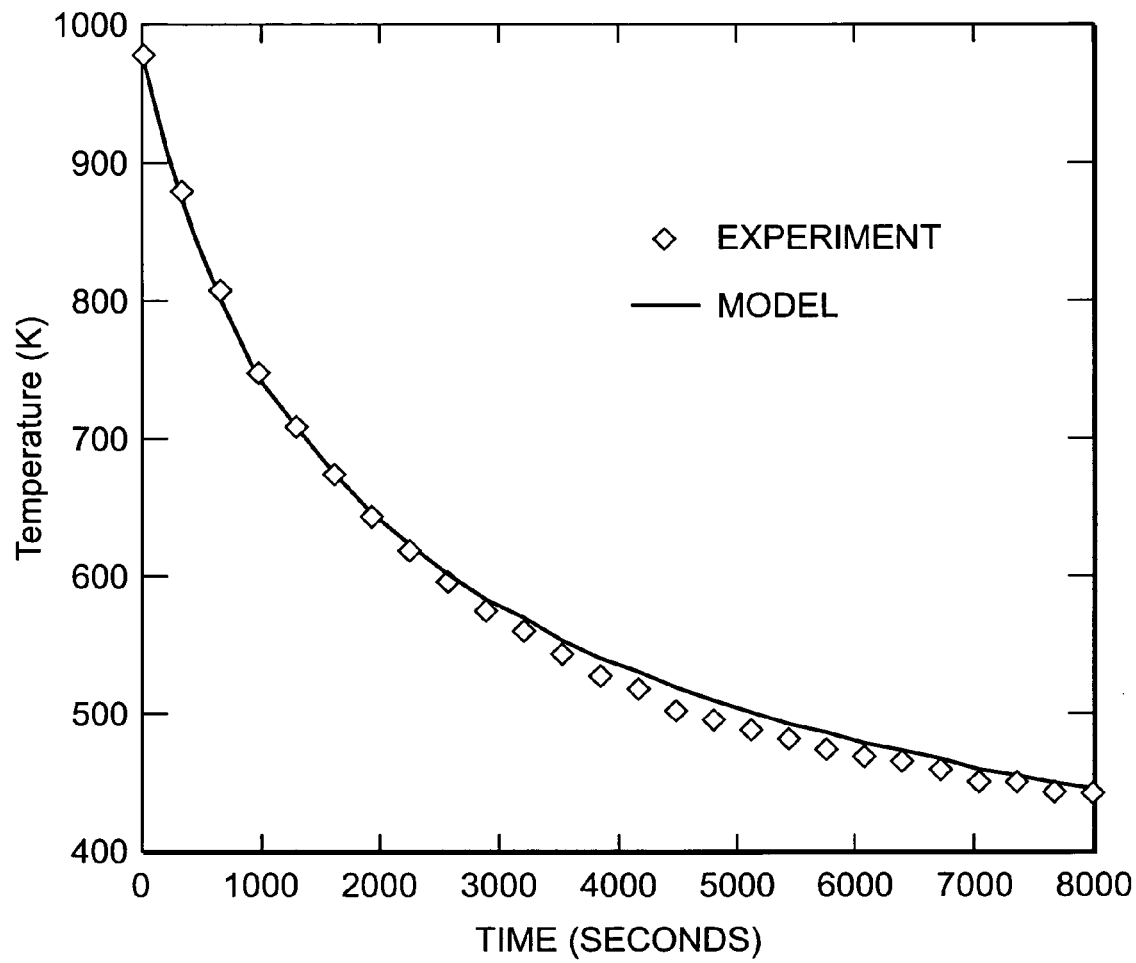

FIG. 44 shows a graph of the data collected for air at $10^{-2}$ Torr. Although arcing was again a persistent problem, and the data collection run was cut short to 40 minutes, it does provide further evidence of the trend of increased heat transfer with increased current, even at these low pressures.

The experimental results are summarized in the graphs FIGS. 37-44. The following is a discussion of some of the features of these graphs. A parameter called the heat transfer gain coefficient ($\gamma$) is introduced to explain the graphs. In considering a time dependent heat transfer problem where a metal block is giving up heat through a thermally conductive neutral gas medium, the heat decay curve will be determined by the thermal diffusivity ($\alpha$), where $\alpha = \lambda \div (C\rho)$. C is the heat capacity of the medium at constant pressure, $\lambda$ is the thermal conductivity, and $\rho$ is the density of the medium.

In considering a different gas medium, with conductivity $\lambda'$, heat capacity $C'$ and density $\rho'$, then $\alpha' = \lambda' \div (C'\rho')$. The heat transfer gain coefficient between these two systems is defined as $\gamma = \alpha' \div \alpha$.

In considering the case of a neutral gas versus a non-equilibrium plasma, for the case of a non-equilibrium plasma with a small ionization fraction $\chi < 0.1$, the presence of electrons hardly affects the density of the gas, so $\rho' \approx \rho$.

In considering heat capacity, the molar heat capacity of electrons is extremely small with calculated via Fermi Dirac statistics (Sears, *An Introduction to Thermodynamics, the Kinetic Theory of Gases and Statistical Mechanics,* 2nd Ed., Addison-Wesley, pages 335-337 (1959)). So the contribution of the electrons to $C\rho$ can be ignored as a first approximation. Likewise the contribution of the ionic heat capacity can also be ignored, again owing to the small ionization fraction. Essentially, this reveals $C' \approx C$. The gain coefficient becomes $\gamma = \lambda' \div \lambda$.

Since all other system parameters are the same between the two systems (e.g., pressure, metal composition, radiative heat flux, etc.), there really is no other mechanism by which heat decay time can increase or decrease other than by gain change $\gamma > 1$ or $\gamma < 1$ between the two systems. In other words, $\gamma > 1$ implies an increase in the thermal conductivity of the gas medium. The gain coefficient is a convenient way of comparing systems with exactly same geometries and similar gas chemistry, only difference being the introduction of non-equilibrium ionization. If $\gamma > 1$ between two systems then there is a gain in thermal conductivity due to non-equilibrium ionization. If $\gamma < 1$ then there is a net decrease in thermal conductivity due to non-equilibrium effects.

FIGS. 37, 38, 40, 41 and 44 all clearly exhibit (>1, such that the non-equilibrium plasma effect has been clearly demonstrated and verified by these data sets. The effect is most obvious in FIGS. 38, 40 and 41.

FIG. 42, which is a graph of the data for helium at $10^{-1}$ Torr is very interesting. At first one may be tempted to infer that the effect is practically nonexistent for He, but that would be a hasty judgment. In fact, this data set is direct evidence for the theoretical mechanism of nonequilibrium plasma conductivity gain. Consider the data presented in FIG. 41 for argon, and FIG. 42 for helium, both of which are under comparable pressures and applied power. Ignoring the ionic contribution to 8 as negligible, the gains for these data sets can be written respectively as $\gamma_{41} = (\lambda_{Ar} + \lambda_e) \div \lambda_{Ar}$ and $\gamma_{42} = (\lambda_{He} + \lambda_e) \div \lambda_{He}$, respectively. The primary factors that affect the gain in thermal conductivity $\lambda$ are the density of the electrons $n_e$, and the electrons' temperature $T_e$. For midrange and large ionization fractions $\chi$, $\lambda_e$ starts to dominate over the thermal conductivity of heavy ions and heavy neutrals. In view thereof, a gain in the overall gas thermal conductivity is expected when electrons are supplied at an elevated temperature via a non-equilibrium plasma or corona discharge.

The clear gain visible in FIG. 41 suggests that $\lambda_e$ is not negligible for the argon case. Now, the first ionization potential for argon is about 15.3 electron volts, but for helium it is 35 electron volts (Cobine, *Gaseous Conductors,* Dover Publications (1958)). Considering that ionization kinetics are exponentially dependent on ionization potential, it is entirely reasonable to assume that applied power to argon will produce more ionization than the same power applied to helium under similar conditions. Therefore, $\lambda_e$ for helium should be less than $\lambda_e$ for argon. Also $\lambda_{He}$ is an order of magnitude larger than $\lambda_{Ar}$ to begin with, so the combined effects give $\lambda_{42} <<< \lambda_{41}$, which is clearly the case when the data in FIG. 42 is compared to FIG. 41. The practical implications of this are as follows: if it is necessary to use helium as the working medium, the power supply should be modified to compensate for helium's high ionization potential.

Concerning FIG. 39, this data set exhibits another interesting phenomenon. Considering FIG. 39, it is clear that the gain $\gamma$ is actually a function of plasma current. That $\gamma$ increases with current is not surprising, since higher currents lead to larger probabilities of collisional and cascade ionization, finally leading to higher values of electron density $n_e$ and ionization fraction $\chi$. What is surprising is the reversal of $\gamma$, i.e., $\gamma < 1$ when the polarity of blocks A and B are reversed, as can be seen in FIG. 39. In order to gain insight into this peculiar polarity preference of $\gamma$, the full 3×3 thermal conductivity tensor must be considered and it must be determined how the components of this tensor depend on the direction of the applied external electric field vector (Hasse, *Thermodynamics of Irreversible Processes,* Dover Publications). This polarity anisotropy may have significant value in applications where one would like to control the anisotropy of the thermal conductivity.

TABLE 1

|  | Zone 1 | Zone 2 | Zone 3 | Zone 4 | Zone 5 | Zone 6 |
|---|---|---|---|---|---|---|
| Description | neutral | neutral | alpha | beta | neutral | gamma |
| Voltage | none | none | 20-30 kV | 35-40 kV | 10-2 kV decaying | 12-25 kV |
| Current | none | none | 45-100 mA | 4-7 mA | 0 mA | 6-16 mA |
| Estimated Wattage | none | none | 2000 W | 245 W | none | 198 W |
| Start Time Stamp | 5:00 | 11:00 | 22:11 | 25:02 | 30:00 | 42:17 |
| Stop Time Stamp | 8:00 | 14:00 | 24:10 | 28:01 | 33:00 | 45:06 |
| Elapsed Frames | 90 | 90 | 59 | 89 | 90 | 79 |
| Positive Frames | 7 | 17 | 35 | 35 | 13 | 25 |
| % Positive Frames | 7.8% | 18.9% | 59.3% | 39.3% | 14.4% | 31.6% |

TABLE 2

A set of experimental data for liquid wood's metal atomization

| | | | PARENT DROPS | | | FIRST STATE OF ATOMIZATION | | | SECOND STAGE OF ATOMIZATION | | | | |
|---|---|---|---|---|---|---|---|---|---|---|---|---|---|
| Extractor to source distance (mm) | Applied Voltage (keV) | current (mA) | No. of parent drops (x1) | weight of drops (x2) (gm) | weight of one drop (x3) (gm) (x2/x1) | no. of daughter droplets (y1) | weight of droplets (y2) (gm) | weight of one droplet (y3) (dm) (y2/y1) | no. of daughter droplets (z1) | weight of droplets (z2) (gm) | Weight Of one droplet (z3) (gm) (z2/z1) | Ratio of weight x3/y3 | Ratio of weight x3/z3 |
| 0 | 22-25 | | 10 | 0.255 | 0.025 | 86 | 0.608 | 0.0069 | | | | 4 | |
| 0 | 20 | | 10 | 0.191 | 0.018 | 50 | 0.224 | 0.0048 | | | | 4 | |
| 5 | 20 | | 30 | 0.289 | 0.009 | 60 | 0.279 | 0.0046 | | | | 2 | |
| 5 | 25 | | 8 | 0.163 | 0.021 | 60 | 0.293 | 0.0048 | | | | 4 | |
| 10 | 25 | | 7 | 0.186 | 0.019 | 80 | 0.366 | 0.0045 | | | | 4 | |
| 15 | 20 | | 4 | 0.081 | 0.021 | 80 | 0.384 | 0.0048 | 4 | 0.005 | 0.0012 | 4 | 16 |
| 15 | 20 | | 4 | 0.081 | 0.021 | 80 | 0.384 | 0.0048 | 4 | 0.005 | 0.0012 | 4 | 16 |
| 20 | 25 | 0.035 | 17 | 0.304 | 0.018 | 109 | 0.522 | 0.0047 | 4 | 0.008 | 0.0012 | 4 | 15 |
| 30 | 28 | 0.048 | 15 | 0.299 | 0.021 | 146 | 0.746 | 0.0051 | | | | 4 | |
| 35 | 29.5 | 0.048 | 11 | 0.211 | 0.019 | 100 | 0.489 | 0.0048 | 5 | 0.003 | 0.0006 | 4 | 32 |
| 68 | 38 | | 3 | 0.061 | 0.021 | 67 | 0.334 | 0.0049 | 7 | 0.007 | 0.0011 | 4 | 20 |

Notes:
(1) Parent drop means mechanical drop without electrostatic field.
(2) Extractor Type: bare copper wire and 5.2 cm ring diameter.

TABLE 3

A set of experimental data for liquid wood's metal atomization

| | | | PARENT DROPS | | | FIRST STATE OF ATOMIZATION | | | SECOND STAGE OF ATOMIZATION | | | | |
|---|---|---|---|---|---|---|---|---|---|---|---|---|---|
| Extractor to source distance (mm) | Applied Voltage (keV) | current (mA) | No. of parent drops (x1) | weight of drops (x2) (gm) | weight of one drop (x3) (gm) (x2/x1) | no. of daughter droplets (y1) | weight of droplets (y2) (gm) | weight of one droplet (y3) (dm) (y2/y1) | no. of daughter droplets (z1) | weight of droplets (z2) (gm) | Weight Of one droplet (z3) (gm) (z2/z1) | Ratio of weight x3/y3 | Ratio of weight x3/z3 |
| 15 | 16 | 0.014 | 7 | 0.136 | 0.019 | 139 | 0.66 | 0.0047 | 6 | 0.013 | 0.0021 | 4 | 8 |
| 15 | 16 | 0.014 | 20 | 0.398 | 0.021 | 129 | 0.647 | 0.0051 | 11 | 0.023 | 0.0021 | 4 | 9 |
| 15 | 16 | 0.017 | 14 | 0.254 | 0.025 | 113 | 0.572 | 0.0051 | 4 | 0.007 | 0.0017 | 4 | 10 |
| 15 | 17 | 0.018 | 10 | 0.195 | 0.021 | 224 | 1.111 | 0.0049 | 5 | 0.006 | 0.0012 | 4 | 16 |
| 15 | — | — | 73 | 1.454 | 0.021 | 58 | 0.267 | 0.0049 | 51 | 0.107 | 0.0021 | 4 | 10 |
| 15 | 17 | 0.014 | 4 | 0.084 | 0.021 | 161 | 0.905 | 0.0051 | 4 | 0.007 | 0.0017 | 4 | 12 |

Notes:
(1) Parent drop means mechanical drop without electrostatic field.
(2) Extractor Type: bare copper wire and 9 cm ring diameter.

Each patent application and publication referenced herein is hereby incorporated by reference herein in its entirety.

Various modifications of the invention, in addition to those described herein, will be apparent to one skilled in the art from the foregoing description. Such modifications are also intended to fall within the scope of the appended claims.

Example 6

Practical difficulties arise when cooling molten or near-molten metals under low pressures. Heat transfer from a metal surface into a gas medium happens via convection, radiation, and conduction. For many low pressure and near-vacuum applications, heat transfer by convection is negligible, while radioactive heat transfer alone may be insufficient. One solution to this problem is to increase the thermal conductivity of the gas medium in a non-intrusive manner by introducing nonequilibrium ionization in the gas medium. In order to study this nonequilibrium plasma thermal conductivity gain, a series of control experiments were performed in a vacuum chamber to establish comprehensive background data for temperature decay characteristics under a variety of conditions.

Collisions between species is the mechanism by which transport processes occur in gases. As such the fundamental quantities are the collision cross sections. Consider ionized Argon with three species: i, a, e, signifying heavy ions, heavy neutrals, and electrons, respectively. Furthermore consider the gas to be in thermal nonequilibrium between the heavy species and the electrons: i.e., the heavy particles are thermalized at a temperature $T_a=T_i=T_r$, while the electrons are thermalized at $T_e>T$. The following are collision cross section models for the case of low pressure and low electron density. $Q_{xy}$ denotes the collision cross section between species x and species y. These expressions for cross section can be adapted to cover higher $n_g$ regimes by working with tabulated data in:

$$Q_{pn}=3.6\times10^{-4}\,T_e - 0.1)\times10^{-20} \tag{1}$$

$$Q_{aa}=1.7\times10^{-16}\,T^{-0.25} \tag{2}$$

$$Q_{ia}=2.45\times10^{-18}\,T^{-0.9} \tag{3}$$

$$Q_{ii} = 2\pi\left(\frac{e^2}{12\pi\varepsilon_0 kT}\right)^2 \ln\left(\frac{1}{12\pi n_i}\left(\frac{12\pi\varepsilon_0 kT}{e^2}\right)^3\right) \tag{4}$$

$$Q_{ei} = \pi\left(\frac{e^2}{12\pi\varepsilon_0 kT}\right)^2 \ln\left(\frac{1}{4\pi n_e}\left(\frac{4\pi\varepsilon_0 kT}{e^2(1+Ta/T)}\right)^3\right) \tag{5}$$

where e is the electron charge, eo is the permittivity of vacuum, k is Boltzmann's constant, and $n_i$, $n_e$ are the ion and electron number densities. All units are MKS. Electron-electron collision are ignored in the small $\chi$ (ionization fraction) approximation.

Collision frequencies can be obtained by combining the relations (1), (6) with the Maxwellian velocities of each species:

$$v_e = u_e(n_i Q_{ei} + n_a Q_{aa}) \tag{6}$$

$$v_i = u_i(n_e Q_{ei} + n_a Q_{ia} + n_a Q_{ii}) \tag{7}$$

$$v_a = u_a(n_i Q_{ia} + n_e Q_{ea} + n_a Q_{aa}) \tag{8}$$

$$u_k = \sqrt{\frac{8kt_k}{\pi nk}}\,;\,k=i,a,e. \tag{9}$$

Thermal conductivity in terms of the collision frequencies is the sum of the contributions from all three species:

$$\lambda = \lambda_a + \lambda_i + \lambda_e \tag{10}$$

where $$\lambda_o = \frac{75\sqrt{2}\,k^2 T}{32 m_a}\frac{n_a}{v_a} \tag{11}$$

$$\lambda_i = \frac{75\sqrt{2}\,k^2 T}{32 m_i}\frac{n_i}{v_i} \tag{12}$$

$$\lambda_e = \frac{2k_1 k_2 k^{-2} T_e}{m_e}\frac{n_e}{v_e} \tag{13}$$

and $K_1$, $K_2$ are kinetic correction factors typically in the range of $1.16 \leq K_i \leq 2.8$ and $0.3 \leq K_2 \leq 1.5$. When the ionization fraction is zero, the model gives the usual values of thermal conductivity for neutral Argon.

From equations (10)-(13) the primary factors that affect the gain in thermal conductivity λ are the density of the electrons $n_e$, and their temperature $T_e$. For midrange and large $\chi\lambda_e$ starts to dominate over the other terms in (10). Based on this a gain is expected in the overall gas thermal conductivity when electrons are supplied at an elevated temperature via a nonequilibrium glow or corona discharge.

Figure 49:
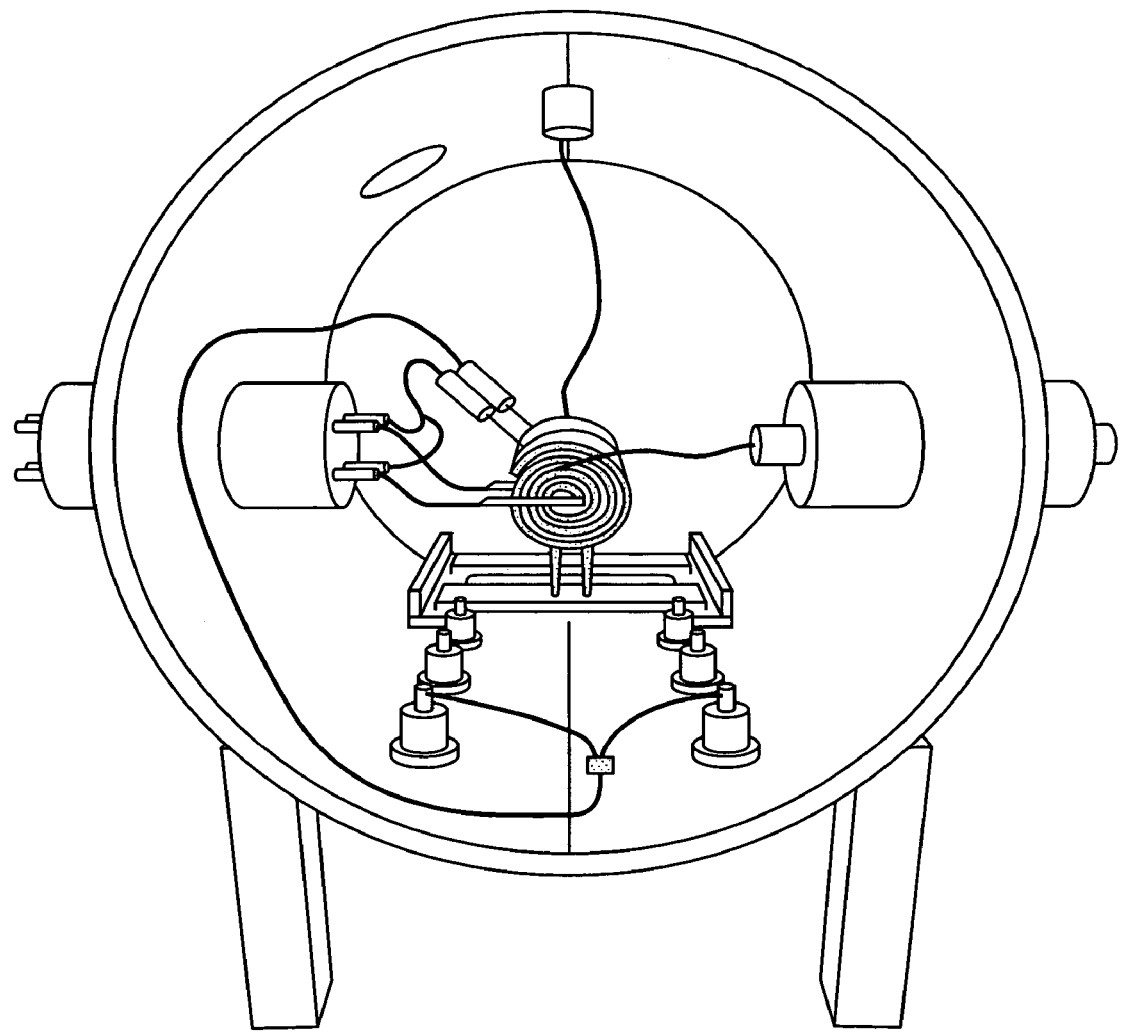
Figure 50:
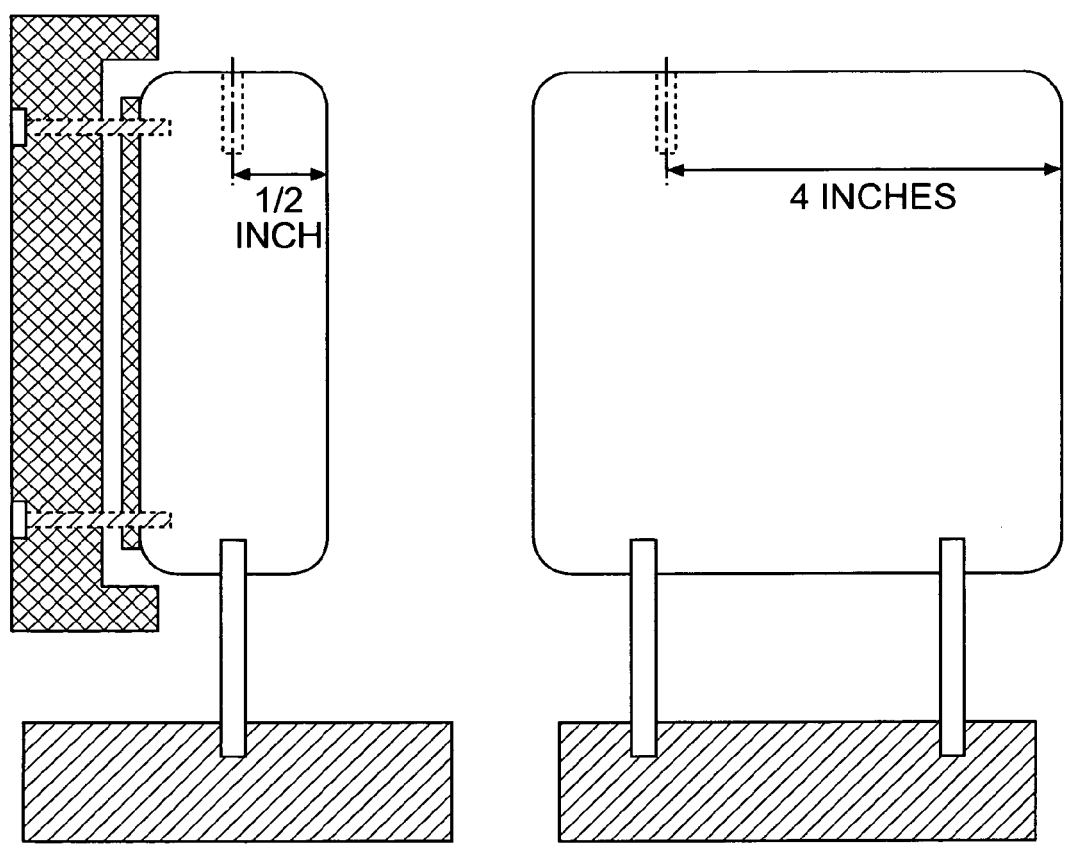

In this example, a stainless steel disk, block A, is heated using a 1 kW Calrod element. A large stainless steel cylinder, block B, is located at a distance of 4" from block A and functions primarily as an electrode, and secondarily as a heat sink. FIG. 49 shows a schematic diagram of the experimental setup, and FIG. 50 shows the dimensions of the blocks. For the temperature decay process, measurements were taken in preset pressure stages. Measurements were repeated using various inert gases as described.

This example reports the experimental results of heat transfer gain in nonequilibrium plasmas. In this experiment, an ORAM high voltage power supply, Model number DSR 100-100-JTTF input 240VAC single phase 50 H2, output: 0 to −200 kV rectified provided the nonequilibrium plasma between the blocks. Throughout all experiments, the Calrod element remained attached to the smaller block A, while the larger block B continued to absorb a portion of the heat conducted from block A. Generally, block A was connected to the high voltage negative terminal and block B was grounded, although a few experiments were performed to examine the effect of polarity reversal on heat decay.

In order to obtain comprehensive information for study, several variables were introduced into the experimental plan. These included:

a) different gases (air, Ar, He);

b) different vacuum pressures (atmospheric, $10^{-1}$ and $10^{-2}$ Torr);

c) different plasma currents (up to 25 mA and/or voltages up to 50 kV);

d) different spacings between the block faces (1½" and 4").

However, for comparison of data, attempts were made to ensure that two parameters were held reasonably constant:

a) the initial temperature of block A at the start of the decay process;

b) the duration of the heat decay measurement process.

The equipment available presented the following limitations upon the experimental procedure:

i) A non-intrusive instrument for continuously measuring the temperature of the high-voltage block from outside the cathode was not available. An infrared optical pyrometer obtained for this purpose proved unsatisfactory, hence the necessity of using thermocouples.

ii) Even though the voltage control was set low, the high voltage source could unexpectedly generate a short pulse up to 60 kV when first switched on. This was due to the type of circuit used within the control unit, and to the inherent cyclical nature of the high voltage generator.

The following measuring procedure was therefore adopted:

a) Thermocouples were successfully employed to measure the temperatures of the two blocks. However, the temperature of the high voltage block cathode could not be monitored continuously. Instead, the high voltage was switched off at five minute intervals during which temperatures were recorded from digital multimeters with thermocouple module attachments.

b) The meter arrangement was then disconnected from access terminals protruding from the side of the vacuum chamber, and the high voltage was again switched on. This measuring procedure meant that the high voltage was disconnected once for a period of approximately 35 to 40 seconds during each five minute interval.

c) The Calrod heating element remained disconnected during all heat decay measurements. Therefore, it presented no obstacle to high voltage plasma production.

A complete experimental procedure in air would consist of the following stages:

1. Pump down vacuum chamber to approximately $10^{-4}$ Torr.
2. Switch on Calrod heater for block A while pump cycle continues.
3. Switch off heater at close to required initial temperature for start of decay measurements.
4. Continue pumping down from vacuum chamber to desired pressure.
5. Repeat steps 2 through 4 until desired pressure and initial temperature are reached.
6. Switch off heater and immediately record the initial t=0 details of block A temperature, block B temperature, vacuum chamber's top skin temperature, and vacuum chamber pressure.
7. Disconnect high voltage block (cathode) thermocouple meter arrangement.
8. Cover exposed terminal with an insulator cap.
9. Switch on high voltage controller and smoothly bring it to the required voltage or current.
10. Each minute thereafter, monitoring grounded block temperature, vacuum chamber top skin temperature, vacuum pressure, applied voltage (in kV) and current (mA) displayed on the high voltage control panel.
11. At five minute intervals, switch off the high voltage supply, remove the insulating cap, briefly ground all terminals exposed from the cap area and connect the thermocouple meter arrangement in the manner described in a) through c) above.
12. Continue for an elapsed time of 131 minutes.

For experiments in inert gas, steps 4 and 5 would be modified slightly to ensure the chamber was filled with gas, and that pressures higher than required were not attained.

In this example, the following observations can be made:

1. In order to test all instrumentation, the initial plasma tests were carried out in air at atmospheric pressure. This served several purposes;
   a) the vacuum chamber door could be left open for observation of plasma or arcing.
   b) the high voltage equipment could be used without the background noise of the vacuum pumps, etc., for detection of voltage breakdown.
   c) the lighting could be dimmed for better observation of the experimental area.

2. Plasma was first witnessed when the gap between the block faces was 1½" and the voltage was in the 41 kV to 47 kV range. The plasma was poorly visible, being blue-green in colour, and was localized and faint. Attempts to increase the current to a steady flow above 1 mA to achieve more brightness resulted in arcing problems and voltage breakdown. 51 kV was found to be the maximum voltage that could be applied for steady experimental results, but current flow was less than 0.5 mA, i.e., lower than the multimeter's detection threshold.

Figure 51:
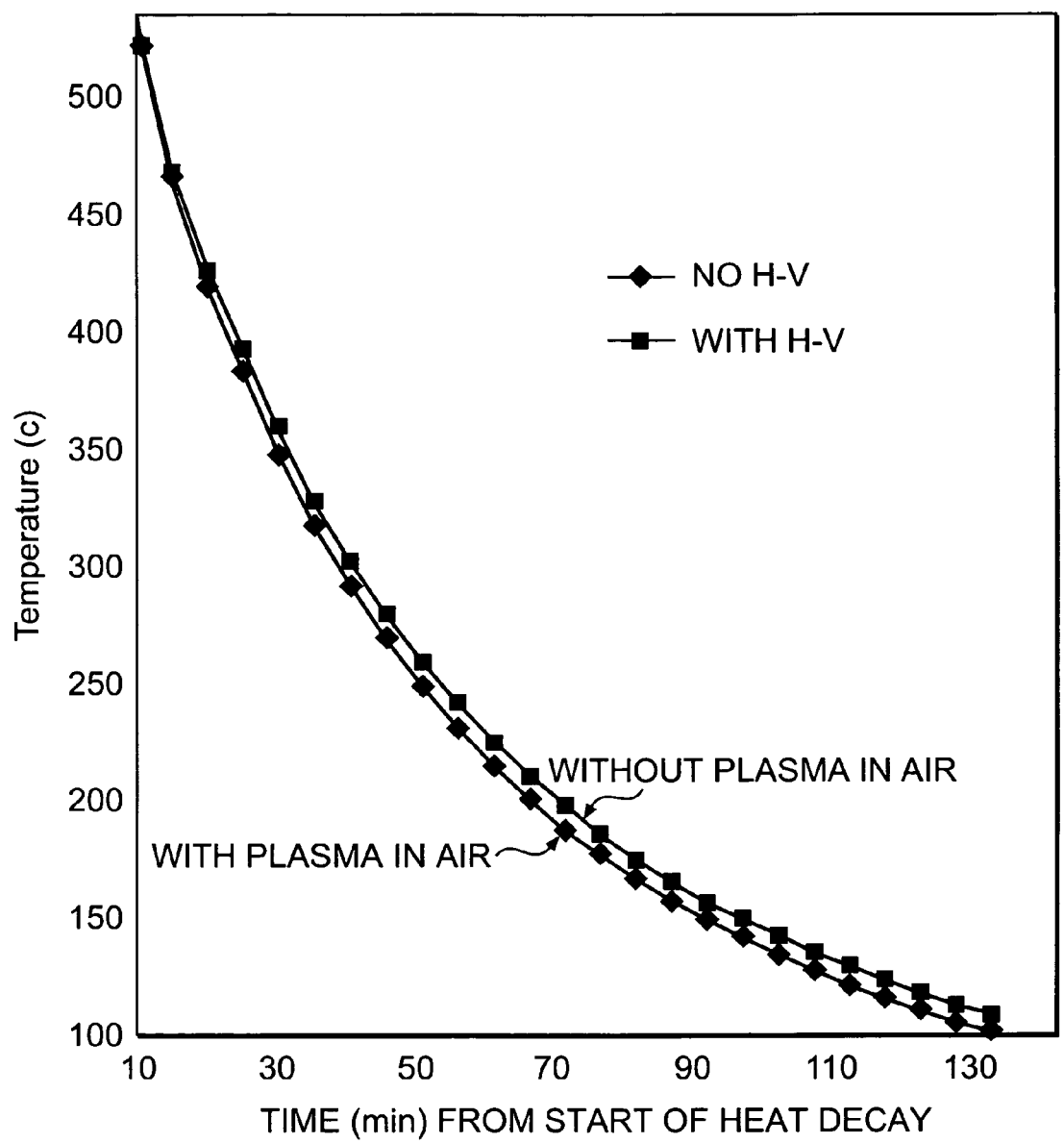

However, plasma was being produced and was accompanied by a sizzling "boiling oil" sound which began at approximately 27 kV. FIG. 51 demonstrates the results when 51 kV was applied in air at atmospheric pressure.

3. Attempts to place two point sources (spikes) in block B (grounded block) in an effort to improve the visible plasma volume were ineffective and were not continued. Plasma was created at the point tips from 34 kV, being a faint blue-green colour. The two spikes were removed after these initial tests and not used again.

Figure 52:
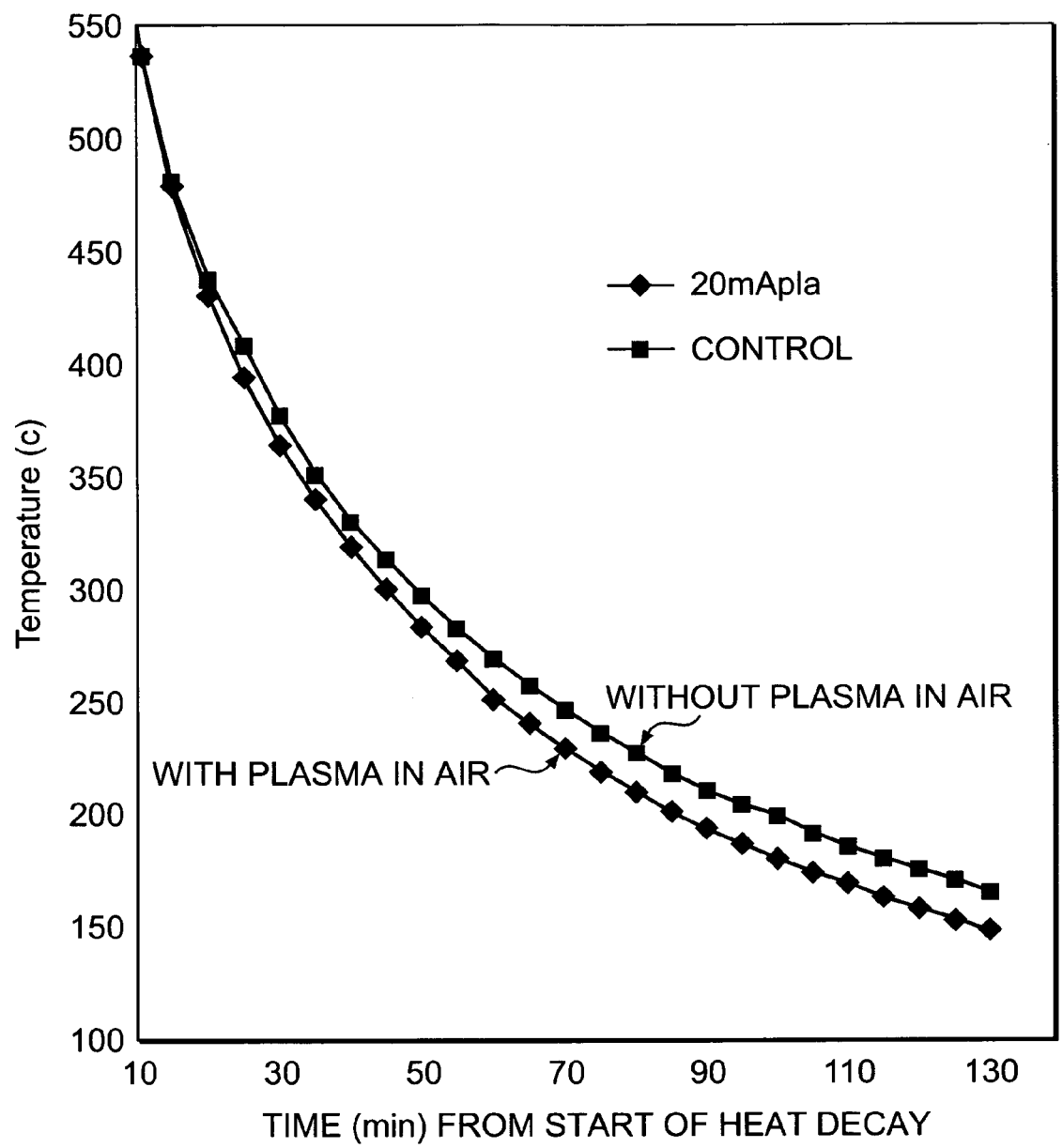
FIG. 52 is a graph showing the temperature decay in air from Block A with and without the non-equilibrium plasma at a pressure of $10^{-1}$ Torr, where the gap between the blocks was 1.5 inches, and the voltage applied for the non-equilibrium plasmas was 0.7 keV with a current maintained at 20 mA, and Block A was in −ve potential.
Figure 53:
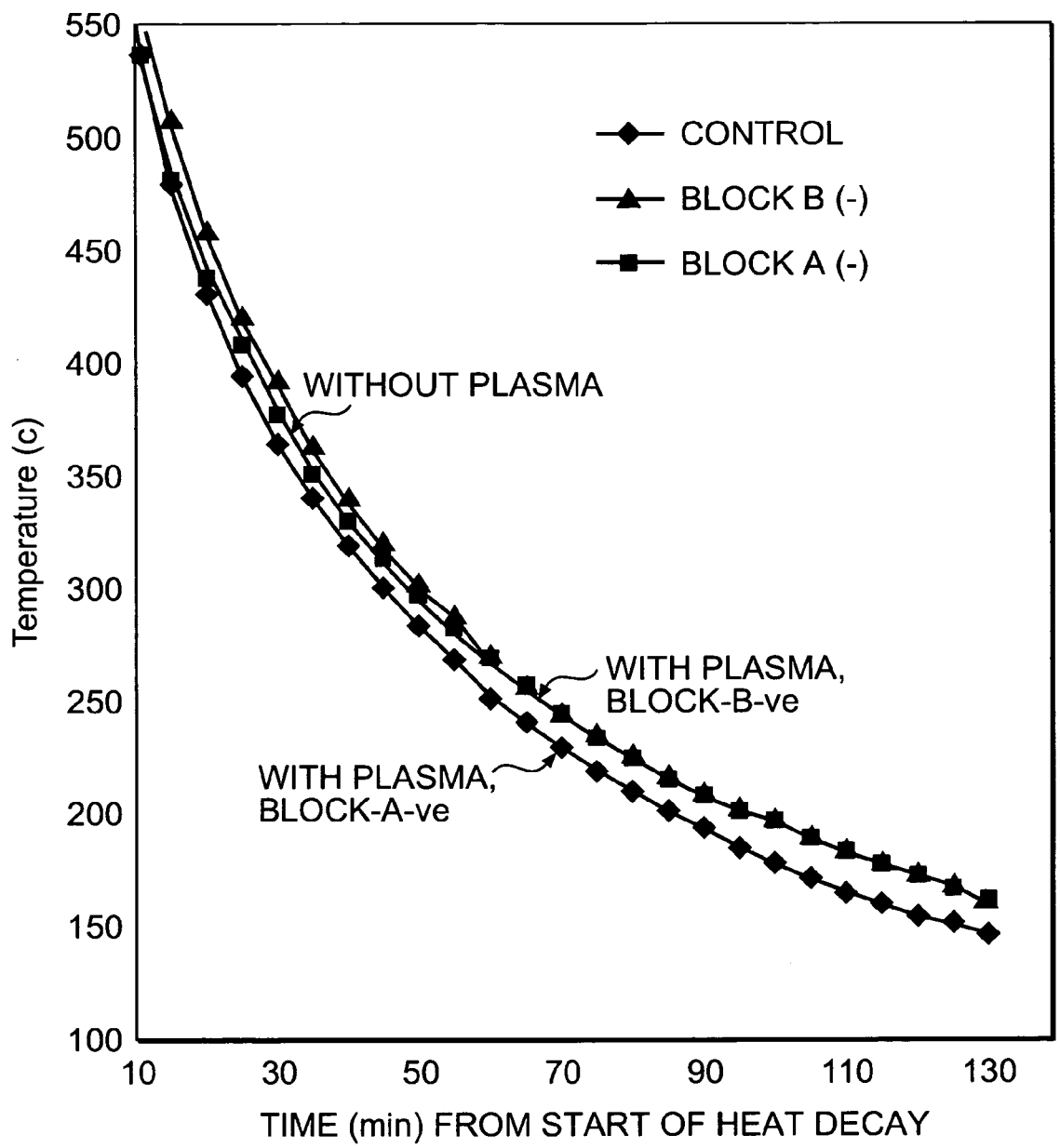
FIG. 53 is a graph showing the temperature decay in air from Block A with the non-equilibrium plasma (changing polarity of Block A) and without the non-equilibrium plasma at a pressure of $10^{-1}$ Torr, where the gap between the blocks was 1.5 inches, and the voltage applied for the non-equilibrium plasmas was 0.6 and 0.8 keV with a current maintained at 20 mA.

4. The first test in partial vacuum was conducted with all other conditions same as in 2 above. A CCD camera was fixed to the window of the vacuum chamber so that the plasma could be monitored throughout the experiment, and video recorded when desired. The chamber was pumped down and kept at a steady pressure of $10^{-1}$ Torr. At this pressure, extensive plasma was easily created with voltages less than 1 kV. A steady purple color was visible and an initial experiment was conducted with approximately 20 mA current. FIG. 52 demonstrates the results achieved during this trial. In order to investigate how temperature decay changes when the polarity of the blocks are reversed, the wiring of the block was changed. Block A was grounded and the block B was connected to the negative high voltage terminal. All other conditions remained the same, except that the thermocouples were interchanged for safety reasons. The experimental run was then repeated. The plasma that was formed was extensively purple. FIG. 53 compares the temperature decay data when block A acted as cathode, against the result when polarity was reversed and block B acted as cathode.

5. For the remainder of the experimental study, the heated block A was kept at negative potential while the passive block B remained grounded.

6. The gap between the block faces was next increased to 4", and the resulting effect was examined. This proved to be a more convenient gap to work with because the larger spacing meant that:

a) greater plasma currents, hence greater electron densities, could be achieved without arcing.
b) the plasma region was more visible through the viewing window. This became more important at lower pressures, when the optically bright part of the plasma occupied only a portion of the space between the blocks.

Figure 54:
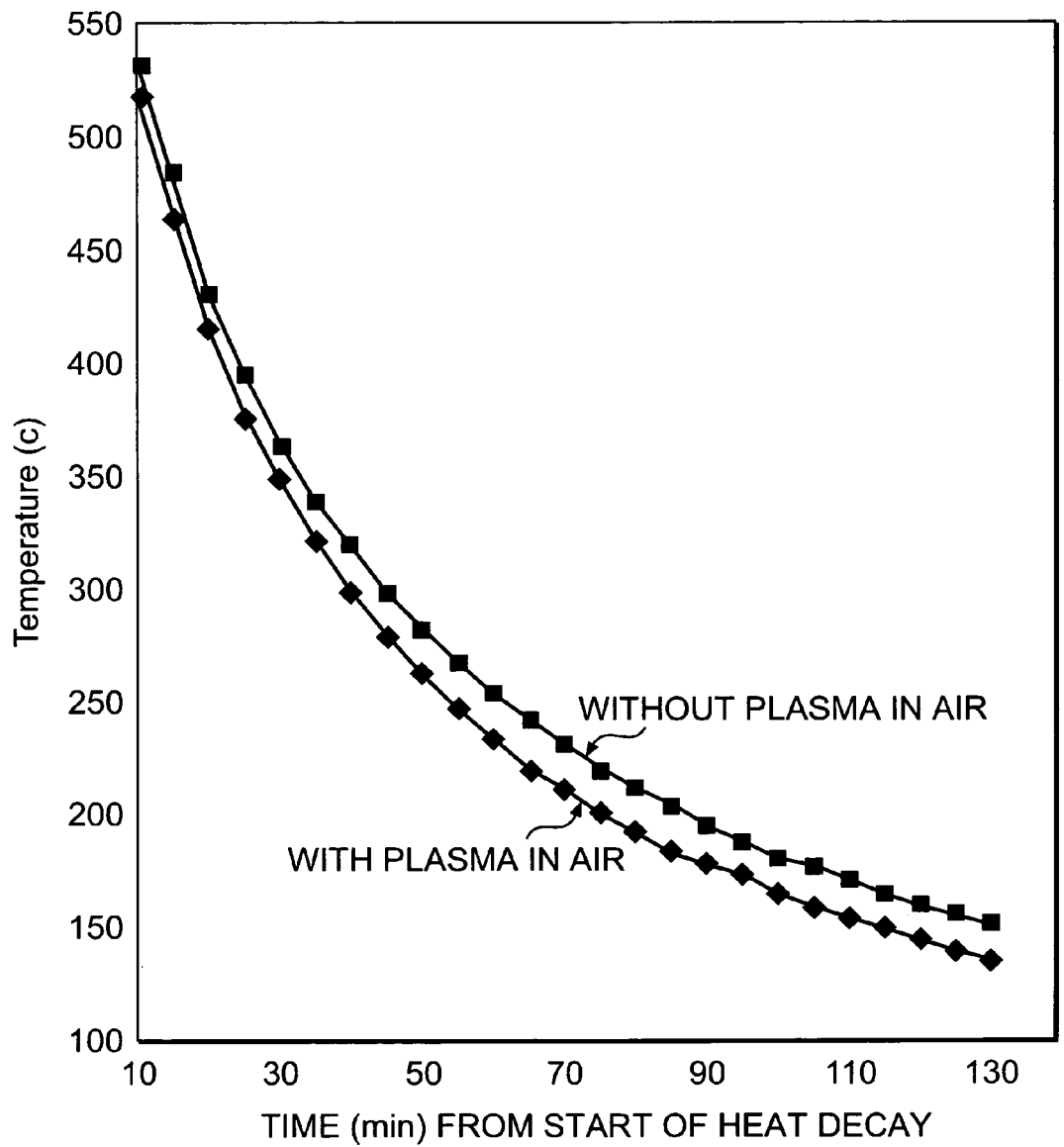
FIG. 54 is a graph showing the temperature decay in air from Block A with and without the non-equilibrium plasma at a pressure of $10^{-1}$ Torr, where the gap between the blocks was 4 inches, and the voltage applied for the non-equilibrium plasmas was about 0.7 keV with a current maintained at 20 mA, where Block A was at a −ve potential.
Figure 55:
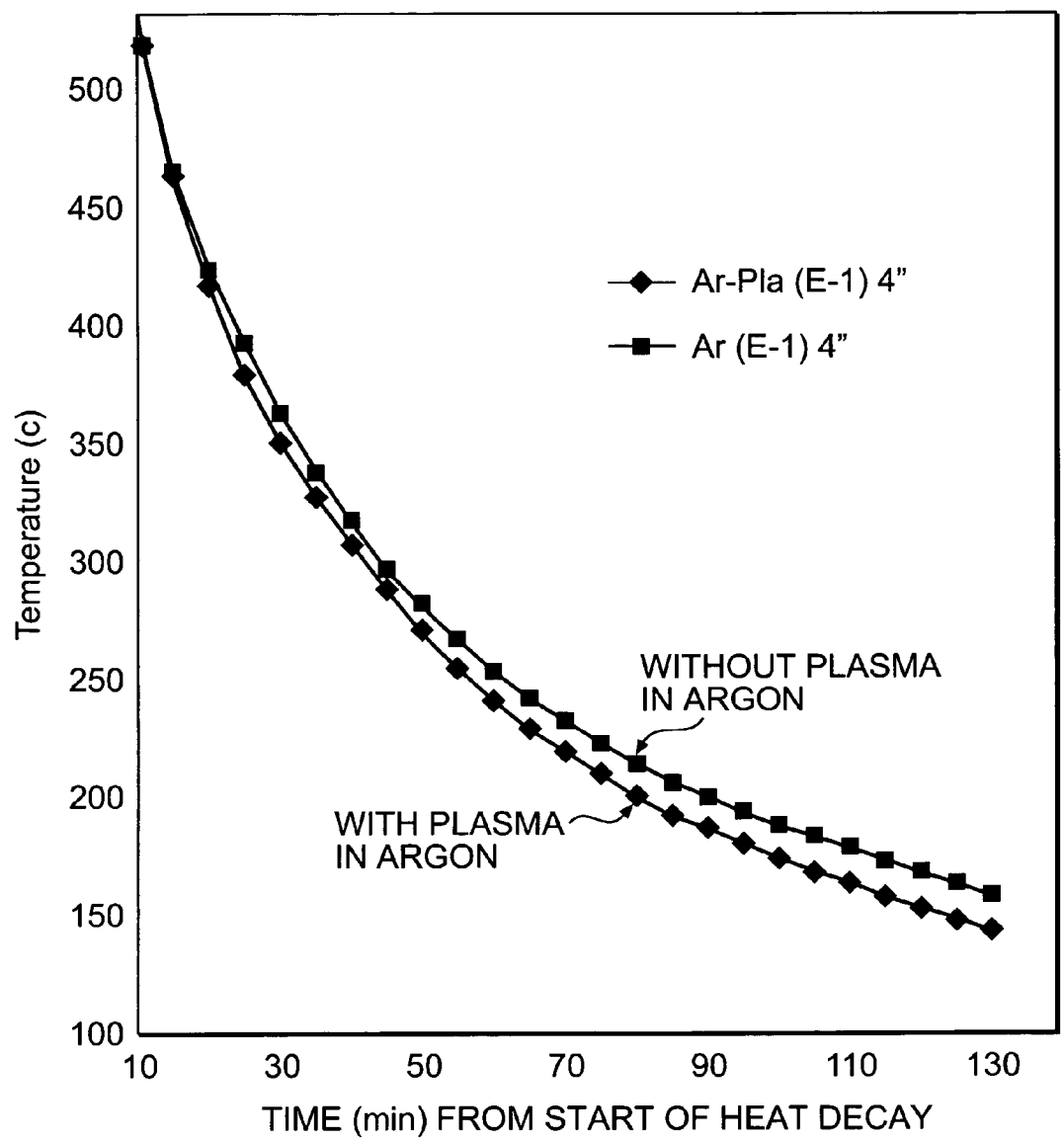
FIG. 55 is a graph showing the temperature decay in argon from Block A with and without the non-equilibrium plasma at a pressure of $10^{-1}$ Torr, where the gap between the blocks was 4 inches, and the voltage applied for the non-equilibrium plasmas was 0.6 to 0.9 keV with a current maintained at 20 mA.
Figure 56:
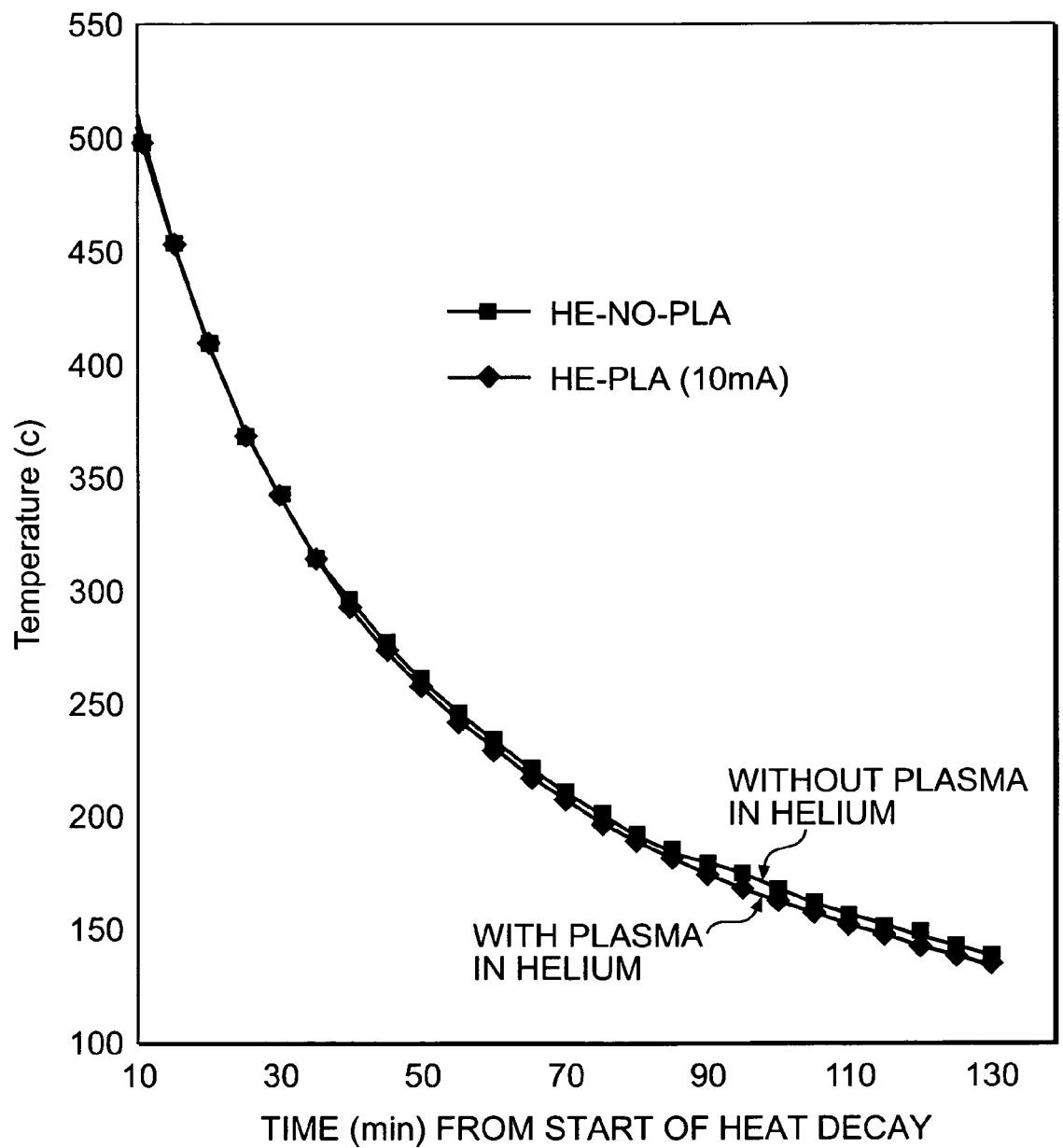
FIG. 56 is a graph showing the temperature decay in helium from Block A with and without the non-equilibrium plasma at a pressure of $10^{-1}$ Torr, where the gap between the blocks was 4 inches, and the voltage applied for the non-equilibrium plasmas was 0.6 to 0.7 keV with a current maintained at 20 mA, where Block A was at a −ve potential.

The majority of the remaining tests were therefore carried out with the 4" gap. By reasoning similar to the above, a larger gap, e.g., 8" may have provided even better results, but internal constraints within the vacuum chamber prevented this. Given the limitations of the equipment and geometric constraints, the 4" gap proved most practical. FIGS. 54-56 show the temperature decay curves in plasma air, Argon, and Helium using the 4" gap, plotted along with the decay curves.

7. Since the plasma heat decay in air at $10^{-1}$ Torr demonstrated results comparable with the best of the other gas media tested, air was choused as the medium to examine the effect of varying current on the heat decay process. Tests were conducted at 10, 15, 20, and 25 mA plasma currents. Unfortunately, limitations of the high voltage power supply controller resulted in frequent arcing and voltage breakdowns, affecting data acquisition process. As a result, some of the experimental trials were not run to completion.

8. Feasibility tests in air at pressures less the $10^{-1}$ Torr (say $10^{-2}$, $10^{-3}$ Torr) suggest that higher voltages are required to produce similar plasma currents. The low pressure tests also demonstrated that the plasma structure within the block gap resembled the classical discharge model, with glow column and Faraday dark space becoming more apparent as pressure was decreased. Due to the limitations of the equipment, maintaining a constant current at the lower pressures proved to be more difficult, and the arching problem became more pronounced.

Figure 57:
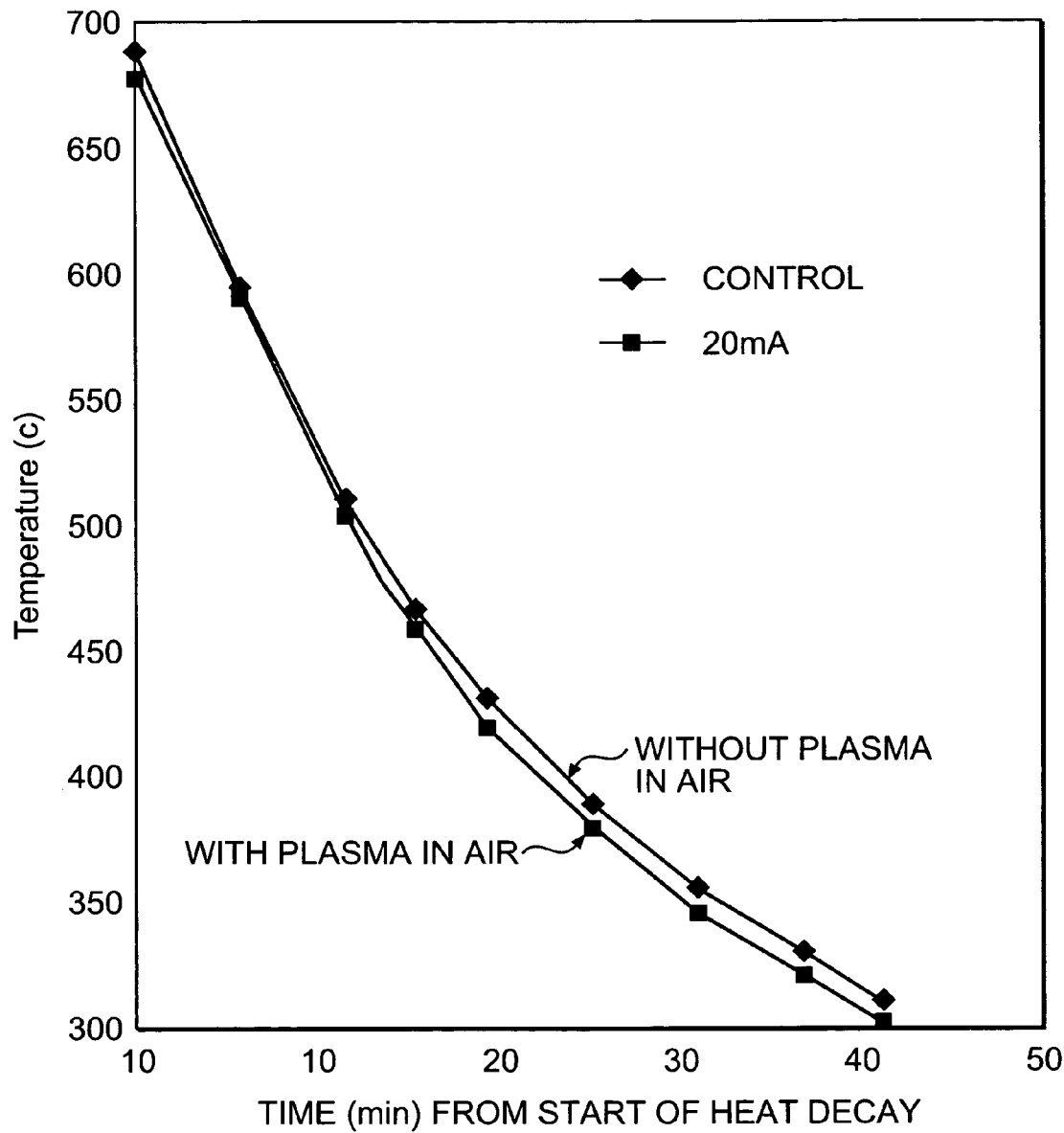
FIG. 57 is a graph showing the temperature decay in air block-A in plasma and without plasma at pressure $10^{-2}$ Torr, gap between blocks was 4", and the voltage applied for plasma: 1:2 to 1.5 kev, current 20 mA.

FIG. 57 shows a graph of the data collected for air at $10^{-2}$ Torr. Although arcing was again a persistent problem, and the data collection run was cut short to 40 minutes, it does provide further evidence of the trend of increased heat transfer with increased current, even at these low pressures.

The experimental results are summarized in the graphs FIG. 51 to FIG. 57. The following is a discussion of some of the features of these graphs.

A heat transfer coefficient, $\gamma_x$, is first introduced. Consider a time dependent heat transfer problem where a metal block is giving up heat through a thermally conductive neutral gas medium the heat decay curve will be determined by the thermal diffusivity.

$$a = \frac{\lambda}{C_p}.$$

Where C is the heat capacity of the medium at constant pressure, $\lambda$ is the thermal conductivity, and $\rho$ is the density of the medium. Now consider a different gas medium, with conductivity $\lambda$, heat capacity $C^1$, and density $\tau^1$. In this case we have $$a' = \frac{\lambda'}{C'\rho'}$$

The heat transfer gain coefficient between these two systems can be defined as $$\gamma = \frac{n'}{\chi}.$$

Now, consider the case of neutral gas vs. plasma. For the case of plasma with small ionization fraction X<0.1, the presence of electrons hardly affects the density of the gas, so $$\mu' \approx '.$$

Now consider heat capacity. The molar heat capacity of electrons is extremely small when calculated via Fermi Dixac statistic. So the contribution of the electrons to $C_p$ can be ignored as a first approximation. Likewise the contribution of the ionic heat capacity can also be ignored, again owing to the small ionization fraction. Therefore, $$C' \approx C.$$

The gain coefficient becomes $$\gamma = \frac{\lambda'}{\lambda}.$$

Since all other system parameters are the same between the two systems (pressure, metal composition, radiative heat flux, etc.), there really is no other mechanism by which heat decay time can increase or decrease other than by gain change $\gamma>1$ or $<1$ between the two systems. In other words >1 implies an increase in the thermal conductivity of the gas medium. The gain coefficient is a convenient way of comparing systems with exactly same geometries and similar gas chemistry, the only difference being the introduction of nonequilibrium ionization. If $\gamma>1$ between two systems then there is a gain in thermal conductivity due to nonequilibrium ionization. If $<1$ then there is a net decrease in thermal conductivity due to nonequilibrium effects, which is an interesting and possibly useful phenomenon in its own right.

1. FIGS. 51, 52, 54, 55, 57 all clearly exhibit y>1, and accordingly, the nonequilibrium plasma effect to have been clearly demonstrated. The effect is most obvious in FIGS. 52, 54 and 55.

2. FIG. 56, which is a graph of the data for Helium at $10^{-1}$.Torr, shows the mechanism of nonequilibrium plasma conductivity gain discussed above. Consider the data presented in FIG. 55 for Argon, and FIG. 57 for Helium, both of which are under comparable pressures and applied power. Ignoring the ionic contribution to $\lambda$ as negligible, the gains for these data sets can be written respectively as $$\gamma_6 = \frac{\lambda_{Ar} + \lambda_e}{\lambda_{Ar}}$$

and $$\gamma_7 = \frac{\lambda_{He} + \lambda_e}{\lambda_{He}}.$$

The clear gain visible in FIG. 55 suggests that $\lambda_e$ is not negligible for the Argon case. Now, the first ionization potential for Argon is ≈15.3 electron volts, but for Helium, it is 35 eV. When considering that ionization kinetics are exponentially dependent on ionization potential, it is entirely reasonable to assume that applied power to Argon will produce more ionization than the same power applied to Helium under similar conditions. Therefore $\lambda_e$ for Helium should be less than $\lambda_e$ for Argon. Also, $\lambda_{He}$ is an order of magnitude larger than $\lambda_{Ar}$ to begin with, so the combined effects give $$\gamma << \gamma_6$$

which is clearly the case when the data in FIG. 56 is compared to FIG. 55.

The practical implications of this are as follows. If it is necessary to use Helium as the working medium, the power supply should be modified to compensate for Helium's high ionization potential.

3. Concerning FIG. 53. Referring to FIG. 57, it is clear that the gain y is actually a function of plasma current, i.e., $\gamma=\gamma$ (I). That $\gamma$ increases with current is not surprising, since higher currents lead to larger probabilities of collisional and cascade ionization, finally leading to higher values of electron density $n_e$ and ionization fraction $\chi$. What is surprising is the reversal of $\gamma$ i.e., $\gamma<1$ when the polarity of blocks A and B are reversed, as can be seen in FIG. 53.

It now remains to assign some numerical estimates to the actual values of $\gamma$. The objective is to provide a simple model that can provide curves similar to the data sets in FIGS. 51-57, from which $\gamma$ values can be inferred.

When gas temperature and electron density are actually distributed unevenly throughout a gas/plasma medium, the terminal conductivities of the gas $\lambda$ and plasma $\lambda$ are actually functions of x, y, z, t. Furthermore $\lambda^1$ depends on the electron density $n_e$ and the electron temperature $T_e$ both of which are functions of x, y, z, t, applied electric field, and current. So it is unrealistic to attempt to solve for $n_e$ and hence $\lambda^1$ directly. However, it is possible solve for constant effective $\lambda$, $\lambda^1$ which model the net transport effect of the neutral gas and plasma. The resulting gain factor $\gamma=\lambda^1/\lambda$ will be a good estimate of the true gain.

First, a model constructed by making a number of assumptions which drastically simplify the problem numerically without losing any essential detail of the experimentally observed physical behavior.

a) Since the experimental setup is almost cylindrically symmetric, we map the vacuum chamber onto a axisymmetric region in (z, r). Block A, block B, the insulator section, and the plasma region will be considered axisymmetric subregions of the vacuum chamber region.

b) The plasma, when present, is confined to a region surrounding both block A and block B. The extents of the plasma are chosen to be rather large (not just confined to the gap between blocks A and B). Choosing a large plasma volume a priori is a conservative policy, because if the plasma is measured by probes and found to be in fact smaller, then the $\gamma$ calculated with the larger plasma volume will be an underestimate of the true $\gamma$.

c) For any given $\gamma$ calculation problem, all thermophysical properties are considered constant.

d) Radiation reflected from the inner gap face of block B is ignored.

e) The Calrod element is eliminated and approximated by a thermal power density applied to block A.

f) Radiative losses of the insulator and block A are approximated by equivalent thermal power density losses within each their respective regions.

g) The boundary of the vacuum chamber is convectively coupled to the external ambient environment. Actually, this boundary condition can be fixed to some temperature (310 K, for instance) without much difference to the overall model. Convective coupling is handy in order to model the skin temperature of the vacuum chamber.

h) Radiation of block B is ignored entirely. Since block B's temperature range is typically 300 K$\leq u_B \leq$450 K, the error introduced by this assumption is small.

It is desired to find the solution of the initial-boundary value problem for the time-dependent heat equation.

$$\nabla \cdot (\lambda \nabla u(z, r, t)) - S + S_R + C_p \frac{\partial}{\partial t} u(x, r, t) = 0$$

Where C is heat capacity at constant pressure, $\rho$ is density, S is the applied power density source term, and $S_R$ is the power density loss due to radiation. The time dependent problem begins when the applied power is switched off, i.e., S=0 for a pure temperature decay problem.

The initial value is the initial temperature distribution at t=$0_1$ $$u(z,r,0)=u_o(z,r).$$

obtained by solving the steady state problem $$\nabla \cdot (-\lambda \nabla u(z,r)) - S + R_R = 0.$$

with applied thermal power density source S and radiative power density loss $S_R$.

Each region has its own thermophysical properties $\lambda$, $\rho$, C, S, and $S_R$. Radiative boundary conditions are treated in the following manner. The total power loss $P_R$ for a region due to radiation is $$P_R = A_R \epsilon (u^4 - u_1^4),$$

where $A_R$ is the exposed radiating surface area of the region is the region's emissivity, and $u_1$ is approximated by a constant reference temperature in the range 300 K-450 K. If $V_R$ is the volume of the radiating region, the radiative power loss density with the region becomes $$S_R = \frac{P_R}{V_R} = \frac{A_R \varepsilon (u^4 - u_1^4)}{V_R}.$$

Experimental data sets like those in FIG. 53 consist of a control temperature decay curve, where there is no plasma, and one or more decay curves with plasma present. By fitting the time dependence of U(z, r, t) to curve sets like FIG. 53, we can directly compute estimates for $\gamma$ can be directly computed.

The above initial-boundary value problem would be straightforward if it were not for the following difficulties:

1. Exact values for the thermophysical properties are not known a priori because the temperature distribution in the vacuum chamber is not uniform. Furthermore, there are slight pressure variations in the experimental data due to the changes in temperature as a function of time. The exact values for the emissivities of the materials under the conditions of the experiment are also unknown.

2. Simplification of the geometry, as discussed earlier, has the side effect of modifying some material properties in ways that cannot be known beforehand.

3. Ideally it is desired to establish realistic bounds for many problem parameters and allow them to vary within these bounds.

The following, however, are known: theoretically, for a given data set (like FIG. 53) there should be only one parameter upon which the difference in shape between control and plasma decay curves depend: $=\lambda^1/\lambda$. In other words, there should be only one unknown parameter. In light of this, a procedure for obtaining this type of parameter estimation is described. The technique can constructed for general cases, where IBV models must be fit to curve sets that have dependencies on N unknown parameters. Description is provided where N=1.

Let $\phi_1, \phi_2, \ldots, \phi_k$ be all parameters which define the model, in no particular order. These include geometric dimensions of the primary region and all subregions, all coefficients appearing in the partial differential equations, and all parameters appearing in the boundary conditions. Suppose that M curves to which curve-fit parameters under the hypothesis that these curve fits differ from each other by changes in one parameter. For the sake of simplicity, let us consider the case in FIG. 53 where M=2, i.e., there is an experimentally determined control curve f, and an experimentally determined plasma curve f. Suppose some set of numbers $$\{\phi_1, \phi_2, \ldots, \phi_k\}$$

results in a tolerable curve fit for f. Consider another set of numerical data $$\{\phi_1', \phi_2', \ldots, \phi_k'\}$$

that gives a tolerable curve fit for f. Now, consider the variations $\hat{o}\phi_j$ between these parameters:

$$\delta\phi_j = \phi_j - \phi_{j'}$$

For f and f to be related by at most one parameter, all these variations must be zero, save for one:

$$\delta\phi_1=0, \delta\phi_2=0, \ldots, \delta\phi_{k-1}=0, \delta_k \neq 0.$$

If the curve fits to f; f are good, and the IVB is well defined, the resulting estimates for the uncertain fixed parameters $\phi_1$, $\phi_2 \ldots, \phi_k$ can be quite accurate, barring pathological cases.

The following describes the application of this technique to the f, f curves in FIG. 53. Some preliminary observations:
1. Consider all geometric data as fixed, and not subject to the variation minimization procedure.
2. Express all thermophysical properties as $\phi_j \times$ textbook values. Estimate gas density from equation of state and use this as a base value. Let textbook thermophysical properties and ideal gas density estimates be superscripted by 0.
3. Define and organize all model parameters using a logical notation. Superscripts for $\phi$ are used as labels to identify what property the parameters affects. Subscripts indicate materials s=steel, i=insulator, g=gas (Argon), p=plasma.
4. It is possible to get an upper estimate on the maximum power density applied to block A. The Calrod heater is rated at 1000 W, and the volume of block A is $4.633 \times 10^{-4} m^3$, giving a maximum power density of $S=2.158 \times 10^6$. But since this quantity is not exactly it can be replaced with $\phi^S$. This is further constrained by the requirement that the initial model temperature be close to the initial experimental temperature in block A.

Here is a complete summary of the model, and all parameters used and their initial estimates. All values are in MKS units.

Steady state problem.

$$\nabla \cdot (-\lambda \nabla u(x, r)) - \phi^S S + \phi^n S_R = U, \tag{14}$$
$$\lambda_g = \phi_g^\lambda \lambda_g^0, \lambda_g^0 = 0.01799$$

$$\lambda_2 = \phi_3^\lambda \lambda_3^0, \lambda_3^0 = 23.43 \tag{15}$$

$$\lambda_i = \phi_i^\lambda \lambda_i^0, \lambda_i^0 = 3.096 \tag{16}$$

$$\varepsilon_s^0 = 0.08 \tag{17}$$

$$\varepsilon_1^0 = 0.18 \tag{18}$$

Time dependent problem.

$$\nabla \cdot (-\lambda \nabla u(z, r, t)) + \phi^R S_R + C_P \frac{\partial}{\partial t} u(z, r, t) = 0$$

$$\rho_a C_a = \phi_g^{pc} \rho_g^0 C_g^0, \rho_g^0 = 1.784 \times 10^{-4}, C_g^0 = 518 \tag{19}$$

$$\rho_s C_s = \phi_s^{pc} \rho_s^0 C_s^0, \rho_s^0 = 7758, C_s^0 = 431 \tag{20}$$

$$\rho_i C_i = \phi_i^{pc} \rho_i^0 C_i^0, \rho_i^0 = 1595, C_i^0 = 753.1 \tag{21}$$

$$\lambda_p = \phi_p^\lambda \lambda_g \tag{22}$$

$$\gamma = \frac{\lambda_p}{\lambda_s} - \delta o_p^\lambda i\, 1.$$

It is possible to retain $_\phi{}^\lambda p$ as the single parameter relating curves f and f while reducing the variation of all other parameters to zero. This gives the estimate for conductivity gain.

The procedure outlined above is extremely time consuming to implement, so the estimation of $\gamma$ is limited to the case of FIG. 53. The larger gap is preferable due to the smaller effect of reflected radiation. After consideration iterations, the parameter set can be obtained:

| $\phi$ | Curve f | Curve f | Variation $\delta\phi$ |
|---|---|---|---|
| $\phi^R$ | 1.0 | 1.0 | 0.0 |
| $\phi^S$ | 0.82 | 0.848 | −0.028 |
| $\phi_g^{oC}$ | 5.0 | 3.0 | 0.0 |
| $\phi_i^{pO}$ | 1.8 | 1.8 | 0.0 |
| $\phi_g^\lambda$ | 1.0 | 1.0 | 0.0 |
| $\phi_P^\lambda$ | 1.0 | 10.5 | 0.5 |

All other parameters are simply unity, with zero variation. The conductivity gain derived from the data set in FIG. 53 is thus $$\gamma_4 = 10.5$$

Figure 58:
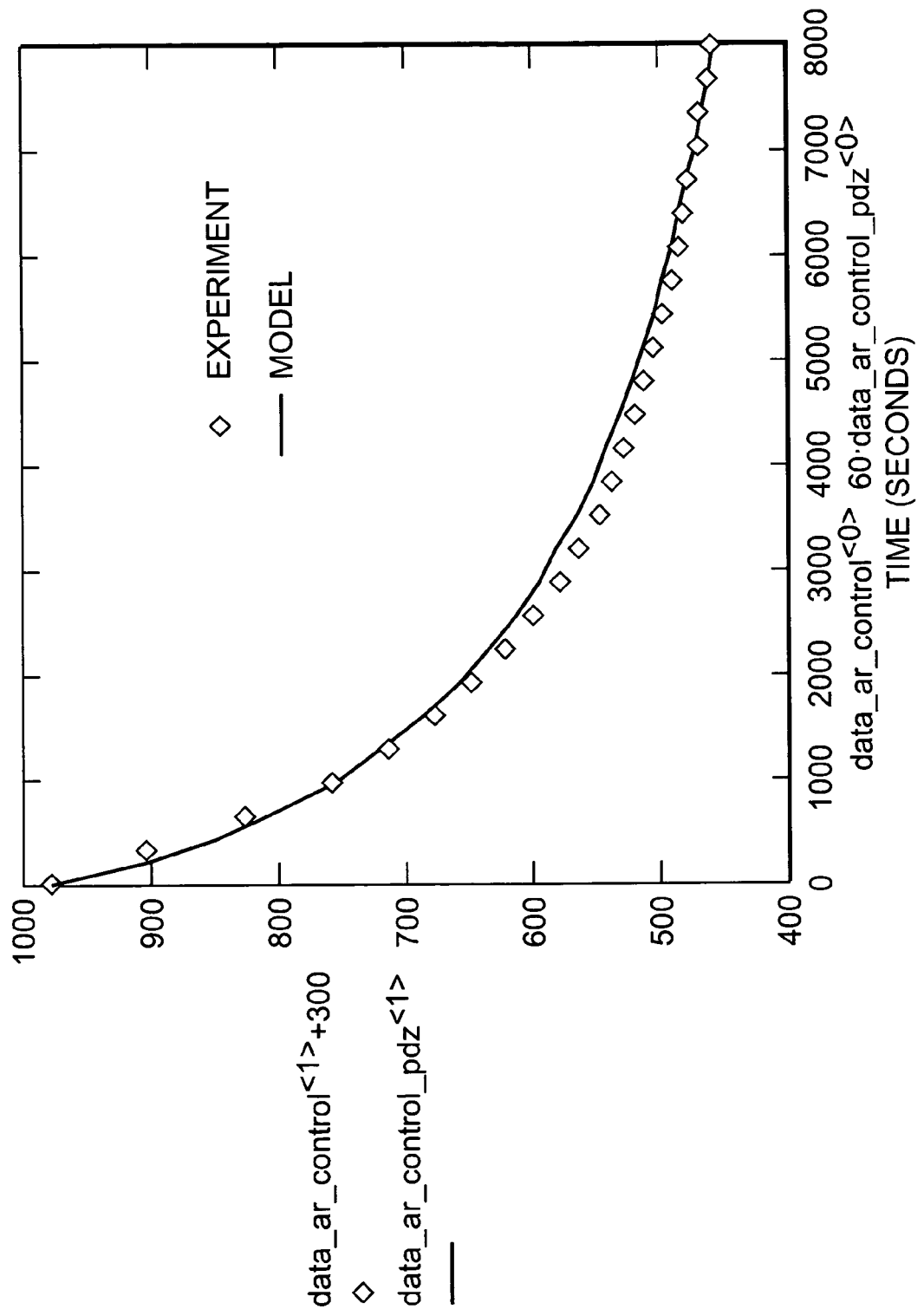
FIG. 58 is a graph showing the results for the modeling of the experimental data set presented in FIG. 53 relating to argon and without plasma.
Figure 59:
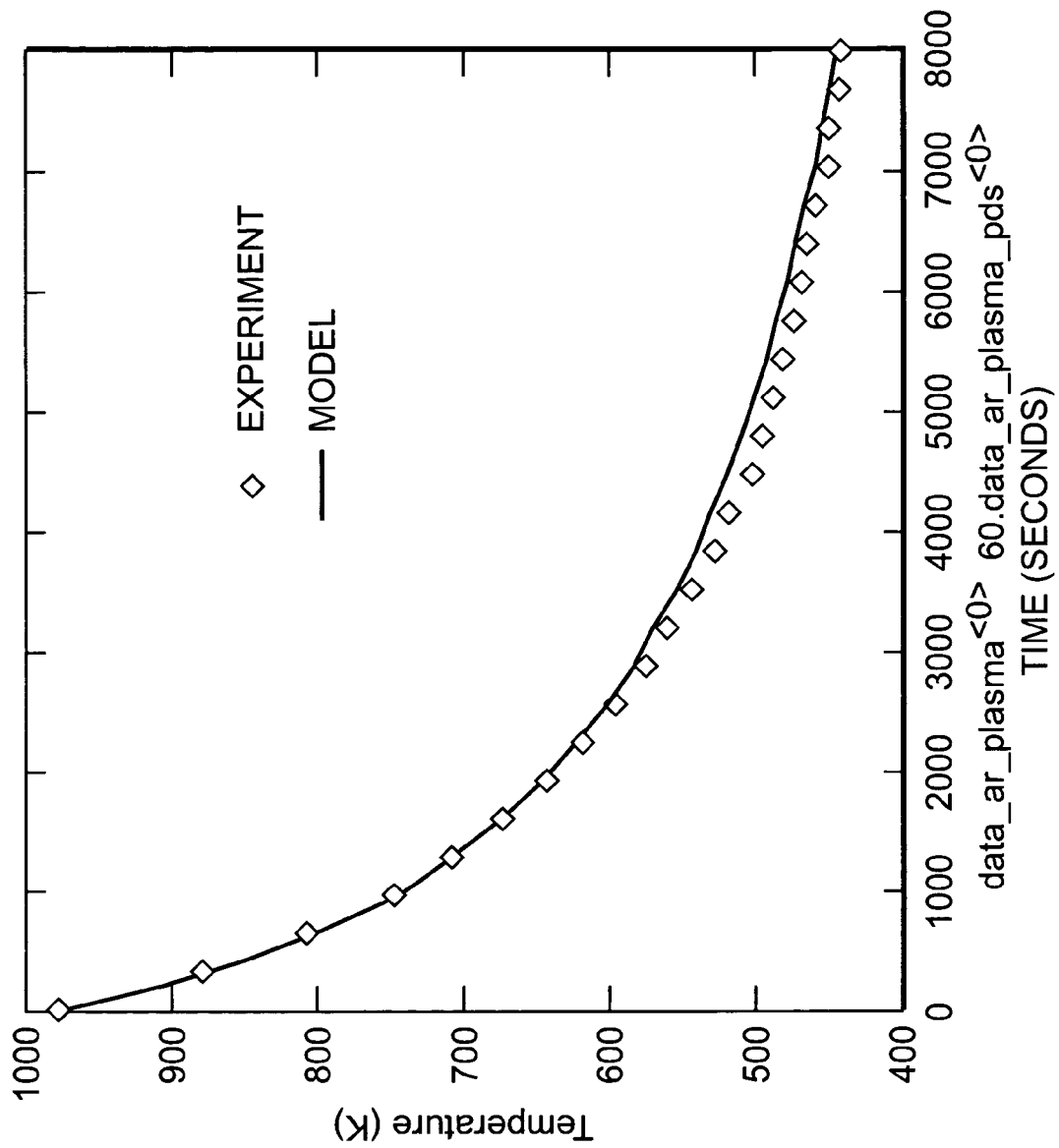
FIG. 59 is a graph showing the results for the modeling of the experimental data set presented in FIG. 53 relating to argon and with plasma.

Curve fitting results for f, f are displayed in FIGS. 58-59. Note that a small variation in $\phi^S$ was necessary in order to match the slightly different experimental initial temperatures in curves f and f. When considering that the plasma is extinguished for at least 10% of the time during the measurement time, the true plasma conductivity gain would be somewhat greater than 10.5.

Example 7

Calculating γ can be relied only on the temperature decay curves f(t) (no plasma) and f¹ on block B by solving the 3D axisymmetric boundary value problem. It can be assumed that block B is isothermal.

This example is set up by assuming that the plasma is large and not confined to the interblock gap, ignoring radiation and convection, as well as the insulator section, and using same dimensions for blocks and vacuum chamber as the example 6, and making the plasma region larger than the gap. The temperature of the vacuum chamber boundary is fixed at T=300 K For the exact dimensions used. Also, the following thermophysical properties are used (all units are MKS):

$\rho_{metal}=8000$ $\rho_{gas}=1.0$ $c_{metal}=431$ $c_{gas}=518$ $k_{metal}=29$ $k_{gas}=0.018$ These figures give us the thermal diffusivities $\alpha_{metal}=8.4 \times 10^{-6}$ $\alpha_{gas}=3.48 \times 10^{-5}$ which can be used in the time dependent problem. Subsequently, the steady state problem is solved to obtain the initial temperature distribution T (z, r) and then plug this in as the initial value T (r, z, t=0) to a time-dependent boundary value problem. The time dependent problem is solved twice. Once for γ=1 (no "plasma"), and then again for γ=10 ("plasma"). Here are the block A temperature decay curves for this fictitious problem, as shown in FIG. 58:

Now, the lumped model for conduction is $T_2 = T_s T (T_1 - T_s) e^{-\beta t2 - t3}$ where $$\beta = \frac{aA}{V \Delta x}$$

If all factors (other than k) remain the same between the control run and the plasma run, then the ratio of ç's gives you the gain in conductivity:

$$\gamma = \frac{\varsigma'}{\varsigma}$$

This yields −0.94 for the argon data. In other words, the ratio of ç's obtained from the lumped model should give us roughly the same γ I started with. We can solve for ç:

$$\beta = -\frac{1}{t_2 - t_2} \log\left(\frac{-(T_2 - T_S)}{-T_2 - T_s}\right)$$

Figure 60:
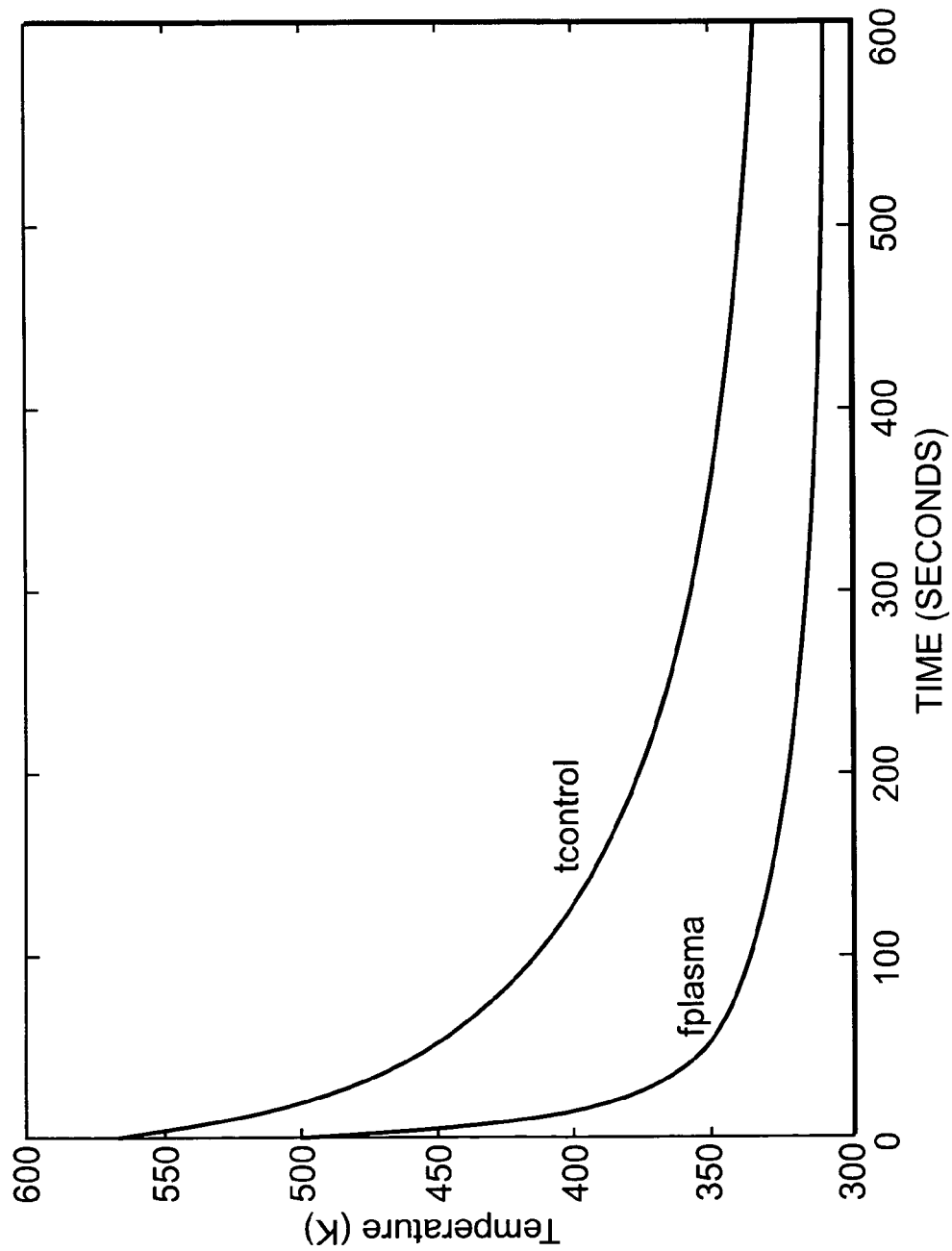
FIG. 60 is a graph showing the comparison of with/ without plasma for (Gamma)=10 in Example 7.
Figure 61:
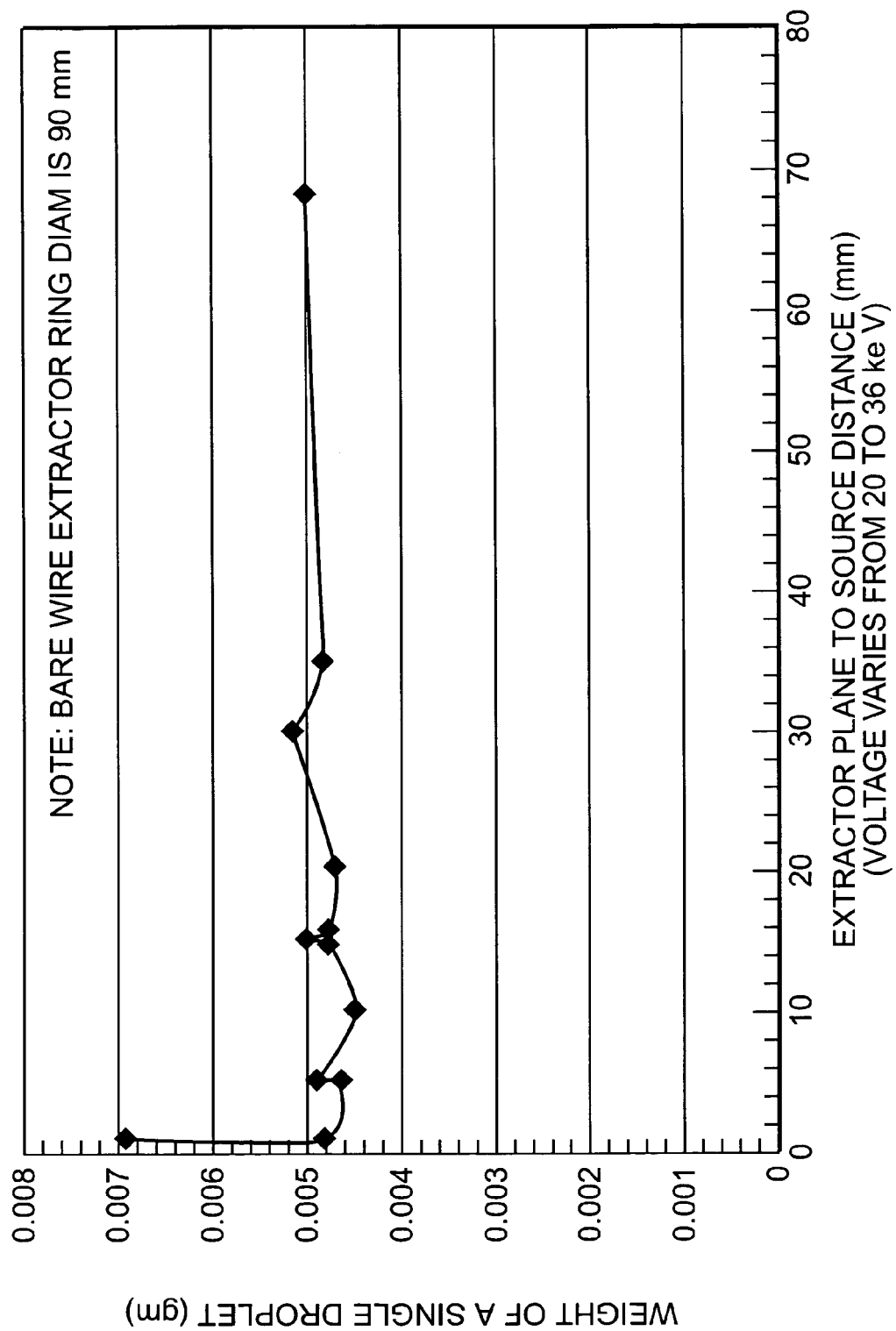
FIG. 61 is a graph showing how primary atomized droplets are not sensitive to high voltage levels or electrode gaps once a critical value is reached for a particular geometry.
Figure 62:
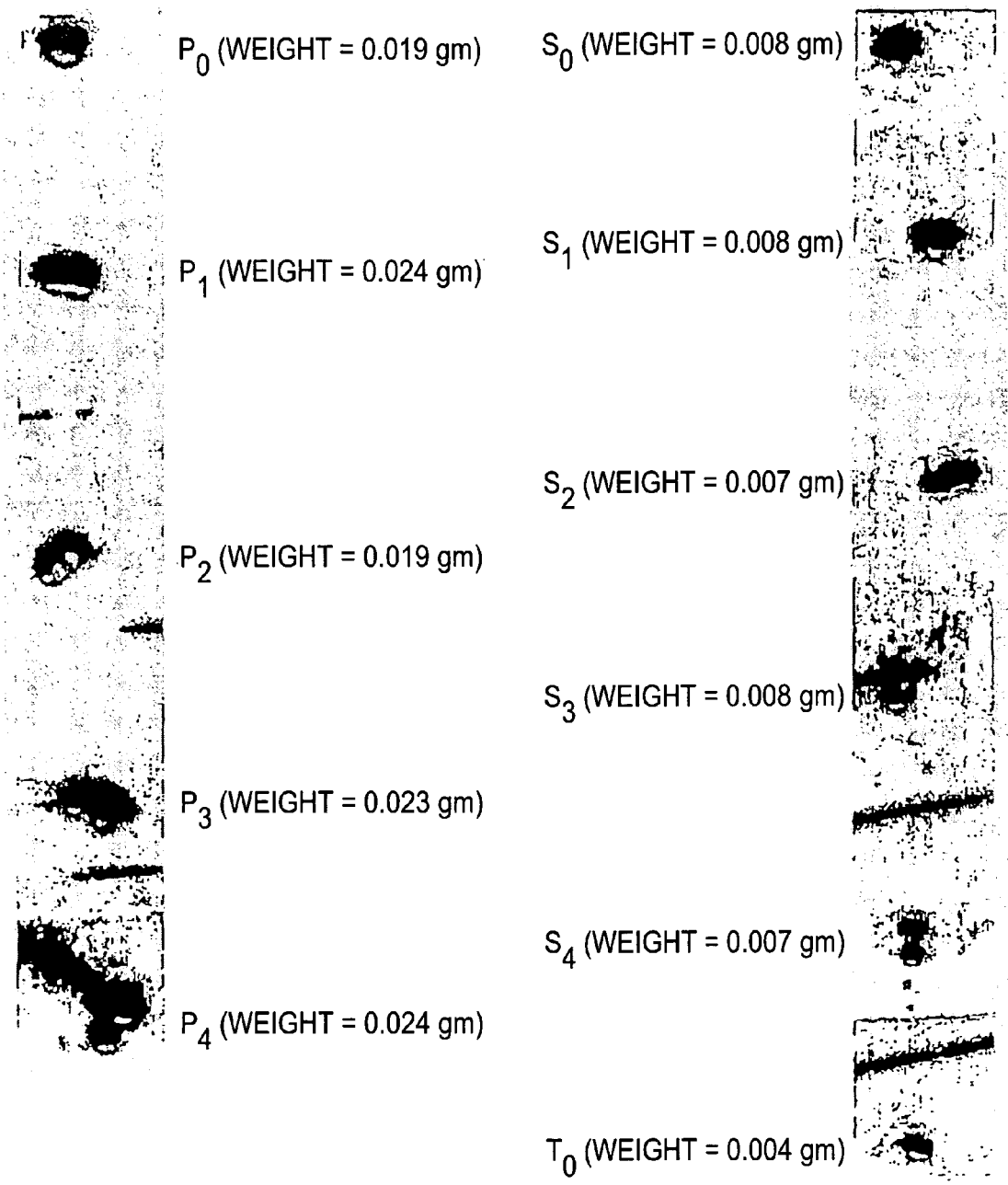
FIG. 62 is a photograph showing primary, secondary and tertiary droplets produced from the experiment in Example 8.
Figures 65, 66, 67:
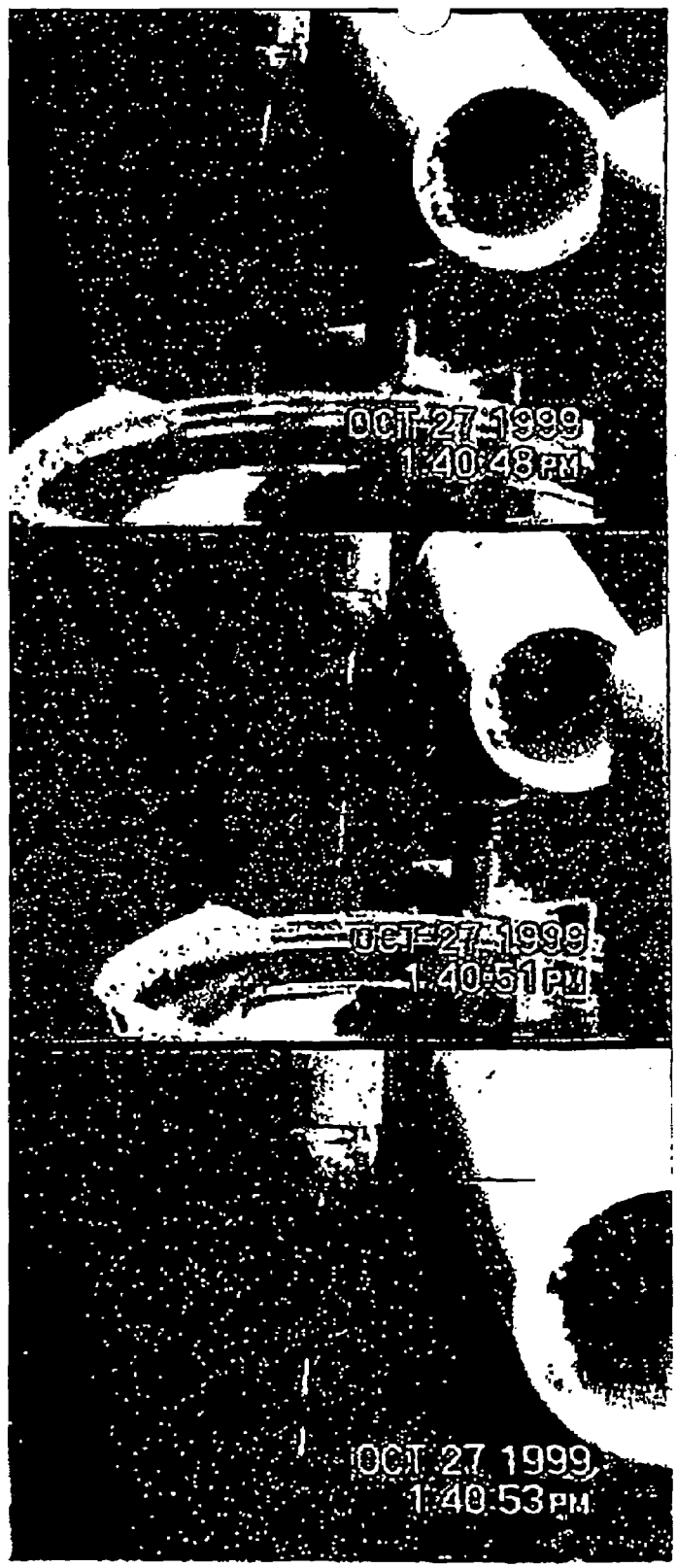

As long as 300 K<$T_5$<$T_2$, $T_5$ can be any value. From FIG. 60, we have $T_1$(control)=570  (2)

$T_2$(control)=329  (3)

$T_1$(plasma)=570  (4)

$T_2$(plasma)=304  (5)

t=0  (6)

$t_2$=600  (7)

Taking the following values for isothermal $T_5$ (again, any value can be taken, they are just to illustrate the issues):

$T_s$(control)=320  (8)

$T_s$(plasma)=303  (9)

The following values for are obtained:

$\beta=5.54 \times 10^{-3}$ $\beta'=9.312 \times 10^{-3}$ and a conductivity gain of $$\gamma = \frac{\beta'}{\beta} = 1.681.$$

This is very much different from the value=10.0 upon which this sample problem is based. It may be worthwhile to check the Biot modulus Bi for this problem.

Example 8

The example shows how colored water could be atomized successfully using a high voltage DC source alone, and how experiments employing a eutectic alloy (wood's metal) looked promising. The apparatus used was to be substantially refined before further liquid metal experiments continued.

An apparatus has been employed that has permitted limited atomization of liquid metal when the flow is in an upward direction against gravity, or in a downward direction with gravity. A number of controlling parameters such as nozzle size, ambient conditions, spacing between electrodes, dielectric medium between electrodes, and shape and size of extractor electrode have been varied such that an optimum environment for atomization of liquid metal to occur using only a DC source can be approached.

The results are very encouraging and further substantial improvement ins anticipated as the experimental apparatus is further refined, and when a high rise-rate AC signal is incorporated into the system.

i) Liquid metal flow against the direction of gravity, and
ii) Liquid metal flow in the direction of gravity.

i) Liquid Metal Flow Against the Direction of Gravity.

Figure 73:
FIG. 73 and FIGS. 77-79 are pictures illustrating an apparatus used for example 8.

The apparatus used for these experiments is shown in FIG. 73. A copper reservoir is connected to the nozzle assembly by means of a copper tube. Solid pieces of eutectic alloy (wood's metal) are placed in the reservoir and heated to approximately 100° C. by radiation from two 150 watt halogen bulbs. A pressure difference between the wider reservoir and the nozzle causes the liquid to flow to the tip of the nozzle, and the flow rate from the nozzle can be regulated by the amount of alloy placed in the reservoir. The reservoir and nozzle assembly is connected directly to the high voltage terminal. A copper spheroid which is placed within $\frac{1}{16}^{th}$ of an inch from the nozzle tip surrounds the replaceable nozzle, and a copper tube thermally connects this spheroid to the reservoir assembly. In this way, not only heat is imparted to the eutectic alloy by conduction along the majority of its path, but also a charge buildup area has been extended. The whole arrangement is painted black to behave as a black body absorber. A brass extractor ring is suspended at varying distances directly above the nozzle opening and is connected to a grounded electrical terminal by means of an adjustable mounting assembly.

ii) Liquid Metal Flow in the Direction of Gravity.

In this instance, a similarly copper reservoir is connected to a nozzle assembly by means of a short downward tube of thinner internal diameter than the reservoir, and this arrangement is attached directly to the positive high voltage terminal. An extractor ring sits at varying distances below, or to the side of the nozzle tip, and a collector cup, a partially filled with water sits for collection of atomized samples, directly below the nozzle.

Figure 71:
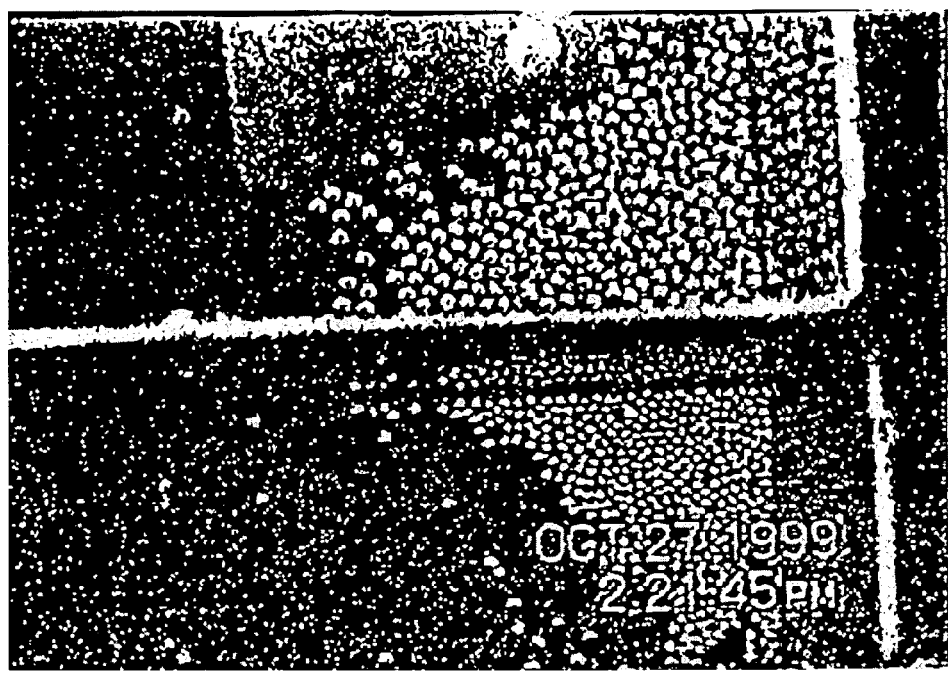
FIGS. 71-72 are pictures illustrating drops and droplets collected in example 8.
Figure 72:
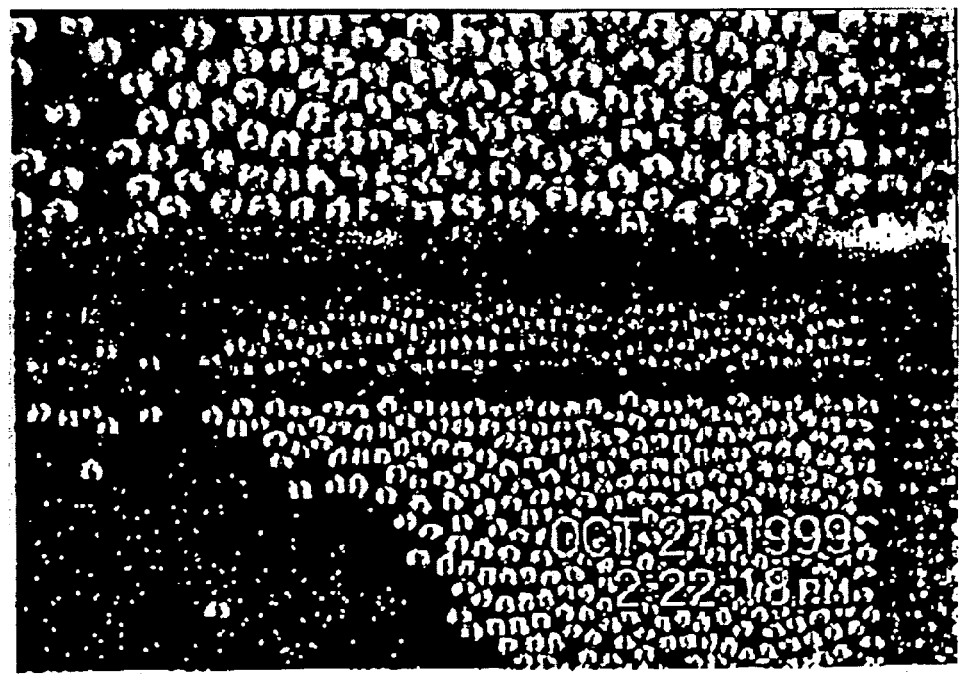

A sensitive electronic balance was used to weigh drops and droplets from atomization experiments. Control experiments were performed when drops were produced by gravitational force and free hydrostatic pressure (for downward liquid) alone. Repeat experiments were then conducted using a similar head of molten metal, and a high voltage (max 36 keV, max 0.2 mA) was applied to the fluid. Equal number of drops and droplets (nominally 100) were weighed, and their weights compared. FIGS. 71 and 72 show the drops and droplets collected from one such series of experiments. For each figure the larger drops (upper portion of the figure) are those collected during the control experiments, and the smaller droplets (lower portion of the figure) are those collected during experiments using electrostatic field.

Under normal conditions, atomization of a liquid metal utilizing an electric field between two electrodes alone is hampered by two over-riding factors:
 a) In air, at atmospheric pressure, arcing occurs at a voltage lower than that required to atomize the liquid metal by electrostatic means.
 b) At pressures slightly less than atmospheric, there is an inability to create potential differences between the electrodes sufficiently high enough to enable atomization to occur because the formation of plasma permits an easy path for current flow.

As a way of overcoming these voltage breakdown problems, a piece of CPVC pipe, ⅛$^{th}$ of an inch thick was placed in such a way as to surround the extractor ring and its supporting arm (see FIGS. 74 to 76, and FIGS. 65 to 69). By incorporating this CPVC into the assembly, substantially higher potential differences between nozzle and extractor could be achieved before arcing occurred. This meant that more electrical energy was available for atomization, though the distance between the electrodes could only be increased to a point where leaking would occur to neighboring components.

Liquid metal flow against the direction of gravity.

The nozzle aperture that permitted the best atomization was of the order of 0.3 to 0.4 mm. For apertures smaller that this, difficulty was encountered in securing a liquid metal flow. Apertures larger than this permitted too great a surface area of liquid metal at the nozzle tip than could be atomized by the experimental apparatus. Liquid metal atomization was captured on video camera, but could only continue for as long as the head of pressure in the reservoir permitted flow of fluid to the nozzle tip. A prelude to atomization can be witnessed as high voltage is increased by either an increase in fluid flow rate, or as a vertex (Taylor Cone) forming on the surface of the liquid metal at the tip of the nozzle. If too long a time elapsed between achieving a complete flow of fluid from the reservoir to the nozzle tip and increasing the high voltage from zero to a level sufficient to permit atomization, then satisfactory atomization would not occur. Instead, cooling and oxidation of the free liquid surface would be apparent and the liquid metal would flow downward. The potential difference between the nozzle and the grounded steel base plate was sufficient to increase the liquid flow. Thus, a "pipe" of solidified metal would slowly form down the side of the nozzle assembly until the pressure difference at the reservoir decreased to zero.

In this manner, efforts to achieve atomization by means of a combination of mechanical and electrical forces were successful. One such experiment involved placing a plunger over the open end of the reservoir to increase the pressure difference at the nozzle tip. In this case, production of droplets by electrostatic atomization required less potential difference between the electrodes, and droplet sizes were smaller.

In another experiment, the eutectic alloy was removed from the reservoir assembly and was replaced by water. The water was then drained from the assembly, leaving the inner walls wet. The eutectic alloy was the returned to the reservoir and reheated. When liquid metal flow from the nozzle occurred, drops were ejected by the force of stream that was trapped within the nozzle assembly. When a high voltage was applied, the drops became atomized into smaller droplets, some of which adhered to the undersided of the CPVC.

Figure 74:
Figure 75:
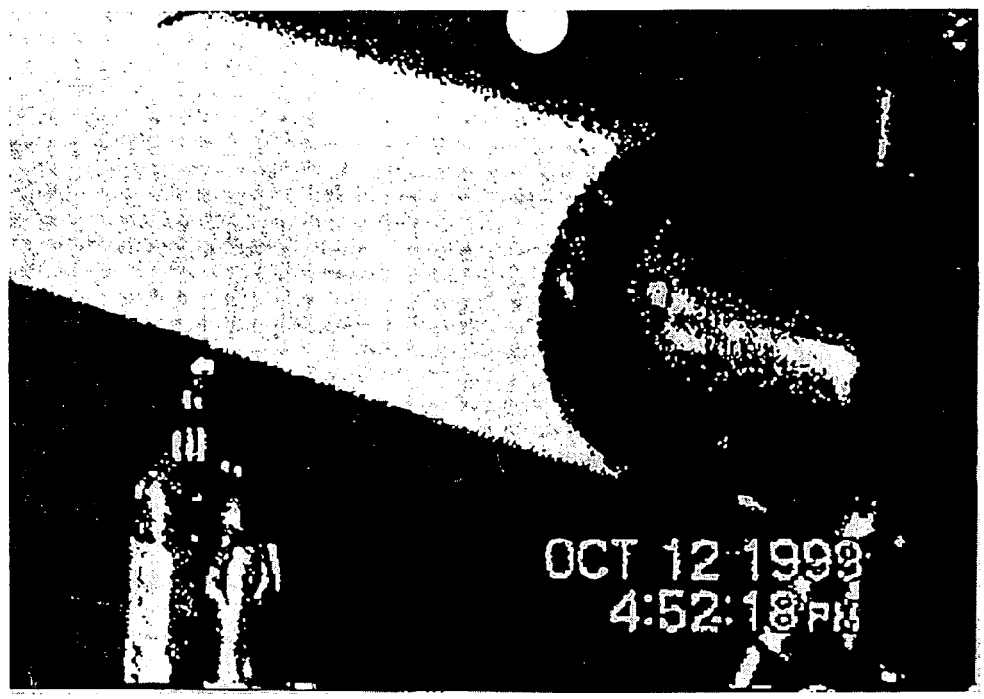
Figure 76:
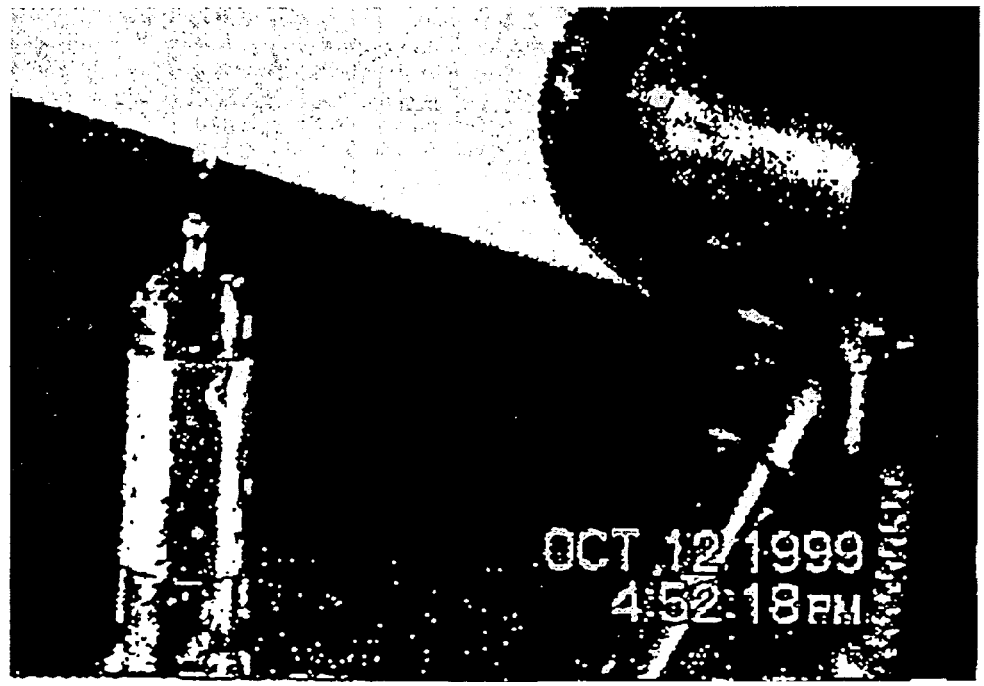
Figure 77:
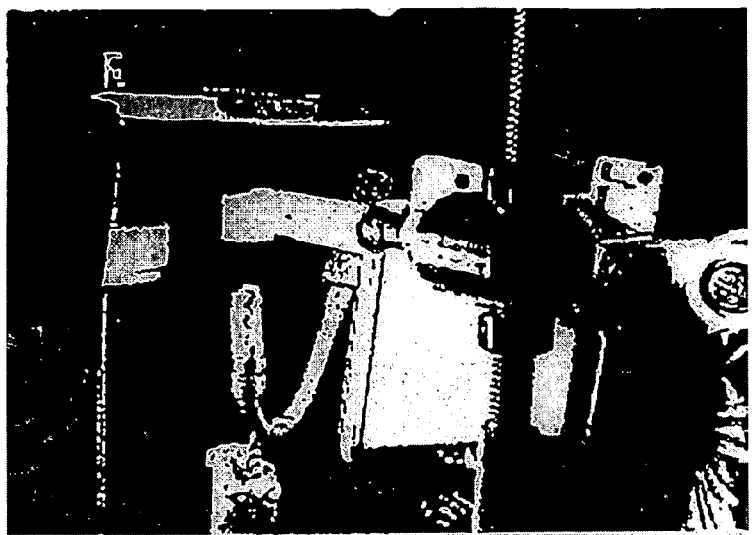
Figure 78:
Figure 79:
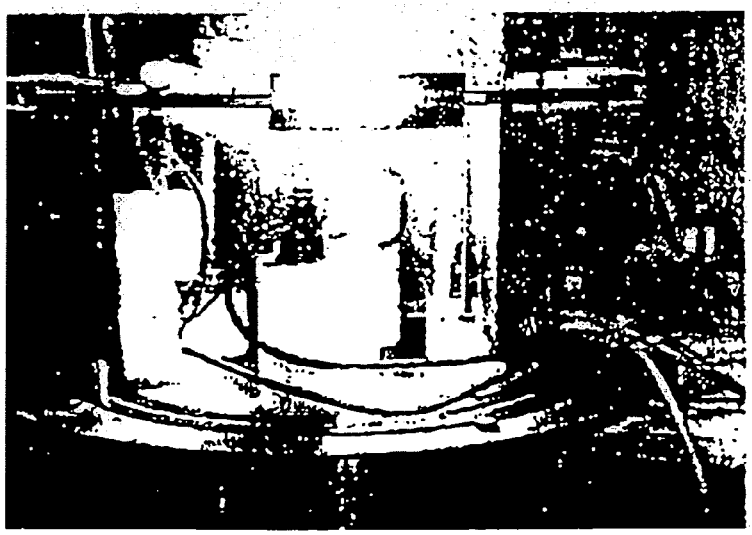

FIGS. 74, 75 and 76 show consecutive frames of the atomization of liquid metal against gravity without any applied mechanical force other than that due to the head of liquid in the reservoir.

Liquid metal flow in the direction of gravity.

Liquid metal flow in this direction can be controlled much more satisfactorily. Conditions can be created such that a continuous flow of molten metal is produced and nozzle apertures can be much smaller. Currently nozzles with apertures in the region of 0.1 to 0.15 mm are being employed and can be such that gravitational forces alone cannot overcome the adhesive forces of surface tension upon the inner walls of the nozzle, and the cohesive forces within the surface of the metal. In such instances, electrostatic atomization can produce droplets with diameters of substantially smaller magnitude.

Rapid cooling during droplet flight provides this evidence. If the flight path were sufficiently long enough, and the environment in close proximity to the apparatus could be maintained above the temperature of the liquid metal melting point then the droplets would achieve a more nearly spherical shape.

This is true for a particular stage of electrostatic atomization. At the time of the Interim Report, we had reached a stage that we now dub "primary atomization". Since October 28$^{th}$, we have had some partial success in achieving secondary and (to a lesser extent) tertiary atomization. Rapid cooling during flight continues to provide this evidence.

Evident by experimental observation. Current nozzles being employed are stainless steel tubing with an outer diameter (O.D.) of 0.012 inch (0.3 mm) and an inner diameter (I.D.) of 0.006 inch (0.15 mm).

Binary division occurs in some instances, but our ongoing studies suggest that the production of smaller droplets may not be due simply to successive binary division. This matter is discussed further herein.

Undoubtedly this is true. However, current research is aimed at discovering whom, and in what manner smaller droplets are produced.

Until we can employ a high resolution camera utilizing high speed film, we have no further comment upon this phenomenon.

Example 9

Rapid cooling during droplet flight provides this evidence. If the flight path were sufficiently long enough, and the environment in close proximity to the apparatus could be maintained above the temperature of the liquid metal melting point then the droplets would achieve a more nearly spherical shape.

This is true for a particular stage of electrostatic atomization. At the time of the Interim Report, we had reached a stage that we now dub "primary atomization". Since October $28^{th}$, we have had some partial success in achieving secondary and (to a lesser extent) tertiary atomization. Rapid cooling during flight continues to provide this evidence.

were all evident to the client when a demonstration experiment was provided for him on the occasion of his visit on December $14^{th}$.

We have no further comment at this time.

We now discuss section E. Conclusions:

Evident by experimental observation. Current nozzles being employed are stainless steel tubing with an outer diameter (O.D.) of 0.012 inch (0.3 mm) and an inner diameter (I.D.) of 0.006 inch (0.15 mm).

Binary division occurs in some instances, but our ongoing studies suggest that the production of smaller droplets may not be due simply to successive binary division. This matter is discussed further herein.

Undoubtedly this is true. However, current research is aimed at discovering whom, and in what manner smaller droplets are produced.

Until we can employ a high resolution camera utilizing high speed film, we have no further comment upon this phenomenon.

Smaller gauge stainless steel tubing has now arrived, as has a eutectic alloy containing Indium that has a melting point of only 47° C., and, delivery of high voltage control units (currently our units have a maximum range of 50 keV, Bertan model 815-30P) supplying up to 100 keV DC is imminent.

The means by which atomization occurs is by no means clearly understood at this time. However, we continue to review our thinking as each new piece of evidence becomes available. In deed, in recent days we have found it necessary to review our thinking yet again in the light of new experimental information. The extractor ring seems to play a significant role in maximizing the division process. The most appropriate material for its composition, and its best location within the electrostatic field remain uncertain at this stage. Ongoing experiments revolve around using i) bare copper rings, each with a different radius, and ii) rings composed of a variety of good dielectric materials such as PVC.

The wire rings seem to permit some expansive (sucking) force to be applied upon the droplet as it passes the ring plane, whilst the PVC rings seem to permit a compressive force to be applied upon the droplets. The importance of maintaining the environment in the vicinity of the electrostatic field at a temperature above the melting point of the liquid metal cannot be over-emphasized. As the droplets become smaller their surface area to mass ratio increases and they cool more rapidly.

i) A positive high voltage DC source connected to the liquid metal reservoir produces an electric field between the nozzle and the grounded collector cup. The force of the field produced, acting together with gravity, causes atomized droplets of similar size to be collected. We have called this phenomenon primary atomization.

ii) The placement of an extractor ring between the nozzle and collector cup and concentric to the droplet path causes lateral forces to be applied to the droplet, which can produce successively small droplets. We have called this phenomenon secondary and tertiary atomization.

A deeper understanding of the atomization process will enable us to improve these numbers. FIG. 61 shows the weight of the droplets produced vs the gap between the nozzle and the extractor. This fig. clearly illustrates that once a critical value is reached, primary atomization is not sensitive to the high voltage potential applied, or to the distance between the nozzle and the extractor. Table 1 and Table 2 in FIGS. 63 and 64, respectively show the results of experiments using bare copper wire extractors with different ring diameters.

FIG. 62 shows evidence abstracted from the same experimental sample in an attempt to understand the amortization phenomenon. All droplets were produced by the same experiment. The choice of solidified droplets $P_0$ to $P_4$ is an attempt to demonstrate the way in which the primary droplets are subdivided. The choice of solidified droplets $S_0$ to $S_4$ is an attempt to show this phenomenon then repeats upon the secondary droplets to produce tertiary droplets such as solidified droplet $T_0$. Droplets $P_4$ and $S_4$ appear severed, but they are not. They are whole; and droplet $T_0$ seems large for its weight. Unfortunately, these apparent anomalies arise from lens distortion due to the scanning and copy processes involved in producing FIG. 62.

Each patent application and publication referenced herein is hereby incorporated by reference herein in its entirety.

Various modifications of the invention, in addition to those described herein, will be apparent to one skilled in the art from the foregoing description. Such modifications are also intended to fall within the scope of the appended claims.

What is claimed is:

1. A method for atomizing a particle comprising:

producing a first molten particle;

applying a rapid electrostatic charge to the first molten particle, wherein the rapid electrostatic charge causes the first molten particle to form at least one smaller second molten particle; and cooling the second molten particle by producing a non-equilibrium plasma that transfers heat from the second molten particle to a first heat sink, wherein the first heat sink is electrically charged or held at a potential.

2. The method of claim 1, wherein the first molten particle is produced by melting a material in a melt chamber, and expelling the first molten particle through at least one orifice in the melt chamber.

3. The method of claim 1, wherein the rapid electrostatic charge is an arc discharge or an electron beam.

4. The method of claim 1, wherein the non-equilibrium plasma is a glow discharge or a cold corona discharge.

* * * * *